US012719527B2

(12) United States Patent
Ko et al.

(10) Patent No.: US 12,719,527 B2
(45) Date of Patent: Aug. 25, 2026

(54) ELECTRONIC DEVICE INCLUDING ANTENNA

(71) Applicant: SAMSUNG ELECTRONICS CO., LTD., Suwon-si (KR)

(72) Inventors: Minbeom Ko, Suwon-si (KR); Jaeho Lim, Suwon-si (KR); Seunghwan Kim, Suwon-si (KR); Kyungjae Lee, Suwon-si (KR); Soonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 18/986,301

(22) Filed: Dec. 18, 2024

(65) Prior Publication Data

US 2025/0211285 A1 Jun. 26, 2025

Related U.S. Application Data

(63) Continuation of application No. PCT/KR2024/016836, filed on Oct. 30, 2024.

(30) Foreign Application Priority Data

Dec. 22, 2023 (KR) ........................ 10-2023-0190540
Mar. 8, 2024 (KR) ........................ 10-2024-0033509
May 13, 2024 (KR) ........................ 10-2024-0062812

(51) Int. Cl.
*H01Q 1/24* (2006.01)
*H01Q 7/00* (2006.01)
(Continued)

(52) U.S. Cl.
CPC ................. *H04B 5/43* (2024.01); *H01Q 7/00* (2013.01); *H04B 1/40* (2013.01)

(58) Field of Classification Search
CPC ... H01Q 1/22; H01Q 1/24; H01Q 7/00; H04B 1/40; H04B 5/00; H04B 5/26; H04B 5/48;
(Continued)

(56) References Cited

U.S. PATENT DOCUMENTS 9,083,073 B2 7/2015 Yang et al.
9,406,997 B2 8/2016 Cho
(Continued)

FOREIGN PATENT DOCUMENTS

CN 106207441 A 12/2016
CN 206163707 U 5/2017
(Continued)

OTHER PUBLICATIONS

Communication dated Feb. 20, 2025, issued by the International Searching Authority in International Application No. PCT/KR2024/016836 (PCT/ISA/210 and PCT/ISA/237).

*Primary Examiner* — Tho G Phan
(74) *Attorney, Agent, or Firm* — Sughrue Mion, PLLC

(57) ABSTRACT

An electronic device includes: a conductive portion at least partially exposed to outside of the electronic device; a coil; a near-field communication (NFC) circuitry; and a transmission line connected with the conductive portion, the coil, and the NFC circuitry, includes: a first signal path connected with a first terminal of the NFC circuitry and a first area of the conductive portion, a second signal path connected with a second terminal of the NFC circuitry and a first ending portion of the coil, and a third signal path connected with a second area of the conductive portion and a second ending portion of the coil, and wherein a signal path, which is selected among the first signal path, the second signal path,
(Continued)

and the third signal path, includes a first ground path and a second ground path that are connected to a ground area of the electronic device.

20 Claims, 56 Drawing Sheets

(51) Int. Cl.

| | |
|---|---|
| ***H04B 1/40*** | (2015.01) |
| ***H04B 5/00*** | (2024.01) |
| ***H04B 5/43*** | (2024.01) |

(58) Field of Classification Search

CPC .......... H04B 5/43; H04B 5/77; G06K 19/067; H02H 9/04; H05K 1/02

See application file for complete search history.

(56) References Cited

U.S. PATENT DOCUMENTS

| | | | | |
|---|---|---|---|---|
| 9,761,946 | B2 * | 9/2017 | Moon | H01Q 7/00 |
| 9,793,616 | B2 * | 10/2017 | Ouyang | H01Q 5/20 |
| 10,403,967 | B1 * | 9/2019 | Kim | H01Q 5/328 |
| 10,700,422 | B2 * | 6/2020 | Moon | H01Q 1/2208 |
| 10,886,600 | B2 * | 1/2021 | Cho | H01Q 13/106 |
| 11,038,257 | B2 | 6/2021 | Zhu et al. | |
| 11,088,436 | B2 | 8/2021 | Noh et al. | |
| 11,108,271 | B2 | 8/2021 | Park et al. | |
| 11,563,280 | B2 | 1/2023 | Kim et al. | |
| 12,381,596 | B2 * | 8/2025 | Huang | H01Q 1/243 |
| 2016/0112219 | A1 | 4/2016 | Lee et al. | |
| 2017/0288298 | A1 | 10/2017 | Kim | |
| 2018/0145398 | A1 | 5/2018 | Lilja et al. | |
| 2019/0198996 | A1 | 6/2019 | Zhu et al. | |
| 2019/0260118 | A1 | 8/2019 | Moon et al. | |
| 2021/0105894 | A1 | 4/2021 | Oh et al. | |
| 2021/0305682 | A1 | 9/2021 | Wang | |
| 2023/0101129 | A1 | 3/2023 | Huang et al. | |
| 2023/0223693 | A1 | 7/2023 | Lee et al. | |

FOREIGN PATENT DOCUMENTS

| | | | |
|---|---|---|---|
| CN | 111555026 | A | 8/2020 |
| CN | 112751179 | A | 5/2021 |
| CN | 218975788 | U | 5/2023 |
| JP | 2019-528602 | A | 10/2019 |
| KR | 10-1052115 | B1 | 7/2011 |
| KR | 10-2016-0046187 | A | 4/2016 |
| KR | 10-1619322 | B1 | 5/2016 |
| KR | 10-2016-0101627 | A | 8/2016 |
| KR | 10-2017-0112508 | A | 10/2017 |
| KR | 10-1874641 | B1 | 7/2018 |
| KR | 10-2194806 | B1 | 12/2020 |
| KR | 10-2021-0040699 | A | 4/2021 |
| KR | 10-2022-0036524 | A | 3/2022 |
| KR | 10-2574774 | B1 | 9/2023 |

* cited by examiner

ELECTRONIC DEVICE INCLUDING ANTENNA

CROSS-REFERENCE TO RELATED APPLICATIONS

This application is a by-pass continuation application of International Application No. PCT/KR2024/016836, filed on Oct. 30, 2024, which is based on and claims priority to Korean Patent Application Nos. 10-2023-0190540, filed on Dec. 22, 2023, and 10-2024-0033509, filed on Mar. 8, 2023, and 10-2024-0062812, filed on May 13, 2024, in the Korean Intellectual Property Office, the disclosures of which are incorporated by reference herein their entireties.

BACKGROUND

1. Field

The disclosure relate to an electronic device including an antenna.

2. Description of Related Art

Near field communication (NFC) is a short-range communication technology, and may be used to transfer files between devices at a short distance using an NFC standard protocol.

SUMMARY

Provided is an electronic device supporting near field communication (NFC).

According to an aspect of the disclosure, an electronic device includes: a conductive portion at least partially exposed to outside of the electronic device; a coil; a near-field communication (NFC) circuitry; and a transmission line connected with the conductive portion, the coil, and the NFC circuitry, includes: a first signal path connected with a first terminal of the NFC circuitry and a first area of the conductive portion, a second signal path connected with a second terminal of the NFC circuitry and a first ending portion of the coil, and a third signal path connected with a second area of the conductive portion and a second ending portion of the coil, and wherein a signal path, which is selected among the first signal path, the second signal path, and the third signal path, includes a first ground path and a second ground path that are connected to a ground area of the electronic device.

According to an aspect of the disclosure, an electronic device includes: a first conductive portion at least partially exposed to outside of the electronic device; a second conductive portion at least partially exposed to outside of the electronic device; a coil; a near-field communication (NFC) circuitry; and a transmission line connected with the first conductive portion, the second conductive portion, the coil, and the NFC circuitry, includes: a first signal path connected with a first terminal of the NFC circuitry and a first area of the first conductive portion, a second signal path connected with a second terminal of the NFC circuitry and a first ending portion of the coil, a third signal path connected with a first area of the second conductive portion and a second ending portion of the coil, and a fourth signal path connected with a second area of the first conductive portion and a second area of the second conductive portion, and wherein a signal path, which is selected between the first signal path, the second signal path, the third signal path, and the fourth signal path, includes a first ground path and a second ground path that are connected to a ground area of the electronic device.

According to an aspect of the disclosure, an electronic device includes: a conductive portion, a coil, a printed circuit board (PCB), and a near field communication (NFC) circuitry disposed on the PCB. A first transmission terminal of the NFC circuitry may be electrically connected to the conductive portion through a first signal path. A second transmission terminal of the NFC circuitry may be electrically connected to the coil through a second signal path. The NFC circuit may be configured to transmit a first signal of a differential output from the first transmission terminal to the conductive portion through the first signal path, and transmit a second signal of the differential output from the second transmission terminal to the coil through the second signal path.

According to an aspect of the disclosure, an electronic device includes: a first housing portion including a plurality of conductive portions and non-conductive portions, a second housing portion rotatably coupled to the first housing portion, a printed circuit board (PCB) disposed in the first housing portion, a coil disposed in the second housing portion, and a near field communication (NFC) circuitry disposed on the PCB. The plurality of non-conductive portions may include a first non-conductive portion and a second non-conductive portion. The plurality of conductive portions may include a first conductive portion formed between the first non-conductive portion and the second non-conductive portion. A first transmission terminal of the NFC circuitry may be electrically connected to the first conductive portion through a first signal path. A second transmission terminal of the NFC circuitry may be electrically connected to the coil through a second signal path. The NFC circuitry may be configured to transmit a first signal of a differential output from the first transmission terminal to the first conductive portion through the first signal path, and transmit a second signal of the differential output from the second transmission terminal to the coil through the second signal path.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
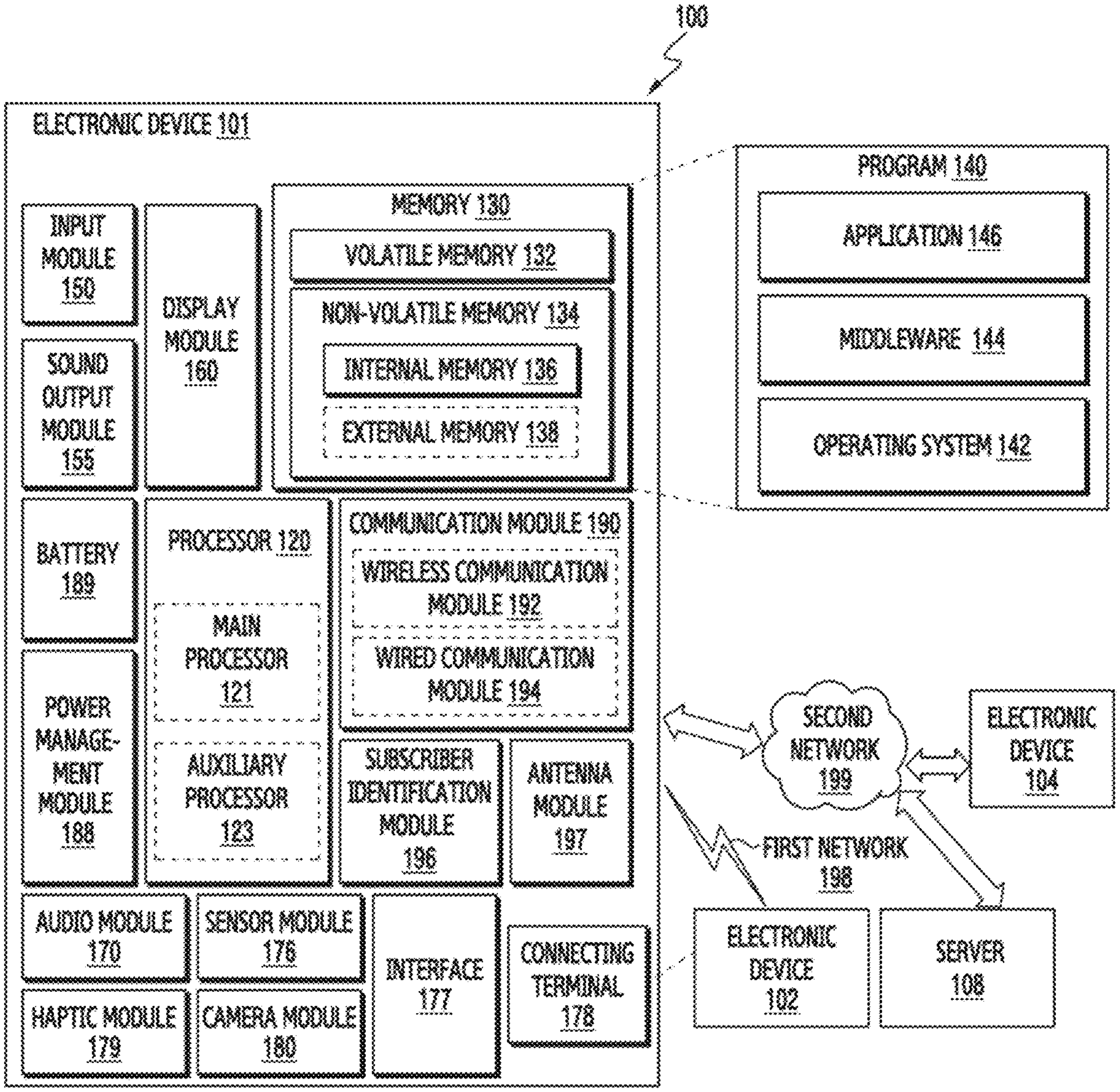
FIG. 1 is a block diagram of an electronic device in a network environment.

Terms used in the disclosure are used only to describe a specific embodiment, and may not be intended to limit a range of another embodiment. A singular expression may include a plural expression unless the context clearly means otherwise. Terms used herein, including a technical or a scientific term, may have the same meaning as those generally understood by a person with ordinary skill in the art described in the disclosure. Among the terms used in the disclosure, terms defined in a general dictionary may be interpreted as identical or similar meaning to the contextual meaning of the relevant technology and are not interpreted as ideal or excessively formal meaning unless explicitly defined in the disclosure. In some cases, even terms defined in the disclosure may not be interpreted to exclude embodiments of the disclosure.

In various embodiments of the disclosure described below, a hardware approach will be described as an example. However, since the various embodiments of the disclosure include technology that uses both hardware and software, the various embodiments of the disclosure do not exclude a software-based approach.

A term referring to a part of an electronic device (e.g., substrate, printed circuit board (PCB), flexible PCB (FPCB), printed board assembly (PBA), module, antenna, antenna element, circuitry, processor, chip, component, or device), a term referring to a shape of the part (e.g., structure body, structure, support portion, contact portion, or protrusion), a term referring to a connecting portion between structures (e.g., connector, contacting portion, support portion, contact structure, conductive member, or assembly), a term referring to an open structure of an antenna (e.g., slot, slit, or opening), a term referring to a circuitry (e.g., PCB, FPCB, signal line, ground line, feeding line, data line, RF signal line, antenna line, RF path, RF module, RF circuitry, splitter, divider, coupler, or combiner), and the like, used in the following description are exemplified for convenience of explanation. Therefore, the disclosure is not limited to terms to be described below, and another term having an equivalent technical meaning may be used. In addition, a term such as '. . . module', '. . . unit', '. . . member', and '. . . part', and the like used below may mean at least one shape structure or may mean a unit processing a function.

In addition, in the disclosure, the term 'greater than' or 'less than' may be used to determine whether a particular condition is satisfied or fulfilled, but this is only a description to express an example and does not exclude description of 'greater than or equal to' or 'less than or equal to'. A condition described as 'greater than or equal to' may be replaced with 'greater than', a condition described as 'less than or equal to' may be replaced with 'less than', and a condition described as 'greater than or equal to and less than' may be replaced with 'greater than and less than or equal to'. In addition, hereinafter, 'A' to 'B' means at least one of elements from A (including A) to B (including B). Hereinafter, 'C' and/or 'D' means that at least one of 'C' or 'D', that is, {'C', 'D', 'C' and 'D'}.

FIG. 1 is a block diagram illustrating an electronic device in a network environment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a PCB). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
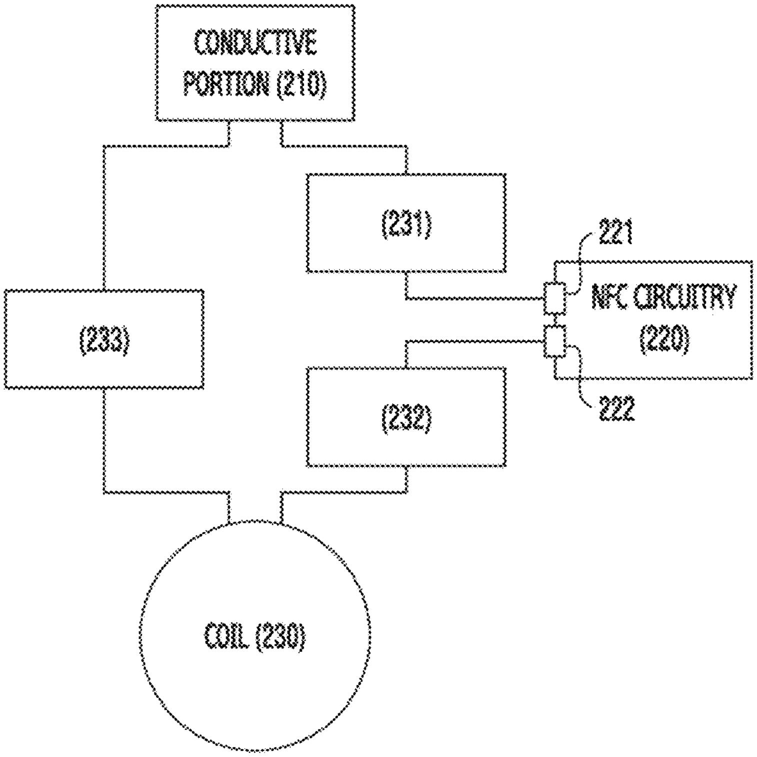
FIG. 2A illustrates a connection structure between near field communication (NFC) circuitry and radiators.

FIG. 2A illustrates a connection structure between a near field communication (NFC) circuitry and radiators. Identical reference numbers may indicate identical or similar descriptions.

Referring to FIG. 2A, an electronic device 101 may include a conductive portion 210, an NFC circuitry 220, and a coil 230. The conductive portion 210 may correspond to a conductor or a radiator, be used as a radiator for NFC communication. The coil 230 may be used as a radiator for NFC communication. The NFC circuitry 220 may include terminals. For example, the NFC circuitry 220 may include a first terminal 221 and a second terminal 222.

The electronic device 101 may include a transmission line electrically connecting the conductive portion 210, the NFC circuitry 220, and the coil 230. The transmission line may indicate paths through which signals of the NFC circuitry 220 are transmitted. For example, the transmission line may include feeding lines (or may be referred to as portions of the transmission line). The transmission line may include a first signal path 231 electrically connecting the first terminal 221 of the NFC circuitry 220 to a first area of the conductive portion 210, a second signal path 232 electrically connecting the second terminal 222 of the NFC circuitry 220 to a first ending portion of the coil 230, and a third signal path 233 electrically connecting a second area of the conductive portion 210 to a second ending portion of the coil 230.

The first terminal 221 of the NFC circuitry 220 may be connected to the conductive portion 210 through the first signal path 231. The second terminal 222 of the NFC circuitry 220 may be connected to the coil 230 through the second signal path 232. The conductive portion 210 and the coil 230 may be connected to each other through the third signal path 233.

The NFC circuitry 220 may operate in a differential mode. The NFC circuitry 220 may output a first signal of a differential output through the first terminal 221. The NFC circuitry 220 may transmit the first signal from the first terminal 221 to the conductive portion 210 through the first signal path 231. The NFC circuitry 220 may output a second signal of the differential output through the second terminal 222. The NFC circuitry 220 may transmit the second signal from the second terminal 222 to the coil 230 through the second signal path 232. In some embodiments, a first phase of the first signal and a second phase of the second signal may be different by about 180 degrees. For example, in terms of a signal being outputted through a terminal, the first terminal 221 may be referred to as a (+)Tx output end or a TX1 output end, and the second terminal 222 may be referred to as a (−)Tx output end or a TX2 output end. For example, the first signal may be a positive signal and the second signal may be a negative signal. For another example, the first signal may be a negative signal, and the second signal may be a positive signal.

According to an embodiment, the first signal may be connected to the conductive portion 210 through the first signal path 231 via an impedance matching circuitry. For example, the second signal may be connected to the coil 230 through the second signal path 232 via an impedance matching circuitry. The electronic device 101 according to embodiments of the disclosure may use the conductive portion 210 and the coil 230 as a radiator, in order to expand an NFC communication area. For example, in case that the coil 230 is disposed to face a rear surface of the electronic device 101, the NFC communication area may be expanded through the conductive portion 210, for example, located at the top of the electronic device 101. The differential output of the NFC circuitry 220 may be applied to the conductive portion 210 and the coil 230, through the first signal path 231, the second signal path 232, and/or the third signal path 233. As the conductive portion 210 and the coil 230 are used as a radiator (collectively or separately) for an NFC signal, the NFC communication area may be expanded. In an embodiment, each of the first signal path 231, the second signal path 232, and the third signal path 233 may include or correspond to a transmission line or a ground path. The ground path may correspond to a signal path connected to a ground area that may include a portion connected to the ground and/or a portion operated as the ground. For example, each of the first signal path 231 and the second signal path 232 may include a transmission line. For example, the third signal path 233 may include ground paths connected to the ground area. For example, the first signal path 231 may include ground paths connected to the ground area, and the second signal path 232 may include a transmission line. The third signal path 233 may include a transmission line. For example, the first signal path 231 may include a transmission line, and the second signal path 232 may include ground paths connected to the ground area. The third signal path 233 may include a transmission line. The types for each of the first signal path 231, the second signal path 232, and the third signal path 233 will be described in detail through FIG. 2B.

Figure 2B:
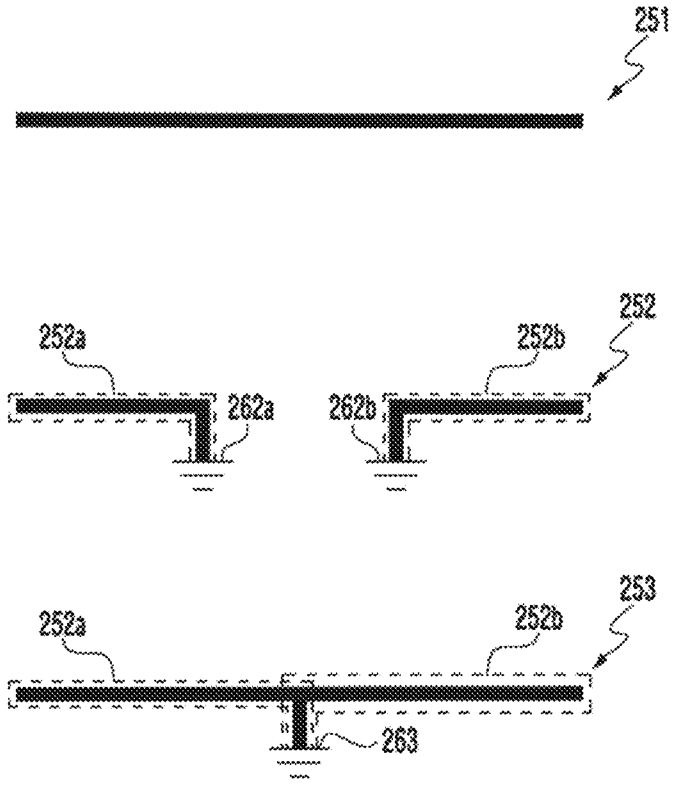
FIG. 2B illustrates an example of a connection type.

FIG. 2B illustrates an example of a connection type. Identical reference numbers may indicate identical or similar descriptions.

Referring to FIG. 2B, according to an embodiment, a first connection type 251 (e.g., a connection type of the first signal path 231, the second signal path 232, or the third signal path 233) may include a transmission line. For example, the transmission line may include a feeding line, and may be formed on the PCB. As an example, the NFC circuitry 220 and a radiator (e.g., the conductive portion 210 and/or the coil 230) may be connected through the transmission line. As an example, radiators (e.g., the conductive portion 210 and/or the coil 230) may be electrically connected through the transmission line.

According to an embodiment, a second connection type 252 (e.g., a connection type of the first signal path 231, the second signal path 232, or the third signal path 233) may include a first ground path 252*a* and a second ground path 252*b*. For example, the first ground path 252*a* and the second ground path 252*b* may be connected to a ground area. For example, the ground area, which is a member providing a ground, may be a ground layer of a PCB or a support member of the electronic device 101. In the second connection type 252, the first ground path 252*a* may be connected to a first ground portion 262*a*, and the second ground path 252*b* may be connected to a second ground portion 262*b*. A ground portion (e.g., the first ground portion 262*a* or the second ground portion 262*b*) may be a portion connected to the ground path, within the ground area. For example, the first ground portion 262*a* and the second ground portion 262*b* may be different portions within the same ground area (e.g., the ground layer of the PCB or the support member of the electronic device 101). For another example, unlike as described above, a ground area including the first ground portion 262*a* may be different from a ground area including the second ground portion 262*b*. For example, the first signal path 231 may correspond to the second connection type 252, the second signal path 232 may correspond to the first connection type 251, and the third signal path 233 may correspond to the first connection type 251.

For example, the first terminal 221 of the NFC circuitry 220 may be connected to the first ground portion 262*a*, and the conductive portion 210 may be connected to the second ground portion 262*b*. As another example, the first signal path 231 may correspond to the first connection type 251, the second signal path 232 may correspond to the second connection type 252, and the third signal path 233 may correspond to the first connection type 251. For example, the second terminal 222 of the NFC circuitry 220 may be connected to the first ground portion 262*a*, and the coil 230 may be connected to the second ground portion 262*b*.

According to an embodiment, a third connection type 253 (e.g., a connection type of the first signal path 231, the second signal path 232, or the third signal path 233) may include two ground paths connected to the same ground portion (e.g., a ground portion 263). For example, the ground portion 263 may be the ground layer of the PCB or a portion of the support member of the electronic device 101. The first ground path 252*a* and the second ground path 252*b* of the third connection type 253 may be short-circuited to each other at one point, and the short-circuited portion may be electrically connected to the ground portion 263. As an example, the first signal path 231 may correspond to the third connection type 253, the second signal path 232 may correspond to the first connection type 251, and the third signal path 233 may correspond to the first connection type 251. The first terminal 221 and the second terminal 222 of the NFC circuitry 220 may be connected to the ground portion 263. As another example, the first signal path 231 may correspond to the first connection type 251, the second signal path 232 may correspond to the third connection type 253, and the third signal path 233 may correspond to the first connection type 251. The first terminal 221 and the second terminal 222 of the NFC circuitry 220 may be connected to the ground area through the ground portion 263.

FIG. 3A, FIG. 3B, FIG. 3C, and FIG. 3D illustrate an example of an electronic device (e.g., the electronic device 101) that includes an NFC circuitry (e.g., the NFC circuitry 220) using a conductive portion (e.g., the conductive portion 210) and a coil (e.g., the coil 230).

Figure 3A:
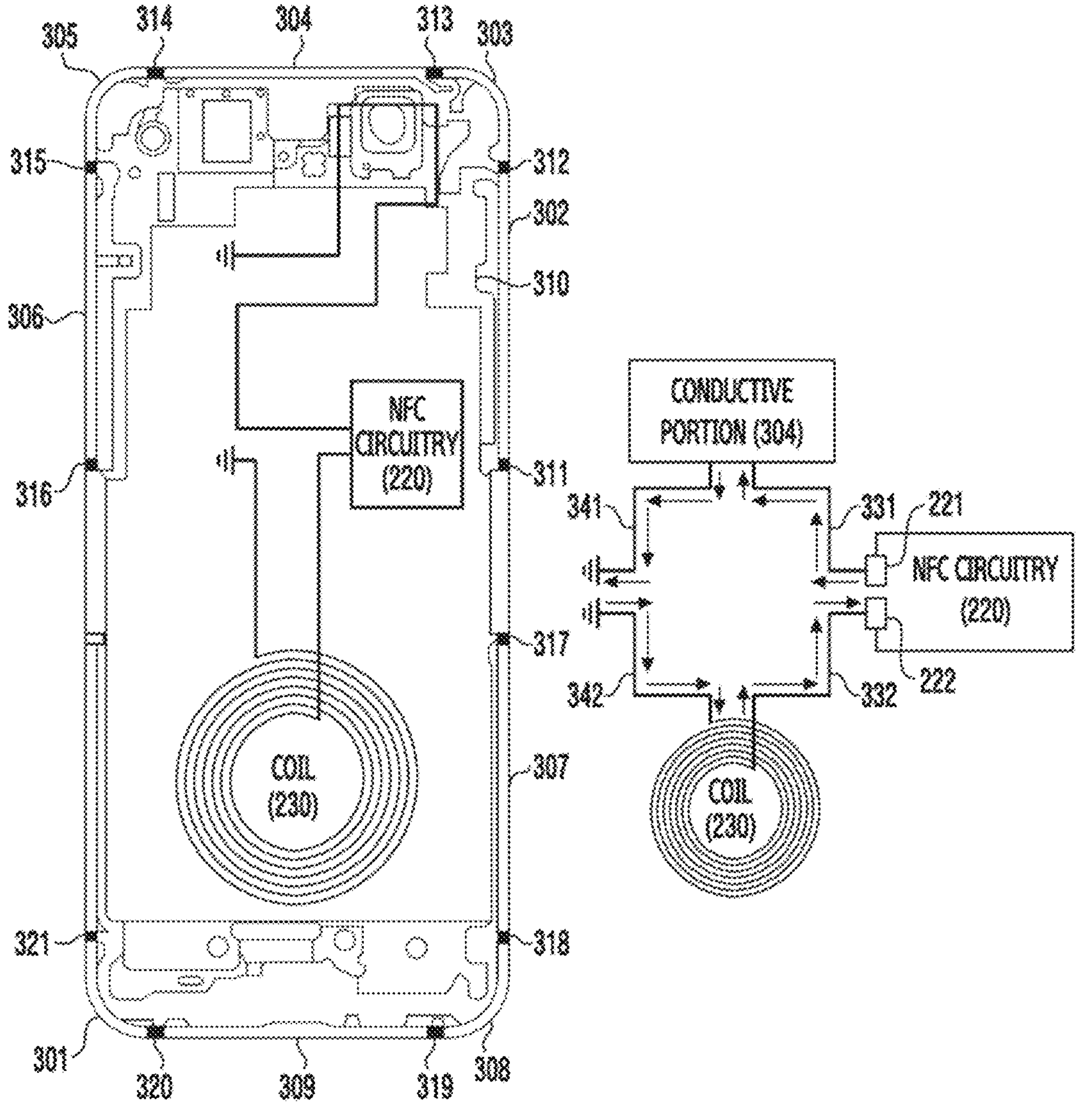
FIGS. 3A, 3B, 3C, and 3D illustrate an example of an electronic device including an NFC circuitry using a conductive portion and a coil.
Figure 3B:
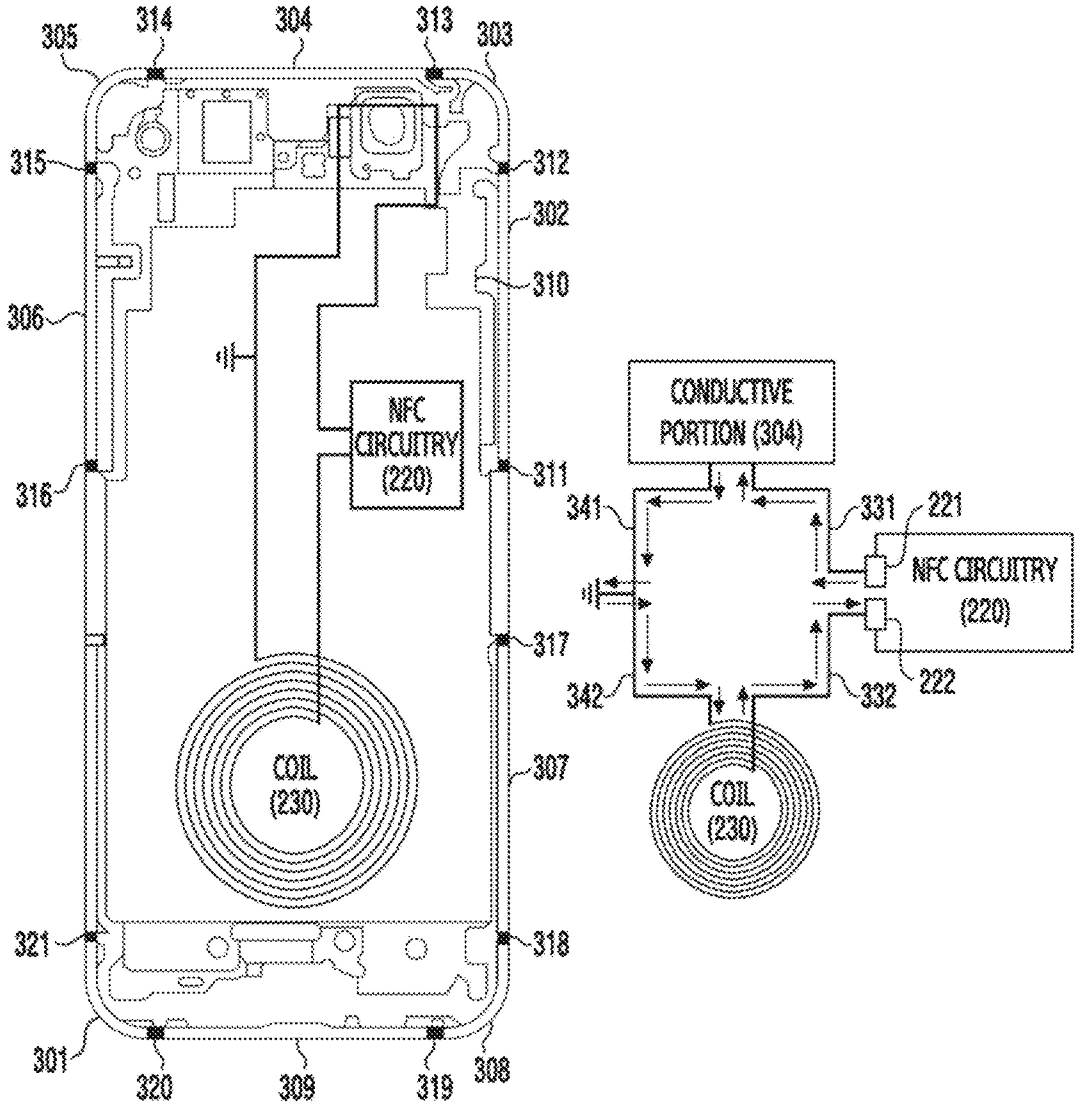

FIG. 3A illustrates an example of a circuitry in which the first signal path 231 is the first connection type 251, the second signal path 232 is the first connection type 251, and the third signal path 233 is the second connection type 252. FIG. 3B illustrates an example of a circuitry in which the first signal path 231 is the first connection type 251, the second signal path 232 is the first connection type 251, and the third signal path 233 is the third connection type 253. Identical reference numbers may indicate identical or similar descriptions.

Referring to FIG. 3A, the electronic device 101 may include a plurality of conductive portions and a plurality of non-conductive portions. For example, a metal frame of the electronic device 101 may include the plurality of conductive portions. For example, the plurality of conductive portions may include a first conductive portion 301, a second conductive portion 302, a third conductive portion 303, a fourth conductive portion 304, a fifth conductive portion 305, a sixth conductive portion 306, a seventh conductive portion 307, an eighth conductive portion 308, and/or a ninth conductive portion 309. For example, the plurality of non-conductive portions may include a first non-conductive portion 311, a second non-conductive portion 312, a third non-conductive portion 313, a fourth non-conductive portion 314, a fifth non-conductive portion 315, a sixth non-conductive portion 316, a seventh non-conductive portion 317, an eighth non-conductive portion 318, a ninth non-conductive portion 319, a tenth non-conductive portion 320, and/or an eleventh non-conductive portion 321.

In some embodiments, the first conductive portion 301 may be formed between the tenth non-conductive portion 320 and the eleventh non-conductive portion 321. The second conductive portion 302 may be formed between the first non-conductive portion 311 and the second non-conductive portion 312. The third conductive portion 303 may be formed between the second non-conductive portion 312 and the third non-conductive portion 313. The fourth conductive portion 304 may be formed between the third non-conductive portion 313 and the fourth non-conductive portion 314. The fifth conductive portion 305 may be formed between the fourth non-conductive portion 314 and the fifth non-conductive portion 315. The sixth conductive portion 306 may be formed between the fifth non-conductive portion 315 and the sixth non-conductive portion 316. The seventh conductive portion 307 may be formed between the seventh non-conductive portion 317 and the eighth non-conductive portion 318. The eighth conductive portion 308 may be formed between the eighth non-conductive portion 318 and the ninth conductive portion 319. The ninth conductive portion 309 may be formed between the ninth non-conductive portion 319 and the tenth non-conductive portion 320. At least a portion of the first conductive portion 301, the second conductive portion 302, the third conductive portion 303, the fourth conductive portion 304, the fifth conductive portion 305, the sixth conductive portion 306, the seventh conductive portion 307, the eighth conductive portion 308, and/or the ninth conductive portion 309 may be used as a radiator of an antenna for transmitting a wireless signal.

In some embodiments, the conductive portion 210 may be a conductive portion of the metal frame of the electronic device 101. For example, the conductive portion 210 may include the fourth conductive portion 304. The fourth conductive portion 304 may be used as a radiator for the NFC communication. The coil 230 may be used as a radiator for the NFC communication. The NFC circuitry 220 may include transmission terminals. For example, the NFC circuitry 220 may include the first terminal 221 and the second terminal 222. The first terminal 221 of the NFC circuitry 220 may be connected to the fourth conductive portion 304 through a first signal path 331. For example, the first signal path 331 may include a transmission line portion (e.g., a feeding line) and/or a connection member (e.g., a C-clip). The transmission line portion may be electrically connected to the NFC circuitry 220 on the PCB.

In some embodiments, the connection member may be electrically connected to the fourth conductive portion 304 through contact with the fourth conductive portion 304. For example, the transmission line portion and the connection member may be electrically connected on the PCB. The second terminal 222 of the NFC circuitry 220 may be connected to the coil 230 through a second signal path 332. For example, the second signal path 332 may include the transmission line portion. An end of the second signal path 332 may be electrically connected to the NFC circuitry 220 on the PCB. Another end of the second signal path 332 may be connected to the coil 230. As a non-limiting example, the second signal path 332 may include a FPCB connected to the PCB on which the NFC circuitry 220 is disposed.

In some embodiments, the NFC circuitry 220 may operate in a differential mode. The NFC circuitry 220 may output a first signal of a differential output through the first terminal 221. The NFC circuitry 220 may transmit the first signal from the first terminal 221 to the fourth conductive portion 304 through the first signal path 331. The NFC circuitry 220 may output a second signal of the differential output through the second terminal 222. The NFC circuitry 220 may transmit the second signal from the second terminal 222 to the coil 230 through the second signal path 332. A first phase of the first signal and a second phase of the second signal may be different by about 180 degrees. The fourth conductive portion 304 may be connected to a ground portion (e.g., the first ground portion 262*a*) through a first ground path 341. For example, the ground portion may be a portion of a ground area (e.g., the PCB on which the NFC circuitry 220 is disposed, the support member of the electronic device 101). For example, the first ground path 341 may include a transmission line portion and/or a connection member (e.g., C-clip). The connection member may be disposed to connect the transmission line portion and the conductive portion 304. The transmission line portion may be connected to the ground portion. The coil 230 may be connected to a ground portion (e.g., the second ground portion 262*b*) through a second ground path 342. For example, the ground portion may be a portion of the PCB on which the NFC circuitry 220 is disposed or a portion of the support member of the electronic device 101. For example, the second ground path 342 may include a transmission line portion. The transmission line portion may be connected to a ground portion. As a non-limiting example, the second ground path 342 may further include a connection member (e.g., flexible PCB (FPCB)) for the coil 230. For example, the ground portion may be included in a hinge portion of the electronic device 101. The first ground path 341 and the second ground path 342 are not directly connected, and the conductive portion 304 and the coil 230 may be in an open state.

In FIG. 3A, a ground portion (e.g., the first ground portion 262*a*) in which the fourth conductive portion 304 is connected through the first ground path 341 and a ground portion (e.g., the second ground portion 262*b*) in which the coil 230 is connected through the first ground path 341 are described as independent, but embodiments of the disclosure are not limited thereto. According to an embodiment, as illustrated in FIG. 3B, a transmission line connected to the fourth conductive portion 304 and a transmission line connected to the coil 230 are short-circuited, and the short-circuited portion may be connected to a ground portion (e.g., the ground portion 263). For example, the ground portion may be a portion of a ground area (e.g., the PCB on which the NFC circuitry 220 is disposed, the support member of the electronic device 101).

FIG. 3A and FIG. 3B illustrate an example in which a conductive portion (e.g., the fourth conductive portion 304) disposed on the top of a housing (e.g., the metal frame) of the electronic device 101 is used as a radiator for the NFC circuitry 220, but embodiments of the disclosure are not limited thereto. For example, another conductive portion (e.g., the first conductive portion 301, the second conductive portion 302, the third conductive portion 303, the fifth conductive portion 305, the sixth conductive portion 306, the seventh conductive portion 307, the eighth conductive portion 308, and/or the ninth conductive portion 309) may be used as the conductive portion 210 connected to the NFC circuitry 220. Additionally, for example, in addition to the housing of the electronic device 101, a separate conductive portion (e.g., conductive pattern, conductive patch, or metal structure) may be used as the conductive portion 210 connected to the NFC circuitry 220.

Figure 3C:
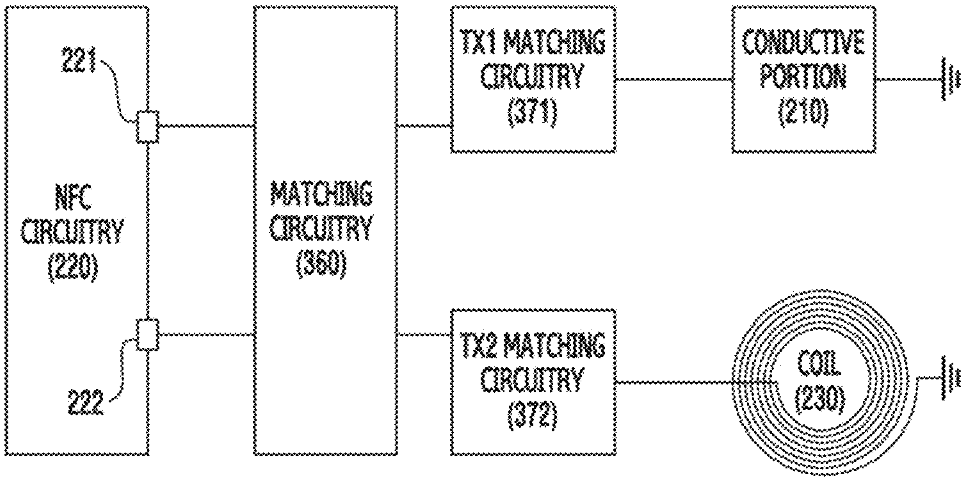

Referring to FIG. 3C, the electronic device 101 may include at least one matching circuitry for the NFC circuitry 220. For example, the at least one matching circuitry may be disposed on the PCB on which the NFC circuitry 220 is disposed. Each matching circuitry of the at least one matching circuitry may include at least one passive element (e.g., inductor or capacitor). For example, the electronic device 101 may include a matching circuitry 360 for two radiators (e.g., the conductive portion 210 or the coil 230). The matching circuitry 360 may be referred to as a common matching circuitry. For example, the electronic device 101 may include a first matching circuitry 371 and a second matching circuitry 372. The first matching circuitry 371 may be used for impedance matching of a first signal of the first terminal 221 of the NFC circuitry 220. The second matching circuitry 372 may be used for impedance matching of a second signal of the second terminal 222 of the NFC circuitry 220. The first signal and the second signal may be signals for (or may correspond to) a differential output of the NFC circuitry 220. For example, a first phase of the first signal and a second phase of the second signal may be different by about 180 degrees.

Figure 3D:
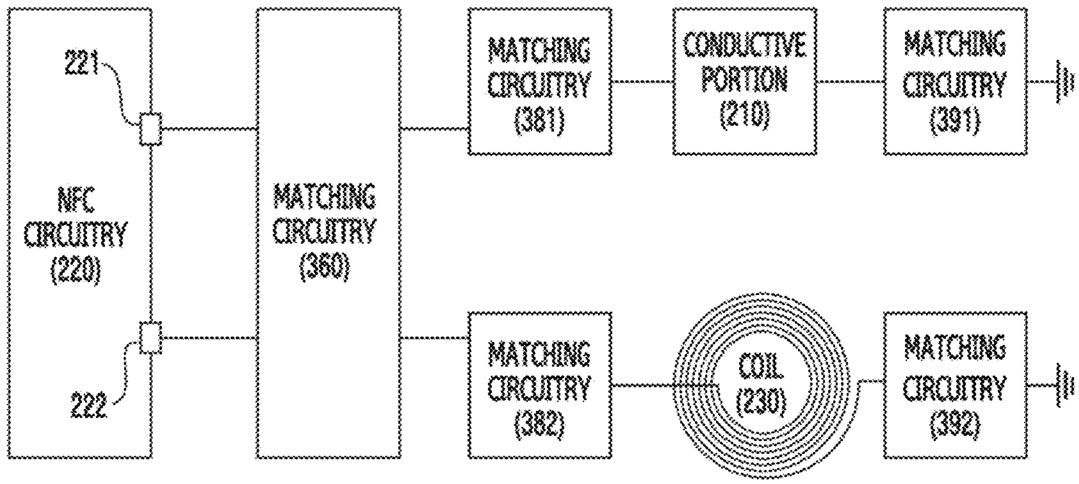

Referring to FIG. 3D, the electronic device 101 may include at least one matching circuitry for the NFC circuitry 220. Each matching circuitry of the at least one matching circuitry may include at least one passive element (e.g., inductor or capacitor). For example, the electronic device 101 may include the matching circuitry 360 for two radiators (e.g., the conductive portion 210 or the coil 230). For example, the electronic device 101 may include a first matching circuitry 381 and/or a second matching circuitry 382. The matching circuitry 360 may be configured to output a sine wave signal not only through matching of impedance but also through filtering of a square wave signal outputted from the NFC circuitry 220. In some cases, it may not be easy to perform impedance matching by significantly changing capacitance or inductance in the matching circuitry 360. The first matching circuitry 381 may be used for impedance matching of the first signal of the first terminal 221 of the NFC circuitry 220. The second matching circuitry 382 may be used for impedance matching of the second signal of the second terminal 222 of the NFC circuitry 220. The first signal and the second signal may be signals for (or may correspond to) a differential output of the NFC circuitry 220.

In some embodiments, if inductance of the coil 230 is fixed, a frequency range and/or an impedance range for impedance matching in the first matching circuitry 381 may be limited. According to an embodiment, the electronic device 101 may further include a matching circuitry (e.g., a fourth matching circuitry 392) connected to an end of the coil 230 for more efficient impedance matching. For example, if inductance of the conductive portion 210 is fixed, a frequency range and/or an impedance range for impedance matching in the second matching circuitry 382 may also be limited. According to an embodiment, the electronic device 101 may further include a matching circuitry (e.g., a third matching circuitry 391) connected to an end of the conductive portion 210 for more efficient impedance matching. Although FIG. 3D illustrates an example including the third matching circuitry 391 and the fourth matching circuitry 392, as a non-limiting example, one of the third matching circuitry 391 and the fourth matching circuitry 392 may be omitted in other embodiments of the disclosure.

FIGS. 3A, 3B, 3C, and 3D illustrate an example in which the first signal is a positive signal and the second signal is a negative signal, but embodiments of the disclosure are not limited thereto. The first signal may be a negative signal, and the second signal may be a positive signal. As polarity of the differential output changes, directions of signals fed to each radiator (e.g., the conductive portion 210, or the coil 230) may vary.

The NFC communication is a wireless communication technology that enables two devices to recognize each other and exchange data in a band of about 13.56 MHz (e.g., greater than or equal to about 13.56 MHz and less than or equal to 13.57 MHz). The two devices may be referred to as a reader and a terminal (e.g., the electronic device 101). The reader may generate a magnetic field, and the terminal may recognize information from the reader through the magnetic field. The terminal may include an antenna referred to as an NFC loop. In order to extract information through the NFC loop, a magnetic field evenly passing through the entire NFC loop may be required. The influence (due to the magnetic field passing through the NFC loop) may be identified through a degree of coupling. The degree of coupling may indicate a ratio of a magnetic flux (e.g., magnetic flux made by an NFC reader) passing through the NFC loop of the terminal and a total magnetic flux emitted by the NFC reader. For example, an NFC loop may include a conductive connection member. As a magnetic flux passes throughout the NFC loop when an NFC portion located at the top of a terminal including the NFC loop approaches the reader, coupling occurs. As another example, an NFC loop may include a ground connection member. When a radiator (e.g., the conductive portion 210), for example, located at the top of the terminal including the NFC loop approaches the reader, the NFC loop may be divided into an upper loop and a lower loop based on the ground. Coupling may occur with a magnetic flux passing through only the upper loop.

In some embodiments, when two radiators (e.g., the conductive portion 210, or the coil 230) of the electronic device 101 are spaced far away, a structure (e.g., a connection structure of FIGS. 3A to 3D) in which the two radiators are connected through ground paths may be advantageous for communication performance. If the two radiators are connected through a ground area (e.g., a ground area corresponding to a portion of the PCB), loops may be divided based on the ground. For example, the loops may include an upper loop for the conductive portion 210 located relatively at the top of the electronic device 101 and a lower loop for the coil 230 located at the bottom of the electronic device 101.

In the related art (without divided two loops), if a conductive portion (such as the conductive portion 210 of the electronic device 101) approaches a reader (e.g., an external electronic device), a magnetic field may be concentrated on the upper loop. If the conductive portion (such as the conductive portion 210) is connected through a conductive connection member other than the ground area, a sufficient magnetic field may not reach the coil (such as the coil 230) located at the bottom, and thus, a degree of coupling may be lowered. Due to a low degree of coupling, information from the reader may be difficult to accurately recognize. However, in the embodiments of the disclosure, as the two loops are divided through the ground area, a magnetic field received from the reader may more effectively reach the conductive portion 210 of the electronic device 101, and thus, recognition performance of information may be improved.

In a case that two radiators (e.g., the conductive portion 210, or the coil 230) of the electronic device 101 are spaced far away, the structure (e.g., the connection structure of FIGS. 3A to 3D) in which two radiators are connected through ground paths may be advantageous in terms of simplifying circuitry wiring. Since the wiring may be arranged from the bottom to the top of the electronic device 101 when attempting to connect two radiators (e.g., the conductive portion 210 and the coil 230) through separate conductive connection members, circuitry wiring may be complicated. On the other hand, since it may be only necessary to connect to different ground portions in the ground area when attempting to connect two radiators (e.g., the conductive portion 210 and the coil 230) through the ground area, circuitry wiring may be simplified. As an example, in a foldable-type electronic device including two housing portions (e.g., an upper housing part and a lower housing part), the NFC circuitry 220 and the conductive portion 210 may be located in the upper housing part and the coil 230 is located in the lower housing part. A portion (e.g., a first ground portion 262*a*) of a PCB in the upper housing part may be connected to the conductive portion 210, and another portion (e.g., a second ground portion 262*b*) of the PCB may be connected to the coil 230. As two radiators are electrically connected through different ground portions in the PCB, unnecessary circuitry wiring may be reduced.

Figure 4A:
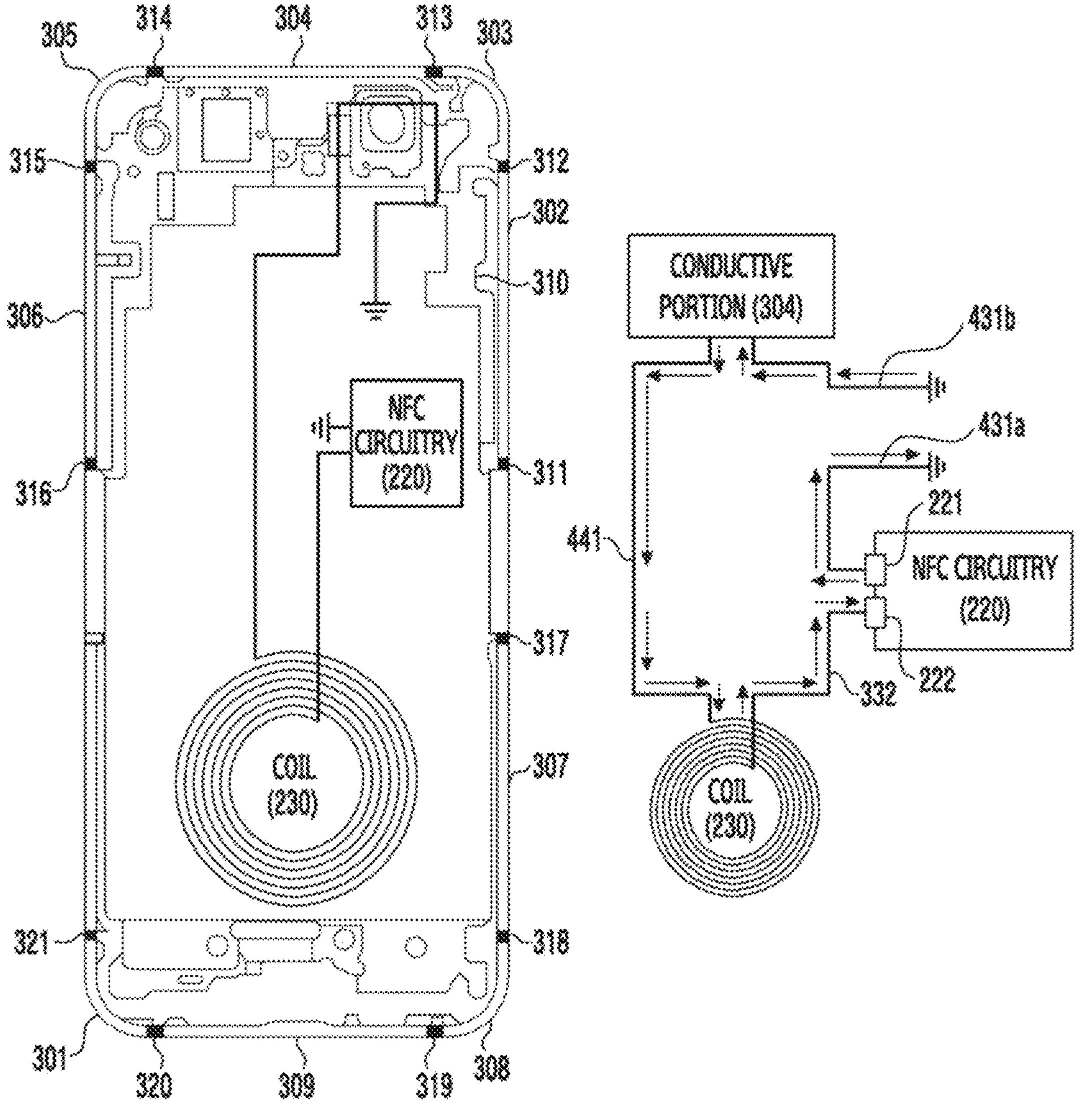
FIGS. 4A and 4B illustrate an example of an electronic device including an NFC circuitry using a conductive portion and a coil.
Figure 4B:
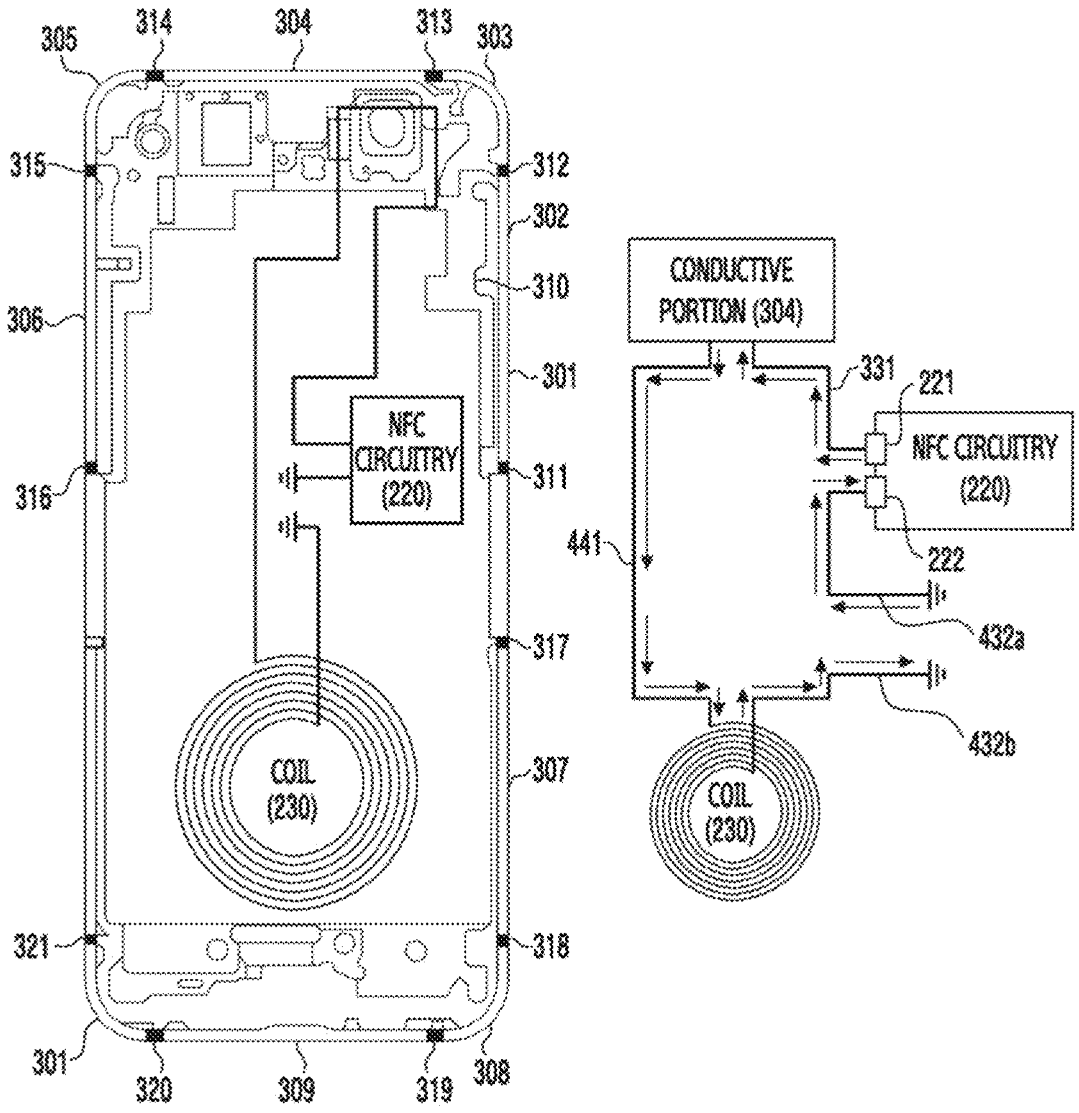

FIGS. 4A and 4B illustrate an example of an electronic device (e.g., the electronic device 101) including an NFC circuitry (e.g., the NFC circuitry 220) using a conductive portion (e.g., the conductive portion 210) and a coil (e.g., the coil 230). FIGS. 4A and 4B illustrate an example of a circuitry in which a first signal path 231 is a second connection type 252 or a second signal path 232 is the second connection type 253. Identical reference numbers may indicate identical or similar descriptions.

Referring to FIG. 4A, the electronic device 101 may include a plurality of conductive portions and a plurality of non-conductive portions. For example, a metal frame of the electronic device 101 may include the plurality of conductive portions. For example, the plurality of conductive portions may include a first conductive portion 301, a second conductive portion 302, a third conductive portion 303, a fourth conductive portion 304, a fifth conductive portion 305, a sixth conductive portion 306, a seventh conductive portion 307, an eighth conductive portion 308, and/or a ninth conductive portion 309. For example, the plurality of non-conductive portions may include a first non-conductive portion 311, a second non-conductive portion 312, a third non-conductive portion 313, a fourth non-conductive portion 314, a fifth non-conductive portion 315, a sixth non-conductive portion 316, a seventh non-conductive portion 317, an eighth non-conductive portion 318, a ninth non-conductive portion 319, a tenth non-conductive portion 320, and/or an eleventh non-conductive portion 321. The descriptions of FIG. 3A may be referred for the conductive portions and the non-conductive portions.

According to embodiments, the conductive portion 210 may be a conductive portion of the metal frame of the electronic device 101. For example, the conductive portion

210 may include the fourth conductive portion 304. The fourth conductive portion 304 may be used as a radiator for NFC communication. The coil 230 may be used as a radiator for the NFC communication. The NFC circuitry 220 may include transmission terminals. For example, the NFC circuitry 220 may include a first terminal 221 and a second terminal 222. The first terminal 221 of the NFC circuitry 220 may be connected to a ground portion through a first ground path 431*a*. For example, the ground portion may be a portion of a ground area (e.g., a portion of a PCB on which the NFC circuitry 220 is disposed, a support member of the electronic device 101). The second terminal 222 of the NFC circuitry 220 may be connected to the coil 230 through a second signal path 332. The coil 230 may be connected to the fourth conductive portion 304 through a third transmission path 441. A second signal of a differential output of the NFC circuitry 220 described later may be transmitted from the coil 230 to the fourth conductive portion 304 through the third transmission path 441. For example, the third transmission path 441 may include a transmission line portion (e.g., feeding line) and/or a connection member (e.g., C-clip) connected on the PCB. The connection member may be used to electrically connect the fourth conductive portion 304 and the transmission line portion. As a non-limiting example, the third transmission path 441 may further include a connection member (e.g., FPCB) for electrical connection with the coil 230. The fourth conductive portion 304 may be connected to a ground portion through a second ground path 431*b*. For example, the ground portion may be a portion of a ground area (e.g., a portion of the PCB on which the NFC circuitry 220 is disposed, or a support member of the electronic device 101).

FIG. 4A illustrates an example in which an output (e.g., the second signal) of the second terminal 222 among the differential output of the NFC circuitry 220 is provided to the coil 230 and the fourth conductive portion 304, and an output (e.g., the first signal) of the first terminal 221 is provided to the ground, but embodiments of the disclosure are not limited thereto. According to another embodiment, as illustrated in FIG. 4B, instead of the second signal, the first signal may be provided to the coil 230 and the fourth conductive portion 304.

Referring to FIG. 4B, the first terminal 221 of the NFC circuitry 220 may be connected to the fourth conductive portion 304 through a first signal path 331. For example, the first signal path 331 may include a transmission line portion and/or a connection member (e.g., C-clip). The transmission line portion may be electrically connected to the NFC circuitry 220 on the PCB. The connection member may be electrically connected to the fourth conductive portion 304 through contact with the fourth conductive portion 304. For example, the transmission line portion and the connection member may be electrically connected on the PCB. The fourth conductive portion 304 may be connected to the coil 230 through the third transmission path 441. The first signal of the differential output of the NFC circuitry 220 may be transmitted from the fourth conductive portion 304 to the coil 230 through the third transmission path 441. For example, the third transmission path 441 may include a transmission line portion (e.g., feeding line) and/or a connection member (e.g., C-clip) connected on the PCB. The connection member may be used to electrically connect the fourth conductive portion 304 and the transmission line portion. As a non-limiting example, the third transmission path 441 may further include a connection member (e.g., FPCB) for electrical connection with the coil 230. The second terminal 222 of the NFC circuitry 220 may be connected to a ground portion through a first ground path 432*a*. For example, the ground portion may be a portion of a ground area (e.g., a portion of the PCB on which the NFC circuitry 220 is disposed, a support member of the electronic device 101). For example, the first ground path 432*a* may include a transmission line portion disposed on the PCB. The coil 230 may be connected to the ground portion through a second ground path 432*b*. The ground portion may be a portion of the ground area (e.g., the portion of the PCB on which the NFC circuitry 220 is disposed, the support member of the electronic device 101). For example, the second ground path 432*b* may include the transmission line portion disposed on the PCB. As a non-limiting example, the first ground path 432*a* or the second ground path 432*b* may further include a connection member in addition to the transmission line portion. As an example, the connection member may include a line on an FPCB, which is connected to the coil 230. A ground portion, which is connected through the connection member, may correspond to a hinge portion of the electronic device 101.

Figure 5:
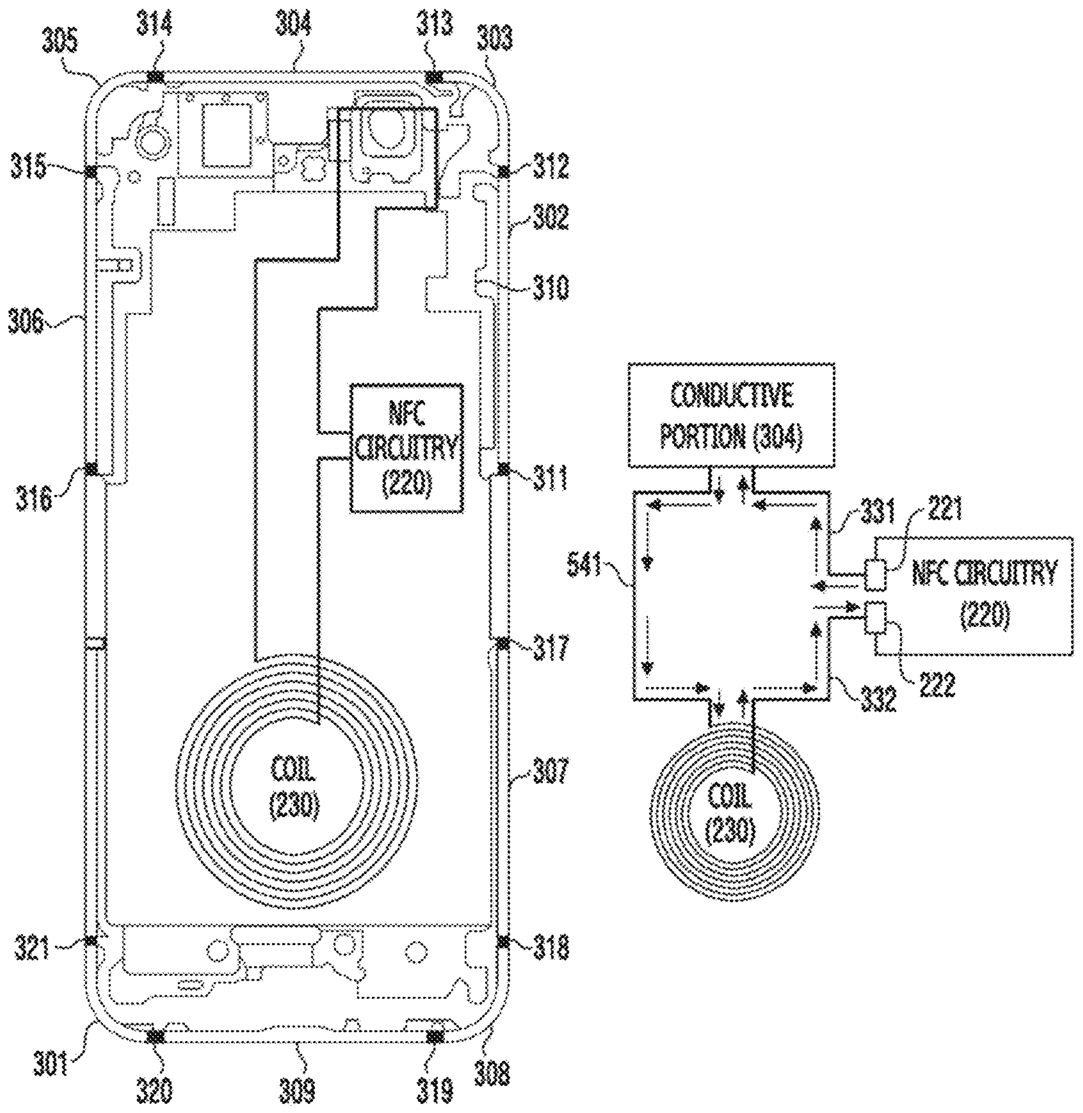
FIG. 5 illustrates an example of an electronic device including an NFC circuitry using a conductive portion and a coil.

FIG. 5 illustrates an example of an electronic device including a conductive portion (e.g., a conductive portion 210) and an NFC circuitry (e.g., an NFC circuitry 220) using a coil (e.g., a coil 230). FIG. 5 illustrates an example of a circuitry in which a third signal path 233 is a first connection type 251. Identical reference numbers may indicate identical or similar descriptions.

Referring to FIG. 5, an electronic device 101 may include a plurality of conductive portions and a plurality of non-conductive portions. For example, a metal frame of the electronic device 101 may include the plurality of conductive portions. For example, the plurality of conductive portions may include a first conductive portion 301, a second conductive portion 302, a third conductive portion 303, a fourth conductive portion 304, a fifth conductive portion 305, a sixth conductive portion 306, a seventh conductive portion 307, an eighth conductive portion 308, and/or a ninth conductive portion 309. For example, the plurality of non-conductive portions may include a first non-conductive portion 311, a second non-conductive portion 312, a third non-conductive portion 313, a fourth non-conductive portion 314, a fifth non-conductive portion 315, a sixth non-conductive portion 316, a seventh non-conductive portion 317, an eighth non-conductive portion 318, a ninth non-conductive portion 319, a tenth non-conductive portion 320, and/or an eleventh non-conductive portion 321. The descriptions of FIG. 3A may be referred for the conductive portions and the non-conductive portions.

According to embodiments, the conductive portion 210 may be a conductive portion of a metal frame of the electronic device 101. For example, the conductive portion 210 may include the fourth conductive portion 304. The fourth conductive portion 304 may be used as a radiator for NFC communication. The coil 230 may be used as a radiator for the NFC communication. The NFC circuitry 220 may include transmission terminals. The NFC circuitry 220 may output a first signal of a differential output through a first terminal 221. The NFC circuitry 220 may transmit the first signal from the first terminal 221 to the fourth conductive portion 304 through a first signal path 331. The NFC circuitry 220 may output a second signal of the differential output through a second terminal 222. The NFC circuitry 220 may transmit the second signal from the second terminal 222 to the coil 230 through a second signal path 332. A first phase of the first signal and a second phase of the second signal may be different by about 180 degrees.

The fourth conductive portion 304 and the coil 230 may be electrically connected to each other through a third transmission path 541. The first signal may be transmitted from the fourth conductive portion 304 to the coil 230 through the third transmission path 541. The second signal may be transmitted from the coil 230 to the fourth conductive portion 304 through the third transmission path 541. The third transmission path 541 may correspond to a first connection type 251. For example, the third transmission path 541 may include a transmission line portion (e.g., feeding line) and/or a connection member (e.g., C-clip) connected on the PCB. The connection member may be used to electrically connect the fourth conductive portion 304 and the transmission line portion. As a non-limiting example, the third transmission path 541 may further include a connection member (e.g., FPCB) for electrical connection with the coil 230.

Figure 6A:
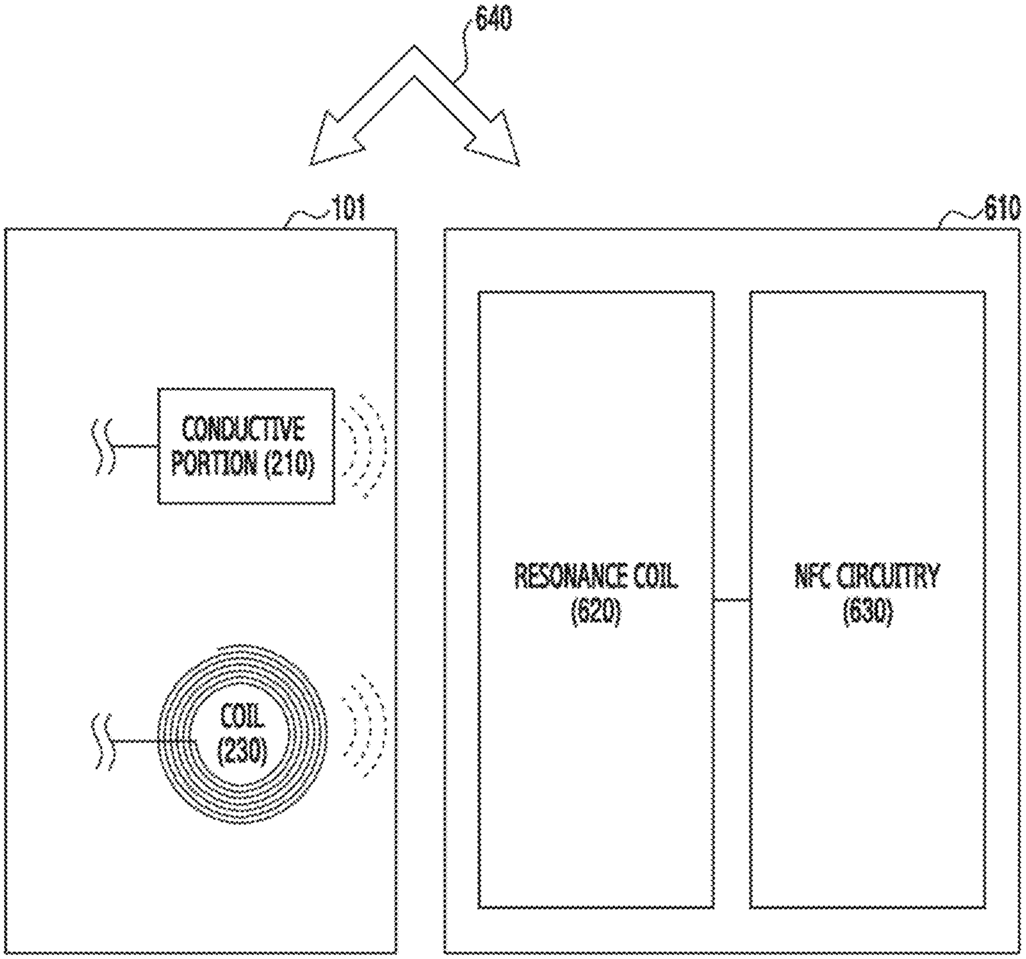
FIG. 6A is a diagram illustrating NFC communication of an electronic device.

FIG. 6A is a diagram illustrating NFC communication of an electronic device. An electronic device 101 may operate in a card mode or a reader mode, through an NFC circuitry (e.g., the NFC circuitry 220). For example, the NFC communication refers to a short-range wireless communication technology that transmits and receives a signal in a band of about 13.56 MHz (e.g., greater than or equal to about 13.56 MHz and less than or equal to 13.57 MHz).

Referring to FIG. 6A, the electronic device 101 may include a conductive portion 210 and a coil 230. For example, in case that the electronic device 101 operates in the reader mode, the electronic device 101 may communicate with an external electronic device 610 (e.g., card). The electronic device 101 may transmit a wireless signal in an NFC frequency band (e.g., 13.56 MHz band), through each of the conductive portion 210 and the coil 230. The external electronic device 610 may include a resonance coil 620 and an NFC circuitry 630. For example, the NFC circuitry 630 may include a plurality of resistors (e.g., a first resistor or a second resistor) and a switching circuitry. For example, the switching circuitry may electrically connect the first resistor among a plurality of resistors and the resonance coil 620. As the wireless signal is transmitted to the resonance coil 620, the switching circuitry of the NFC circuitry 630 may be switched. As an example, the switching circuitry may change a connection resistor from the first resistor to the second resistor. The switching circuitry may electrically connect the second resistor among the plurality of resistors and the resonance coil 620. Due to load modulation according to a change in the resistance of the external electronic device 610 (e.g., a change from the first resistance to the second resistance), a voltage induced in an inductor (e.g., the conductive portion 210 or the coil 230) of the electronic device 101 may vary. The electronic device 101 may obtain information on the external electronic device 610 through a change in the voltage.

According to embodiments, the electronic device 101 may use both the conductive portion 210 and the coil 230 as a radiator. Communication between radiators (e.g., the conductive portion 210, or the coil 230) of the electronic device 101 and the resonance coil 620 of the external electronic device 610 may be a coupling between inductors. Due to a magnetic field between the radiators of the electronic device 101 and the resonance coil 620, a coupling coefficient 640 may be determined. For example, the electronic device 101 may separately include a matching circuitry (e.g., a first matching circuitry 371) for the conductive portion 210, and a magnetic field between the conductive portion 210 and the resonance coil 620 may be formed. The electronic device 101 may separately include a matching circuitry (e.g., a second matching circuitry 372) for the coil 230, and a magnetic field between the coil 230 and the resonance coil 620 may be formed. Since a voltage change is detected based on each independent ground, the NFC communication performance of the electronic device 101 may be improved.

Figure 6B:
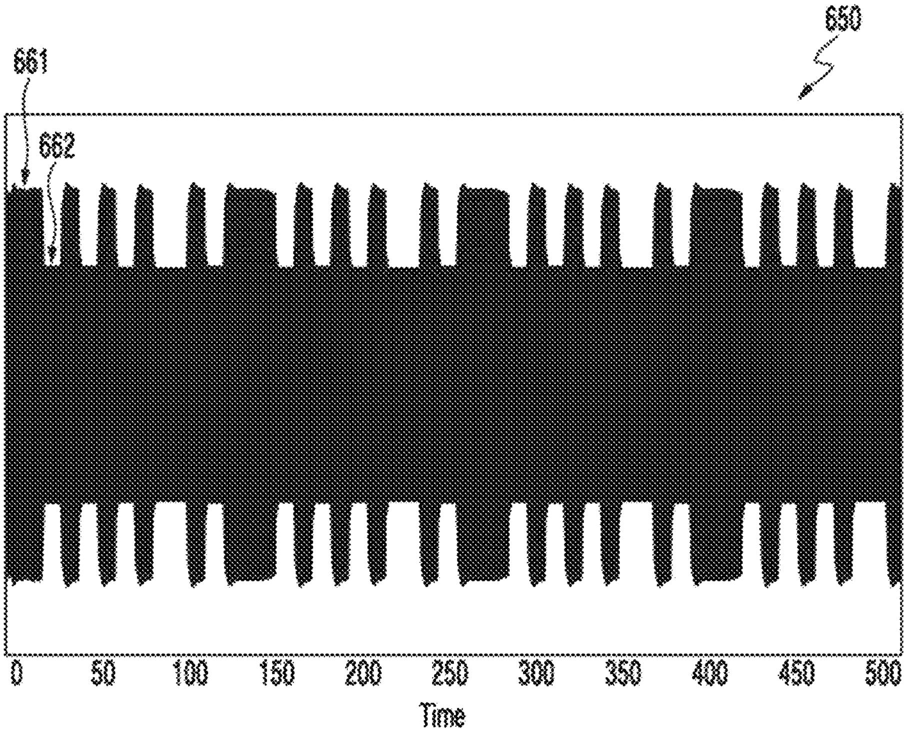
FIG. 6B illustrates an example of a voltage change in an NFC reader mode.

FIG. 6B illustrates an example of a voltage change in an NFC reader mode.

Referring to FIG. 6B, a graph 650 represents a voltage change of NFC communication using both the conductive portion 210 and the coil 230 of the electronic device 101. A horizontal axis of the graph 650 represents a time (unit: microsecond (us)) and a vertical axis of the graph 650 represents a voltage. For example, a peak voltage at a first point 661 represents about 14.476V, and a peak voltage at a second point 662 represents about 8.709V. The electronic device 101 may recognize an external electronic device 610 through a pattern appearing through a voltage change, such as the first point 661 and the second point 662.

FIGS. 6A and 6B illustrate an example in which the electronic device 101 operates in the reader mode, but embodiments of the disclosure are not limited thereto. The external electronic device 610 may be an NFC reader, and the electronic device 101 may operate in an NFC card mode. In this case, load modulation may be performed in the electronic device 101 according to a signal transmitted from the external electronic device 610. In the external electronic device 610, magnetic fields of each of the conductive portion 210 and the coil 230 may be changed due to the load modulation. Due to a change in the magnetic field, information on the electronic device 101 may be obtained through an induced voltage.

Figure 7A:
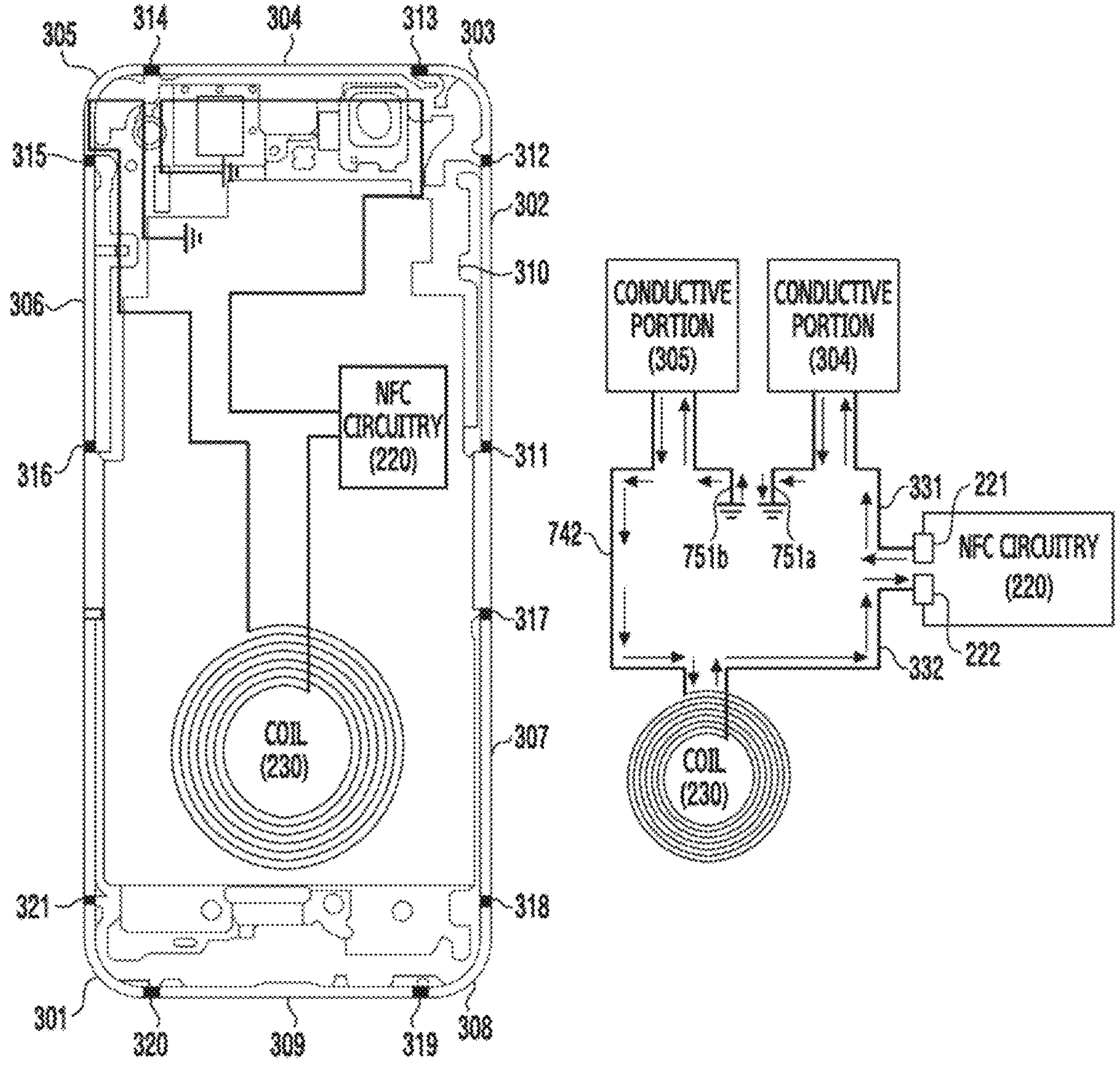
FIGS. 7A, 7B, and 7C illustrate an example of an electronic device including an NFC circuitry using a plurality of conductive portions.
Figure 7B:
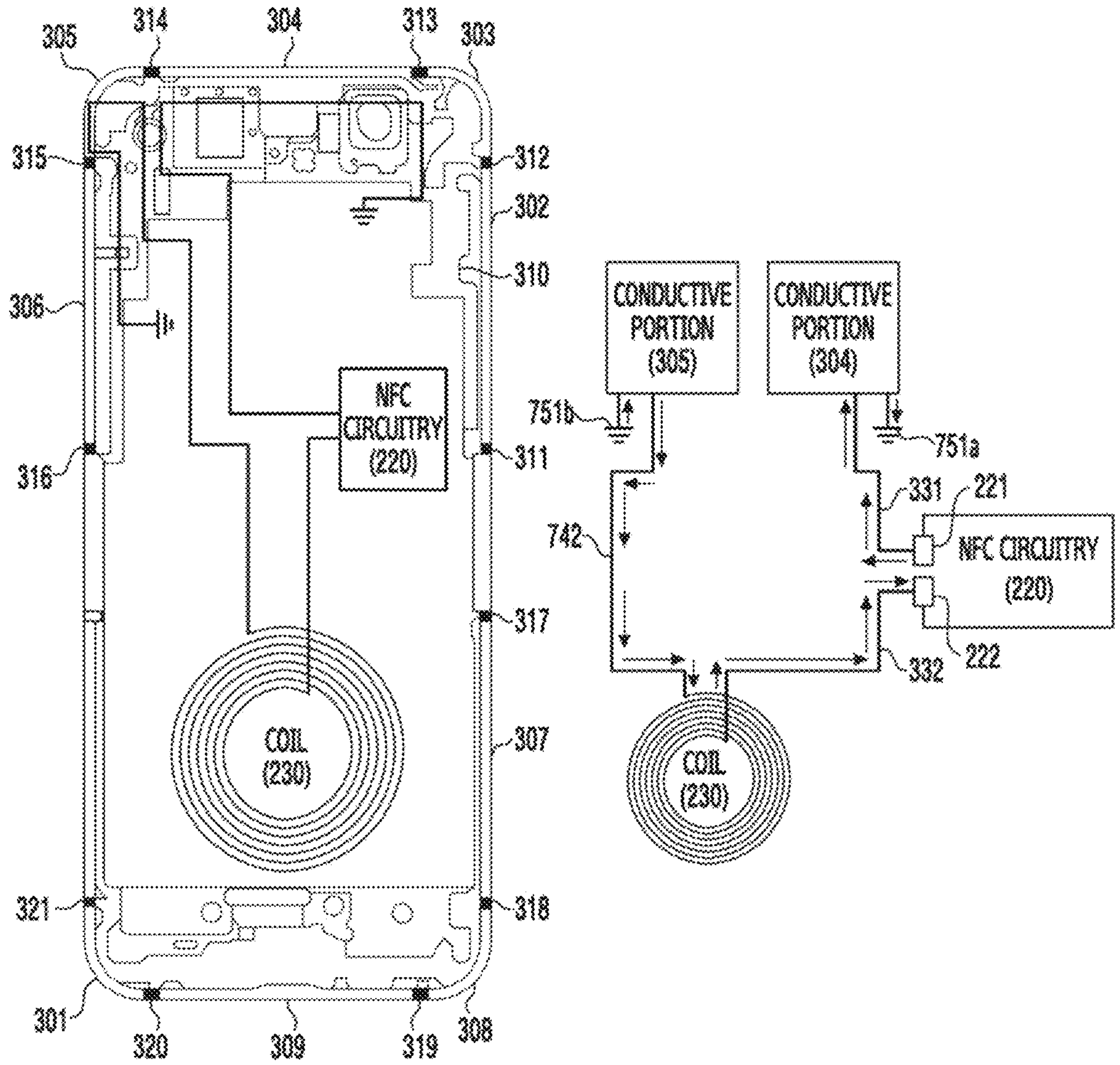
Figure 7C:
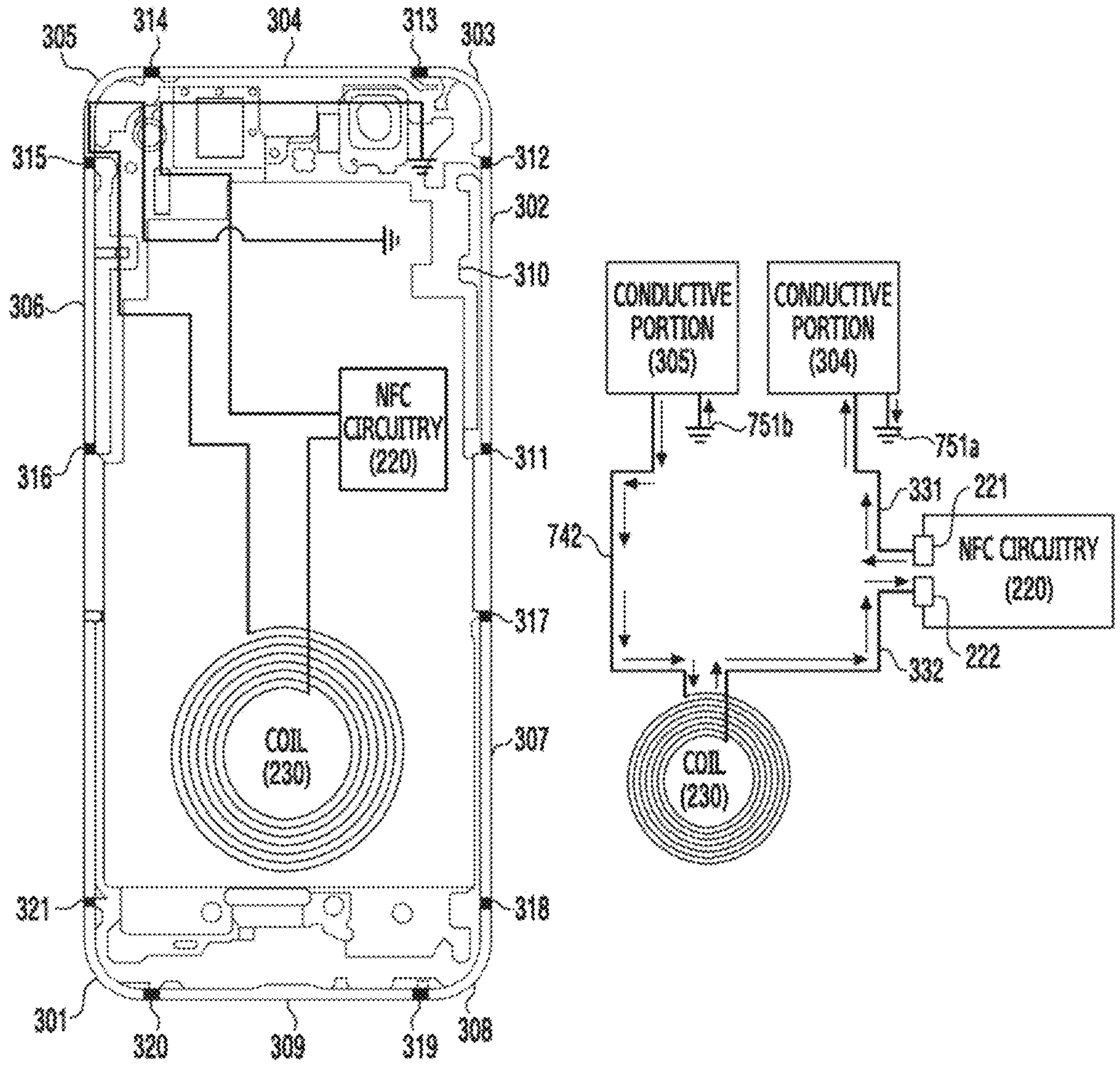

FIGS. 7A, 7B, and 7C illustrate an example of an electronic device (e.g., an electronic devices 101) including an NFC circuitry (e.g., an NFC circuitry 220) using a plurality of conductive portions. Identical reference numbers may indicate identical or similar descriptions.

Referring to FIG. 7A, the electronic device 101 may include a plurality of conductive portions and a plurality of non-conductive portions. For example, a metal frame of the electronic device 101 may include the plurality of conductive portions. For example, the plurality of conductive portions may include a first conductive portion 301, a second conductive portion 302, a third conductive portion 303, a fourth conductive portion 304, a fifth conductive portion 305, a sixth conductive portion 306, a seventh conductive portion 307, an eighth conductive portion 308, and a ninth conductive portion 309. For example, the plurality of non-conductive portions may include a first non-conductive portion 311, a second non-conductive portion 312, a third non-conductive portion 313, a fourth non-conductive portion 314, a fifth non-conductive portion 315, a sixth non-conductive portion 316, a seventh non-conductive portion 317, an eighth non-conductive portion 318, a ninth non-conductive portion 319, a tenth non-conductive portion 320, and/or an eleventh non-conductive portion 321. The descriptions of FIG. 3A may be referred for the conductive portions and the non-conductive portions.

According to an embodiment, in addition to the conductive portion 210, an additional conductive portion may be used as a radiator for transmitting or receiving a signal of the NFC circuitry 220. For example, two or more conductive portions may be used as radiators for transmitting or receiving a signal of the NFC circuitry 220. For example, the two or more conductive portions may include the fourth conductive portion 304 and the fifth conductive portion 305. The fourth conductive portion 304 and the fifth conductive portion 305 may be used as a radiator for the NFC communication. The coil 230 may be used as a radiator for the NFC communication. The NFC circuitry 220 may include transmission terminals. For example, the NFC circuitry 220 may include a first terminal 221 and a second terminal 222. The first terminal 221 of the NFC circuitry 220 may be connected to the fourth conductive portion 304 through a first signal path 331. The second terminal 222 of the NFC circuitry 220 may be connected to the coil 230 through a second signal path 332.

The fourth conductive portion 304 may be connected to a ground portion through a first ground path 751*a*. For example, the ground portion may be a portion of a ground area (e.g., a portion of the PCB on which the NFC circuitry 220 is disposed, or a support member of the electronic device 101). The fifth conductive portion 305 may be connected to the ground portion through a second ground path 751*b*. For example, the ground portion may be a portion of a ground area (e.g., the portion of the PCB on which the NFC circuitry 220 is disposed, or the support member of the electronic device 101). The fifth conductive portion 305 may be electrically connected to the coil 230 through a third transmission path 742. The second signal may be transmitted from the coil 230 to the fifth conductive portion 305 through the third transmission path 742. The third transmission path 742 may correspond to a first connection type 251. For example, the third transmission path 742 may include a transmission line portion and/or a connection member (e.g., C-clip) connected on the PCB. The connection member may be used to electrically connect the fifth conductive portion 305 to the transmission line portion. As a non-limiting example, the third transmission path 742 may further include a connection member (e.g., FPCB) for electrical connection with the coil 230.

FIG. 7A illustrates an example in which a ground portion connected to the fourth conductive portion 304 and a ground portion connected to the fifth conductive portion 305 are disposed adjacent to each other, but embodiments of the disclosure are not limited thereto. For example, unlike illustrated in FIG. 7A, the first ground path 751*a* and the second ground path 751*b* may be short-circuited to each other, and a portion of the first ground path 751*a* or the second ground path 751*b* may be connected to the same ground portion. For example, the fourth conductive portion 304 and the fifth conductive portion 305 may be connected to the ground portion, through a connection structure in a third connection type 253. As another example, as illustrated in FIG. 7B, the ground portion connected to the fourth conductive portion 304 and the ground portion connected to the fifth conductive portion 305 may be spaced apart from each other by a certain distance or more.

A direction of the feeding path illustrated in FIGS. 7A and 7B is exemplary and embodiments of the disclosure are not limited thereto. For example, as illustrated in FIG. 7C, a signal of the NFC circuitry 220 may flow on the fourth conductive portion 304 in a direction from the fourth non-conductive portion 314 to the third non-conductive portion 313, and flow on the fifth conductive portion 305 in a direction from the fifth non-conductive portion 315 to the fourth non-conductive portion 314. For example, regardless of a feeding location on the conductive portion, a location of the ground, a location of the segment, any circuitry connection structure that performs the NFC communication using a plurality of radiators (e.g., the fourth conductive portion 304, the fifth conductive portion 305, or the coil 230) connected to the NFC circuitry may be understood as an embodiment of the disclosure.

The electronic device 101 described through FIGS. 2 to 7C may perform the NFC communication through a plurality of radiators (e.g., the conductive portion 210, or the coil 230). In a card mode and/or a reader mode, an NFC communication area may be extended through the plurality of radiators. The expansion of the communication area in the card mode may be identified as a distance (hereinafter, a recognition distance) and/or a direction, which are capable of recognizing the electronic device 101 by an external electronic device (e.g., an NFC reader). The expansion of the communication area in the reader mode may be identified as a distance and/or a direction, which are capable of recognizing an external electronic device (e.g., a card equipped with an NFC module) by the electronic device 101. For example, the performance in the card mode is as follows.

TABLE 1

| | Mode | Performance in the card mode |
|---|---|---|
| First method | Circuitry structure using only the coil 230 without the conductive portion 210 | Top 0°: Unrecognizable<br>Top 45°: Unrecognizable<br>Bottom 90°: Unrecognizable<br>Bottom: about 88 mm |
| Second method | Circuitry structure of FIG. 3A | Top 0°: about 39 mm<br>Top 45°: about 29 mm<br>Top 90°: about 21 mm<br>Bottom: about 74 mm |
| Third method | Circuitry structure of FIG. 4A | Top 0°: about 34 mm<br>Top 45°: about 26 mm<br>Top 90°: about 15 mm<br>Bottom: about 74 mm |
| Fourth method | Circuitry structure of FIG. 5A | Top 0°: about 34 mm<br>Top 45°: about 16 mm<br>Top 90°: about 7 mm<br>Bottom: about 94 mm |

The 'top 0°' indicates a result of a recognition distance measurement in a situation where an angle between an upper surface (e.g., a surface of a PCB substrate) of the electronic device 101 and an external electronic device (e.g., the NFC reader) is 0°. The 'top 45°' indicates a result of a recognition distance measurement in a situation where the angle between the upper surface (e.g., the surface of the PCB substrate) of the electronic device 101 and the external electronic device (e.g., the NFC reader) is about 45°. The 'top 90°' indicates a result of a recognition distance measurement in a situation where the angle between the upper surface (e.g., the surface of the PCB substrate) of the electronic device 101 and the external electronic device (e.g., the NFC reader) is about 90°. The 'bottom' indicates a result of a recognition distance measurement in a situation where an angle between a lower surface (e.g., a surface of the PCB substrate) of the electronic device 101 and the external electronic device (e.g., the NFC reader) is about 0°.

For example, the performance in the reader mode is as follows.

TABLE 2

| | Mode | Performance in the reader mode |
|---|---|---|
| First method | Circuitry structure using only the coil 230 without the conductive portion 210 | NFC card in Type 1: about 40 mm<br>NFC card in Type 2: about 30 mm<br>NFC card in Type 3: about 16 mm |
| Second method | Circuitry structure of FIG. 3A | NFC card in Type 1: about 32 mm<br>NFC card in Type 2: about 23 mm<br>NFC card in Type 3: about 13 mm |
| Third method | Circuitry structure of FIG. 4A | NFC card in Type 1: about 27 mm<br>NFC card in Type 2: about 22 mm<br>NFC card in Type 3: about 12 mm |

TABLE 2-continued

| | Mode | Performance in the reader mode |
|---|---|---|
| Fourth method | Circuitry structure of FIG. 5A | NFC card in Type 1: about 42 mm<br>NFC card in Type 2: about 26 mm<br>NFC card in Type 3: about 14 mm |

Figure 8:
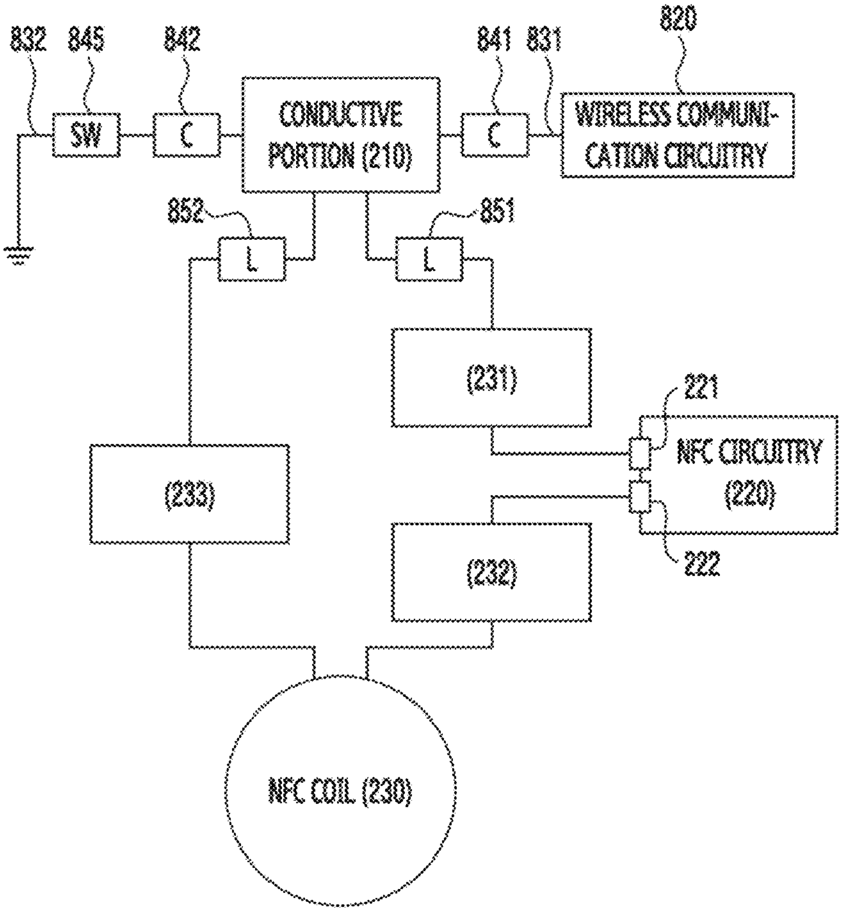
FIG. 8 illustrates a connection structure of a conductive portion for cellular communication and an NFC circuitry.

FIG. 8 illustrates a connection structure of a conductive portion (e.g., a conductive portion 210) for cellular communication and an NFC circuitry (e.g., an NFC circuitry 220). Identical reference numbers may indicate identical or similar descriptions.

Referring to FIG. 8, an electronic device 101 may include a conductive portion 210, an NFC circuitry 220, and a coil 230. The conductive portion 210 may be used as a radiator for NFC communication. The coil 230 may be used as a radiator for the NFC communication. The NFC circuitry 220 may operate in a differential mode. The NFC circuitry 220 may output a first signal of a differential output through a first terminal 221. The NFC circuitry 220 may transmit the first signal from the first terminal 221 to the conductive portion 210 through a first signal path 231. The NFC circuitry 220 may output a second signal of the differential output through a second terminal 222. The NFC circuitry 220 may transmit the second signal from the second terminal 222 to the coil 230 through a second signal path 232. For example, a first phase of the first signal and a second phase of the second signal may be different by about 180 degrees.

According to an embodiment, the conductive portion 210 may be used as a radiator for communication (hereinafter, referred to as non-NFC communication) different from NFC communication, such as cellular communication. The electronic device 101 may include a wireless communication circuitry 820. For example, the wireless communication circuitry 820 may be configured to process (e.g., DAC, ADC, up-conversion, down-conversion, frequency filtering, or phase conversion) a RF signal in a frequency band of Wi-Fi communication or the cellular communication. The wireless communication circuitry 820 may radiate the RF signal through the conductive portion 210 or receive the RF signal from an external electronic device (e.g., the electronic device 102, the electronic device 104, or the server 108). For example, the NFC circuitry 220 and the wireless communication circuitry 820 may share the conductive portion 210 as an antenna radiator. In an embodiment, the electronic device 101 may include a switching circuitry 845 (or an X-ground (X-GND) circuitry) for impedance matching of the conductive portion 210, which is a radiator of the cellular communication. As a non-limiting example, the switching circuitry 845 may be omitted.

According to an embodiment, the electronic device 101 may include passive elements to separate a RF signal of a frequency band of non-NFC communication (e.g., the cellular communication) and output signals (e.g., the first signal of the first terminal 221 or the second signal of the second terminal 222) of the NFC circuitry 220. According to an embodiment, the electronic device 101 may include at least one capacitor for preventing inflow of output signals of the NFC circuitry 220 into a path (hereinafter, a mobile communication path) through which the RF signal of the frequency band of the cellular communication is transmitted. For example, the at least one capacitor may include a first capacitor 841 and a second capacitor 842. As an example, the first capacitor 841 may be connected on a feeding path 831 between the wireless communication circuitry 820 and the conductive portion 210 among the mobile communication path. The second capacitor 842 may be connected on a ground path 832 between the ground and the conductive portion 210 among the mobile communication path. Each of the first capacitor 841 and the second capacitor 842 may have a capacitance for blocking a direct current (DC) or a frequency less than or equal to a reference. For example, each of the first capacitor 841 and the second capacitor 842 may be used to prevent the inflow of signals in an NFC frequency band (e.g., 13.56 MHz). According to an embodiment, at least one of the at least one capacitor may be a varistor capacitor for withstanding electrostatic internal pressure. The capacitors illustrated in FIG. 8A are only an example of implementation, and embodiments of the disclosure are not limited thereto. The first capacitor 841 and/or the second capacitor 842 may be omitted from the mobile communication path, or other capacitors may be further added.

According to an embodiment, the electronic device 101 may include at least one inductor for preventing inflow of the RF signal in the frequency band of the cellular communication into a path (hereinafter, an NFC path) through which output signals of the NFC circuitry 220 are transmitted. For example, the at least one inductor may include a first inductor 851 and/or a second inductor 852. For example, the first inductor 851 may be disposed in series on a first signal path 331. The second inductor 852 may be disposed in series on a ground path (e.g., a first ground path 341). The inductors illustrated in FIG. 8A are only an example of implementation, and embodiments of the disclosure are not limited thereto. The first inductor 851 and/or the second inductor 852 may be omitted from the NFC path, or other inductors may be further added.

Figure 9:
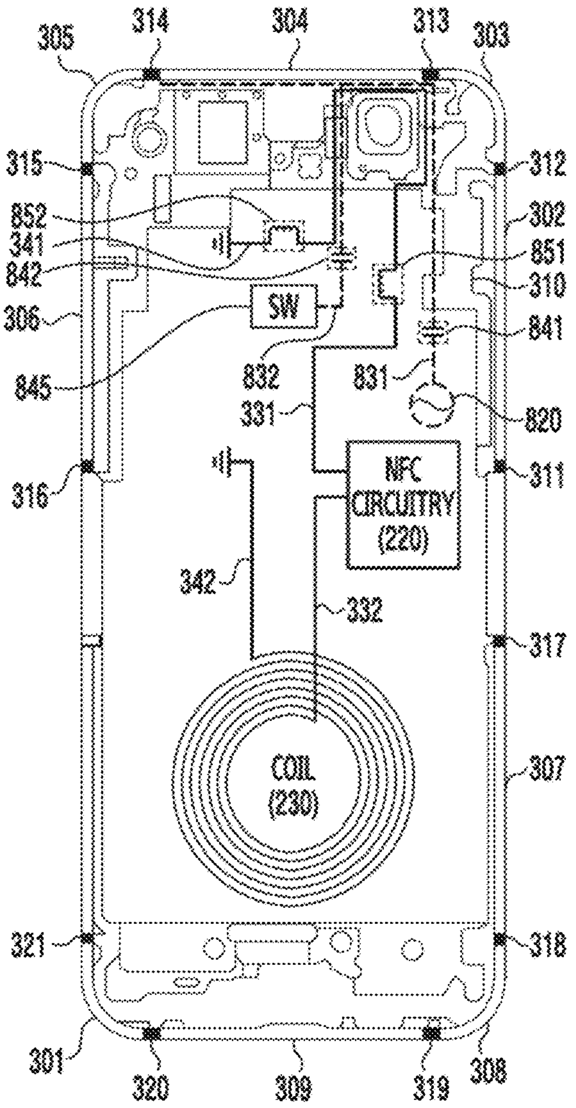
FIG. 9 illustrates an example of an NFC path for an NFC circuitry and a non-NFC communication path for a wireless communication circuitry.

FIG. 9 illustrates an example of an NFC path for an NFC circuitry (e.g., an NFC circuitry 220) and a non-NFC communication path for a wireless communication circuitry (e.g., a wireless communication circuitry 820). The circuitry structure of FIG. 3A may be applicable to describe the NFC path. The description of FIG. 8 may be applicable to describe the non-NFC communication path. FIG. 9 illustrates an example in which a feeding path of an RF signal for non-NFC communication (e.g., cellular communication such as LTE or NR, wireless LAN communication such as Wi-Fi) is shared with a transmission path of NFC communication and/or an example in which a ground path of the RF signal for non-NFC communication (e.g., cellular communication) is shared with a ground path of NFC communication. Identical reference numbers may indicate identical or similar descriptions.

Referring to FIG. 9, an electronic device 101 may include a plurality of conductive portions and a plurality of non-conductive portions. The descriptions of FIG. 3A may be referred for the conductive portions and the non-conductive portions. The electronic device 101 may include a wireless communication circuitry 820. For example, the electronic device 101 may include a feeding path 831 and a ground path 832. For example, the wireless communication circuitry 820 may be connected to a fourth conductive portion 304 through the feeding path 831. For example, at least a portion of the feeding path 831 may be shared with at least a portion of a transmission path (e.g., a first signal path 331) of the NFC circuitry 220. As an example, at least a portion (e.g., a transmission line portion and/or a connection member) of the feeding path 831, which is a portion of the first signal path 331, may be used to transmit a first signal of a first terminal 221 of the NFC circuitry 220. In addition, at least a portion of the ground path 832 may be shared with at least a portion of a ground path (e.g., a first ground path 341) of the NFC circuitry 220. As an example, the at least a portion (e.g., the transmission line portion and/or the connection member) of the ground path 832, which is a portion of the first ground path 341, may be used to ground the first signal of the first terminal 221 of the NFC circuitry 220. In an embodiment, the electronic device 101 may include at least one passive element for isolation between two signals (e.g., an RF signal of cellular communication and an output signal of NFC communication). For example, the electronic device 101 may include a first capacitor 841 in the feeding path 831. The electronic device 101 may include a second capacitor 842 on the ground path 832. Each of the first capacitor 841 and the second capacitor 842 may have a capacitance for blocking a DC or a frequency less than or equal to a reference. For example, each of the first capacitor 841 and the second capacitor 842 may be used to prevent the inflow of signals in an NFC frequency band (e.g., 13.56 MHz).

According to an embodiment, the electronic device 101 may include the NFC circuitry 220. The first terminal 221 of the NFC circuitry 220 may be connected to the fourth conductive portion 304 through the first signal path 331. The first signal path 331 may include a first inductor 851. The first inductor 851 may be an RF choke inductor for preventing inflow of an RF signal in a frequency band of cellular communication. As an example, inductance of the first inductor 851 may provide a high impedance greater than or equal to a threshold due to the frequency of the RF signal. The first ground path 341 may include a second inductor 852. The second inductor 852 may be an RF choke inductor for preventing inflow of an RF signal in a frequency band of cellular communication. For example, inductance of the second inductor 852 may provide a high impedance greater than or equal to a threshold due to the frequency of the RF signal.

Figure 10:
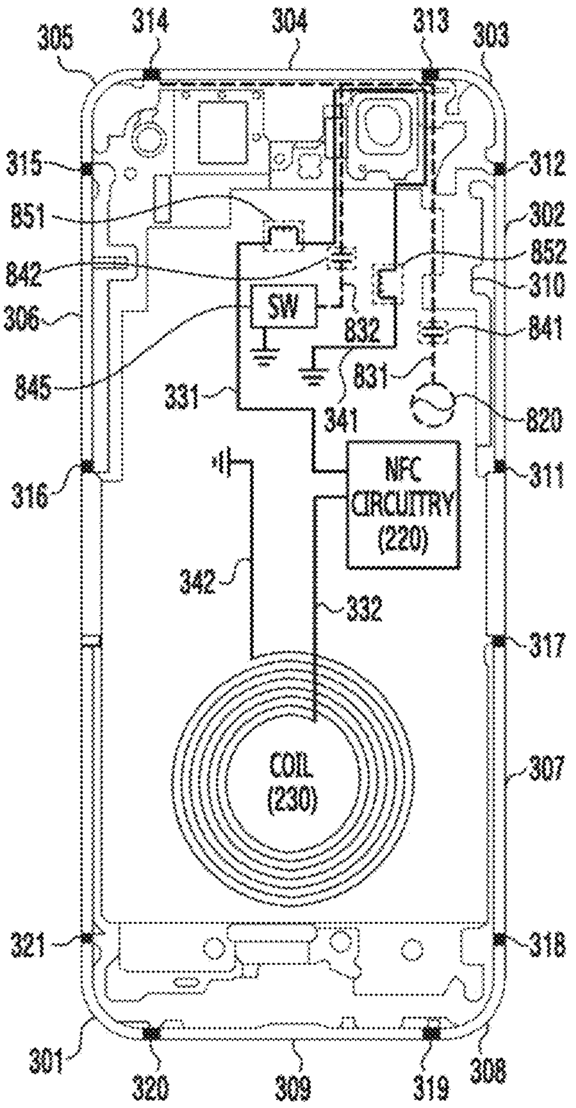
FIG. 10 illustrates an example of an NFC path for an NFC circuitry and a non-NFC communication path for a wireless communication circuitry.

FIG. 10 illustrates an example of an NFC path for an NFC circuitry (e.g., the NFC circuitry 220) and a non-NFC communication path for a wireless communication circuitry (e.g., the wireless communication circuitry 820). The circuitry structure of FIG. 3A may be applicable to describe the NFC path. The description of FIG. 8 may be applicable to describe the non-NFC communication path. FIG. 10 illustrates an example in which a ground path of a RF signal for non-NFC communication (e.g., cellular communication such as LTE or NR, wireless LAN communication such as WiFi) is shared with a transmission path of NFC communication and/or an example in which a feeding path of a RF signal for the non-NFC communication (e.g., cellular communication) is shared with a ground path of NFC communication. Identical reference numbers may indicate identical or similar descriptions.

Referring to FIG. 10, the electronic device 101 may include a plurality of conductive portions and a plurality of non-conductive portions. The descriptions of FIG. 3A may be referred for the conductive portions and the non-conductive portions. The electronic device 101 may include a wireless communication circuitry 820. In FIG. 10, the electronic device 101 may include a feeding path 831 and a ground path 832. For example, the wireless communication circuitry 820 may be connected to a fourth conductive portion 304 through the feeding path 831. In FIG. 10, at least a portion of the ground path 832 may be shared with at least a portion of a transmission path (e.g., a first signal path 331) of the NFC circuitry 220. For example, at least a portion (e.g., a transmission line portion and/or a connection member) of the ground path 832, which is a portion of the first signal path 331, may be used to transmit a first signal of the first terminal 221 of the NFC circuitry 220. In addition, at least a portion of the feeding path 831 may be shared with at least a portion of a ground path (e.g., the first ground path 341) of the NFC circuitry 220. As an example, at least a portion (e.g., a transmission line portion and/or a connection member) of the feeding path 831, which is a portion of the first ground path 341, may be used to ground a first signal of the first terminal 221 of the NFC circuitry 220. In an embodiment, for isolation between two signals, the electronic device 101 may include at least one passive element. For example, the electronic device 101 may include a first capacitor 841 disposed in series on the feeding path 831. The electronic device 101 may include a second capacitor 842 disposed in series on the ground path 832. Each of the first capacitor 841 and the second capacitor 842 may have a capacitance for blocking a DC or a frequency less than or equal to a reference. For example, each of the first capacitor 841 and the second capacitor 842 may be used to prevent the inflow of signals in the NFC frequency band (e.g., 13.56 MHz).

The electronic device 101 may include the NFC circuitry 220. The first terminal 221 of the NFC circuitry 220 may be connected to the fourth conductive portion 304 through the first signal path 331. For example, a first inductor 851 may be included in a portion of the first signal path 331, which is not shared with a ground path 832. The first inductor 851 may be an RF choke inductor for preventing inflow of an RF signal in a frequency band of cellular communication. As an example, inductance of the first inductor 851 may provide a high impedance greater than or equal to a threshold due to the frequency of the RF signal. For example, the first ground path 341 may include a second inductor 852. The second inductor 852 may be an RF choke inductor for preventing inflow of an RF signal in a frequency band of cellular communication. For example, inductance of the second inductor 852 may provide a high impedance greater than or equal to a threshold due to the frequency of the RF signal.

Figure 11A:
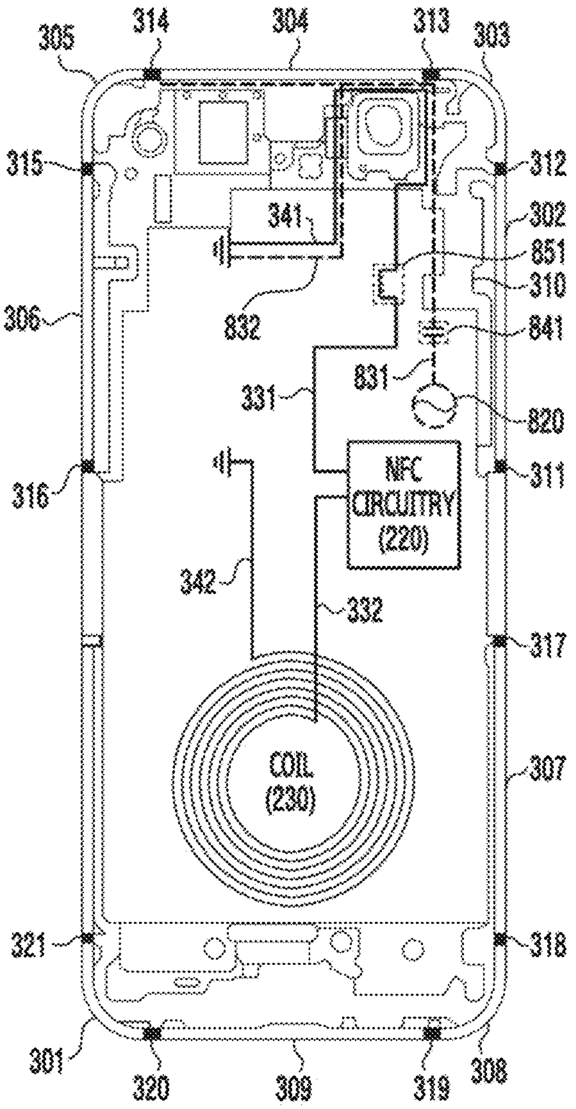
FIGS. 11A and 11B illustrate an example of an NFC path for an NFC circuitry and a non-NFC communication path for a wireless communication circuitry.
Figure 11B:
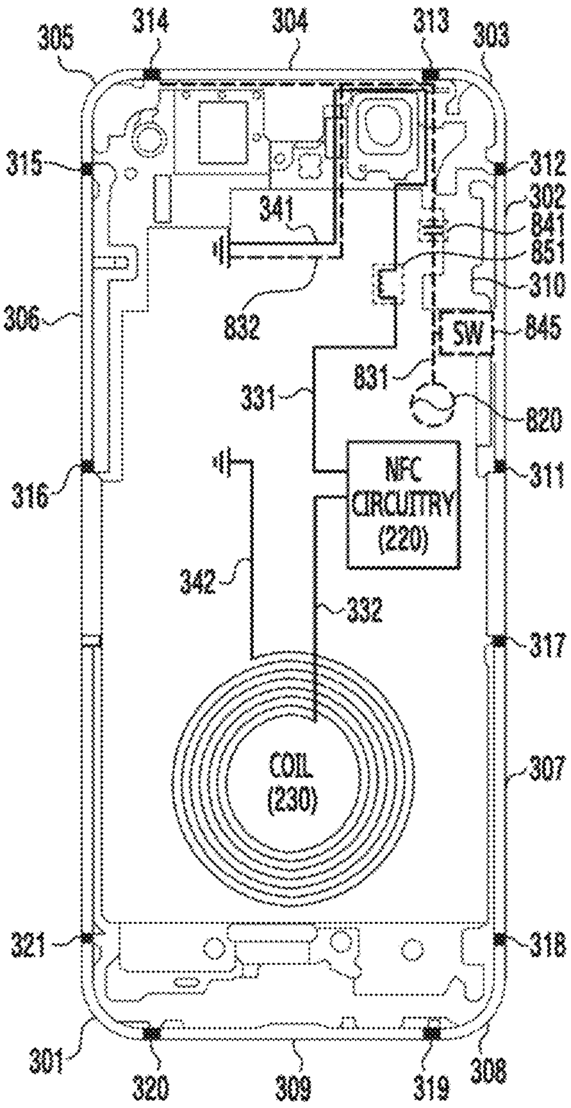

FIGS. 11A and 11B illustrate an example of an NFC path for an NFC circuitry and a non-NFC communication path for a wireless communication circuitry. FIGS. 11A and 11B illustrate an example in which a feeding path and a ground path of a RF signal for non-NFC communication (e.g., cellular communication or wireless LAN communication) are shared with the NFC path. Identical reference numbers may indicate identical or similar descriptions.

Referring to FIG. 11A, an electronic device 101 may include a plurality of conductive portions and a plurality of non-conductive portions. The descriptions of FIG. 3A may be referred for the conductive portions and the non-conductive portions. The electronic device 101 may include a wireless communication circuitry 820.

The electronic device 101 may include a feeding path 831 and a ground path 832. In an embodiment, at least a portion of the feeding path 831 and at least a portion of the ground path 832 may be shared with the NFC path. For example, at least a portion of the feeding path 831 may be shared with at least a portion of a transmission path (e.g., a first signal path 331) of the NFC circuitry 220. As an example, at least a portion (e.g., a transmission line portion and/or a connection member) of the feeding path 831, which is a portion of the first signal path 331, may be used to transmit a first signal of a first terminal 221 of the NFC circuitry 220. For example, at least a portion (e.g., the transmission line portion and/or the connection member) of the ground path 832, which is the first ground path 341, may be used to connect the first signal to the ground. In an embodiment, the electronic device 101 may include at least one passive element for isolation between two signals (e.g., an RF signal of cellular communication and an output signal of NFC communication). For example, the electronic device 101 may include a first capacitor 841 disposed in series in the feeding path 831. The first capacitor 841 may have a capacitance for blocking DC or blocking a frequency less than or equal to a reference. For example, the first capacitor 841 may be used to prevent the inflow of signals in an NFC frequency band (e.g., 13.56 MHz). For example, a second capacitor 842 may be omitted from a shared ground path (e.g., the first ground path 341 or the ground path 832).

The electronic device 101 may include the NFC circuitry 220. The first terminal 221 of the NFC circuitry 220 may be connected to a fourth conductive portion 304 through the first signal path 331. The first signal path 331 may include a first inductor 851. The first inductor 851 may be an RF choke inductor for preventing inflow of an RF signal in a frequency band of cellular communication. As an example, inductance of the first inductor 851 may provide a high impedance greater than or equal to a threshold due to a frequency of the RF signal. Since the first ground path 341 corresponds to the ground path 832, the second inductor 852 may be omitted.

Referring to FIG. 11B, in an embodiment, the electronic device 101 may include a switching circuitry 845 for impedance matching of the conductive portion 210. For example, the switching circuitry 845 may be connected to an area of the feeding path 831, in a structure illustrated in FIG. 11A.

Electrostatic discharge (ESD) is a phenomenon in which electric charges are generated due to friction or contact, and the electric charges are rapidly discharged when or immediately before contacting with another object. As an excessive voltage is applied due to ESD, electrostatic may flow through a signal path connected to a conductive portion (e.g., the conductive portion 210, or the fourth conductive portion 304). Due to the electrostatic, burnout of a component within the electronic device 101 may occur. Accordingly, the electronic device 101 according to embodiments of the disclosure may include a circuitry structure for preventing ESD. Hereinafter, circuitry components for preventing ESD are described with reference to FIGS. 12 to 14.

Figure 12:
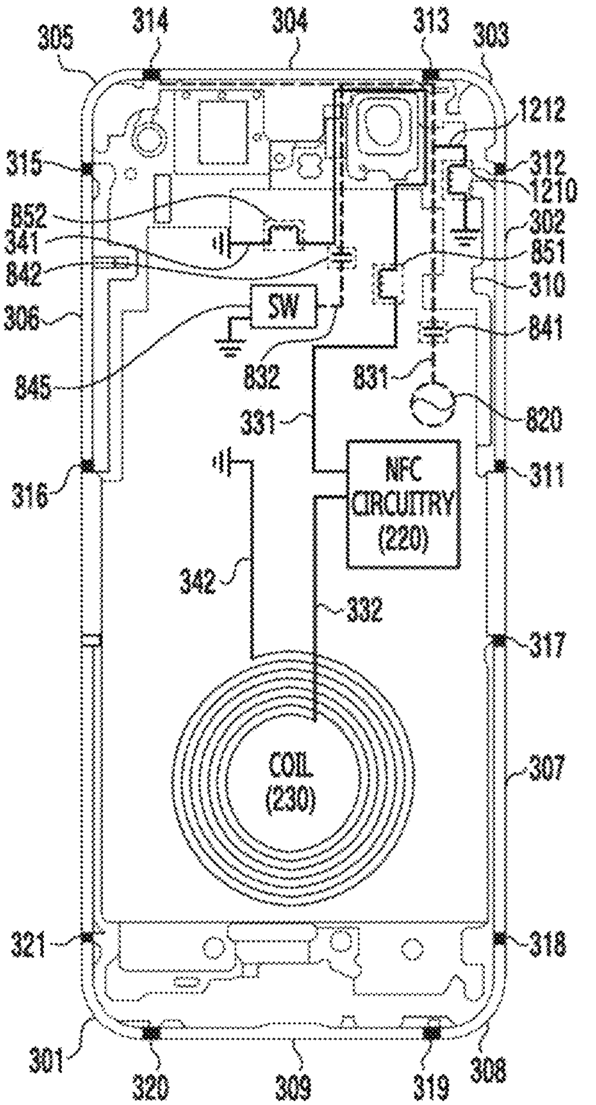
FIG. 12 illustrates an example of an electronic device including a radio frequency (RF) choke inductor for electrostatic discharge (ESD) prevention.

FIG. 12 illustrates an example of an electronic device (e.g., an electronic device 101) including a radio frequency (RF) choke inductor for ESD prevention. For circuitry design in which a plurality of radiators (e.g., a fourth conductive portion 304 and a coil 230) is used for NFC communication and at least one of the plurality of radiators is used for non-NFC communication (e.g., cellular communication), a circuitry structure illustrated in FIG. 9 may be referred. Identical reference numbers may indicate identical or similar descriptions.

Referring to FIG. 12, the electronic device 101 may include a plurality of conductive portions and a plurality of non-conductive portions. For the conductive portions and the non-conductive portions, the descriptions of FIG. 3A may be referred. The electronic device 101 may include a wireless communication circuitry 820. The electronic device 101 may include a feeding path 831 and a ground path 832. For example, at least a portion of the feeding path 831 may be shared with at least a portion of a transmission path (e.g., a first signal path 331) of the NFC circuitry 220. In addition, at least a portion of the ground path 832 may be shared with at least a portion of a ground path (e.g., a first ground path 341) of the NFC circuitry 220. As an example, at least a portion (e.g., a transmission line portion and/or a connection member) of the ground path 832, which is a portion of the first ground path 341, may be used to ground a first signal of a first terminal 221 of the NFC circuitry 220.

In an embodiment, the electronic device 101 may include at least one passive element for isolation between two signals (e.g., an RF signal of cellular communication and an output signal of NFC communication). For example, the electronic device 101 may include a first capacitor 841 disposed in series on the feeding path 831. The electronic device 101 may include a second capacitor 842 disposed in series on the ground path 832. The electronic device 101 may include a first inductor 851 disposed in series on the first signal path 331. The electronic device 101 may include a second inductor 852 disposed in series on the first ground path 341. The first inductor 851 may be an RF choke inductor for preventing inflow of an RF signal in a frequency band of cellular communication. The second inductor 852 may be an RF choke inductor for preventing inflow of an RF signal in a frequency band of cellular communication.

According to an embodiment, the electronic device 101 may include an RF choke inductor 1210 for ESD prevention. The electronic device 101 may include an ESD path 1212 for inducing generated electrostatic to a ground portion. For example, the RF choke inductor 1210 may be connected to the feeding path 831 to form the ESD path 1212. As high voltage electrostatic flows through the RF choke inductor 1210, burnout of a passive element (e.g., the first capacitor 841) may be prevented. The RF choke inductor 1210 may have inductance for preventing inflow of the RF signal in the frequency band of cellular communication.

FIG. 12 illustrates the electronic device 101 including the first capacitor 841, the second capacitor 842, the first inductor 851, and the second inductor 852 for signal separation, but embodiments of the disclosure are not limited thereto. For example, the first capacitor 841, the second capacitor 842, the first inductor 851, and/or the second inductor 852 may be omitted. Additionally, the RF choke inductor 1210 for ESD prevention may be connected to the feeding path 831 of the wiring structure (e.g., wiring structure in which at least a portion of the first signal path 331 and at least a portion of the ground path 832 are shared) illustrated in FIG. 10 or the wiring structure (e.g., wiring structure in which at least a portion of the first signal path 331 and at least a portion of the feeding path 831 are shared, and at least a portion of the first ground path 341 and at least a portion of the ground 342 are shared) illustrated in FIGS. 11A and 11B, as well as a wiring structure in which at least a portion of the first signal path 331 and at least a portion of the feeding path 831 are shared.

Figure 13:
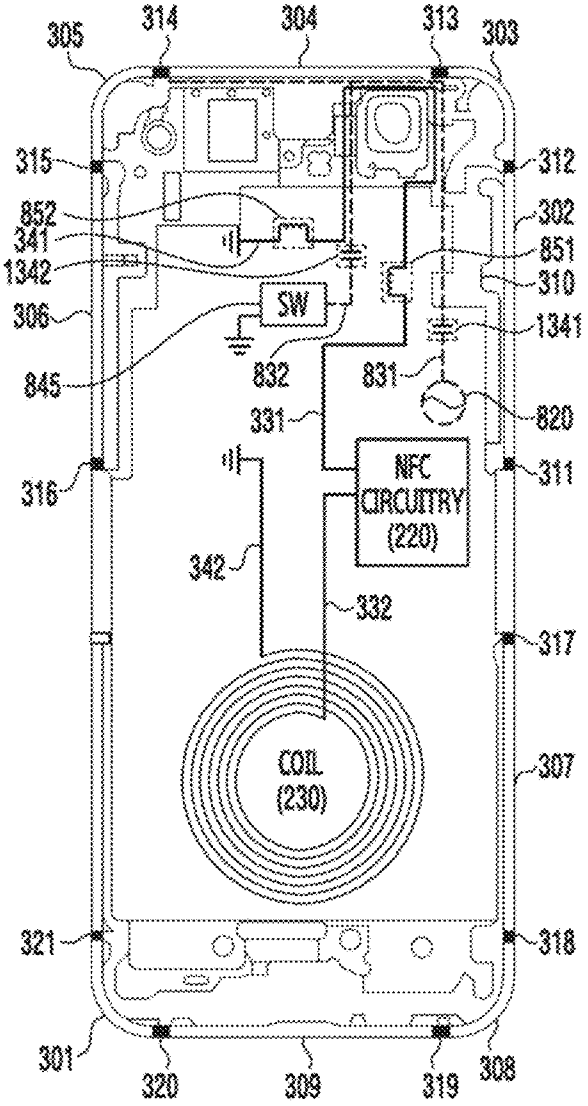
FIG. 13 illustrates an example of an electronic device including a varistor capacitor for ESD prevention.

FIG. 13 illustrates an example of an electronic device (e.g., an electronic device 101) including a varistor capacitor for ESD prevention. The varistor capacitor refers to a capacitive element for overvoltage protection and/or noise filtering. For example, the varistor capacitor may be used to prevent application of an overvoltage due to ESD. The varistor capacitor may include an element configured such that a resistance rapidly is reduced when a voltage exceeds a specific threshold value. Due to a reduced resistance value, the overvoltage may be absorbed, and a circuitry connected to the varistor capacitor may be protected. For circuitry design in which a plurality of radiators (e.g., the fourth conductive portion 304 and the coil 230) is used for NFC communication and at least one of the plurality of radiators is used for non-NFC communication (e.g., cellular communication), the circuitry structure illustrated in FIG. 9 may be referred. Identical reference numbers may indicate identical or similar descriptions.

Referring to FIG. 13, the electronic device 101 may include a plurality of conductive portions and a plurality of non-conductive portions. For the conductive portions and the non-conductive portions, the descriptions of FIG. 3A may be referred. The electronic device 101 may include a wireless communication circuitry 820. The electronic device 101 may include a feeding path 831 and a ground path 832. For example, at least a portion of the feeding path 831 may be shared with at least a portion of a transmission path (e.g., a first signal path 331) of the NFC circuitry 220. In addition, at least a portion of the ground path 832 may be shared with at least a portion of a ground path (e.g., a first ground path 341) of the NFC circuitry 220. As an example, at least a portion (e.g., a transmission line portion and/or a connection member) of the ground path 832, which is as a portion of the first ground path 341, may be used to ground the first signal of the first terminal 221 of the NFC circuitry 220. In an embodiment, for isolation between two signals (e.g., an RF signal of cellular communication and an output signal of NFC communication), the electronic device 101 may include at least one passive element. For example, the electronic device 101 may include a first inductor 851 disposed in series on the first signal path 331. The electronic device 101 may include a second inductor 852 disposed in series on the first ground path 341.

According to an embodiment, the electronic device 101 may include a first varistor capacitor 1341 disposed in series on the feeding path 831. The first capacitor 841 may be referred for description of the first varistor capacitor 1341. The first varistor capacitor 1341 may be used not only to filter the inflow of an NFC signal into the feeding path 831, but also to prevent burnout of a component due to the inflow of electrostatic. According to an embodiment, the electronic device 101 may include a second varistor capacitor 1342 connected to the ground path 832. The second capacitor 842 may be referred for description of the second varistor capacitor 1342. The second varistor capacitor 1342 may be used not only to filter the inflow of an NFC signal into the ground path 832, but also to prevent burnout of a component due to the inflow of electrostatic. For example, even if an overvoltage of electrostatic is applied, the wireless communication circuitry 820 and an element connected to the wireless communication circuitry 820 may be protected due to a change in resistance of the first varistor capacitor 1341 (or the second varistor capacitor 1342).

Figure 14:
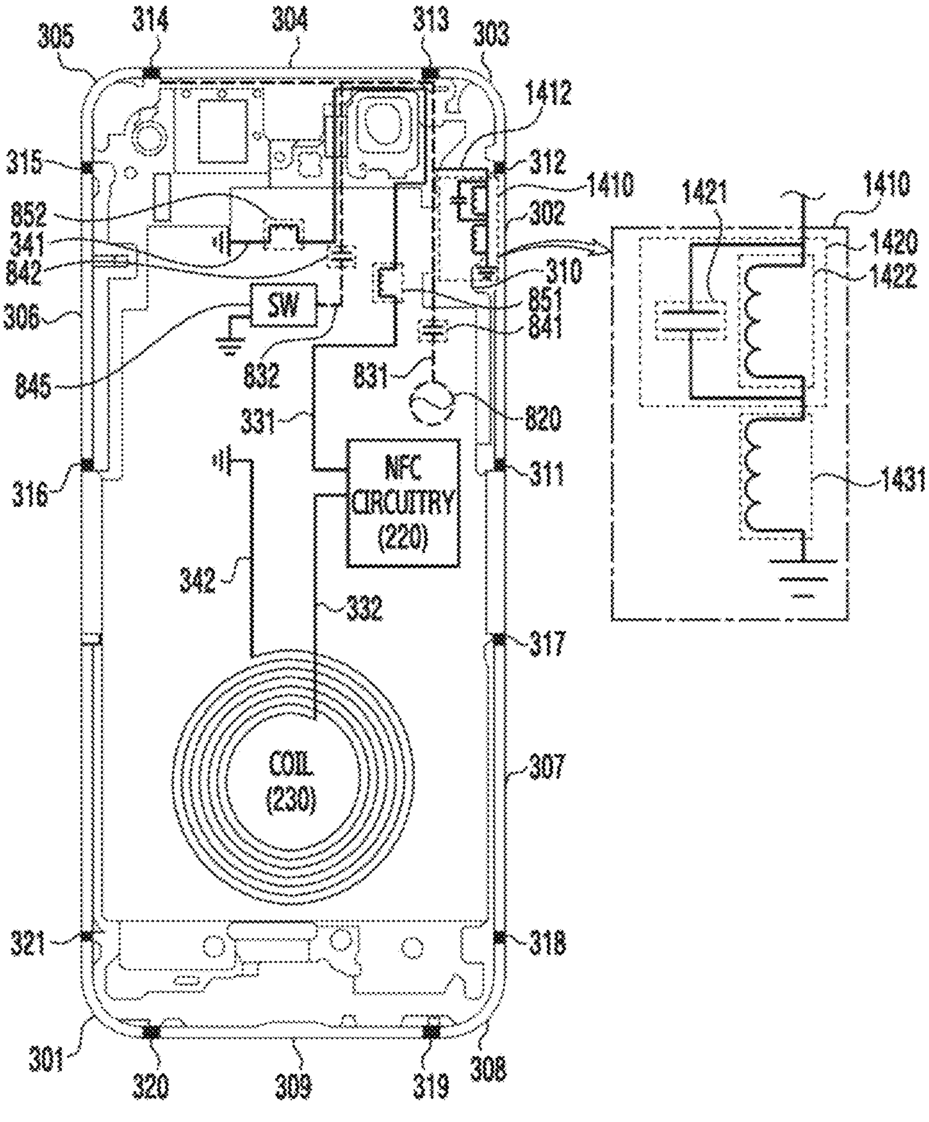
FIG. 14 illustrates an example of an electronic device including a band stop filter circuitry for ESD prevention.

FIG. 14 illustrates an example of an electronic device including a band stop filter circuitry for ESD prevention. For circuitry design in which a plurality of radiators (e.g., a fourth conductive portion 304 and a coil 230) are used for NFC communication and at least one of the radiators is used for cellular communication, the circuitry structure illustrated in FIG. 9 may be referred. Identical reference numbers may indicate identical or similar descriptions.

Referring to FIG. 14, an electronic device 101 may include a plurality of conductive portions and a plurality of non-conductive portions. For the conductive portions and the non-conductive portions, the descriptions of FIG. 3A may be referred. The electronic device 101 may include a wireless communication circuitry 820. The electronic device 101 may include a feeding path 831 and a ground path 832. For example, at least a portion of the feeding path 831 may be shared with at least a portion of a transmission path (e.g., a first signal path 331) of the NFC circuitry 220. In addition, at least a portion of the ground path 832 may be shared with at least a portion of a ground path (e.g., a first ground path 341) of the NFC circuitry 220. For example, at least a portion (e.g., a transmission line portion and/or a connection member) of the ground path 832, which is a portion of the first ground path 341, may be used to ground a first signal of a first terminal 221 of the NFC circuitry 220. In an embodiment, for isolation between two signals (e.g., an RF signal of cellular communication and an output signal of NFC communication), the electronic device 101 may include at least one passive element. For example, the electronic device 101 may include a first capacitor 841 connected to the feeding path 831. The electronic device 101 may include a second capacitor 842 connected to the ground path 832. The electronic device 101 may include a first inductor 851 disposed in series on the first signal path 331. The electronic device 101 may include a second inductor 852 disposed in series on the first ground path 341. The first inductor 851 may be an RF choke inductor for preventing inflow of an RF signal in a frequency band of cellular communication. The second inductor 852 may be an RF choke inductor for preventing the inflow of the RF signal in the frequency band of the cellular communication.

According to an embodiment, the electronic device 101 may include a filtering circuitry 1410 for ESD prevention. The electronic device 101 may include an ESD path 1412 for inducing generated electrostatic to a ground portion. For example, in order to form the ESD path 1412, the filtering circuitry 1410 may be connected in parallel to the feeding path 831. The filtering circuitry 1410 may include a band stop filter circuitry 1420 and an RF choke inductor 1431. As electrostatic of a high voltage flows through the RF choke inductor 1431, burnout of a passive device for cellular communication may be prevented. The RF choke inductor 1431 may have inductance for preventing the inflow of the RF signal in the frequency band of cellular communication. However, if only the RF choke inductor 1431 is included in the feeding path 831, an NFC signal (e.g., the first signal of the first terminal 221) may flow to the ground through the ESD path 1412, thereby deteriorating NFC communication performance. Therefore, the band stop filter circuitry 1420 may be used to prevent the NFC signals from flowing into the ESD path 1412 connected in parallel to the feeding path 831. The band stop filter circuitry 1420 may be configured to filter signals in an NFC frequency band (e.g., 13.56 MHz). For example, the band stop filter circuitry 1420 may not pass signals in the NFC frequency band among signals flowing into the band stop filter circuitry 1420, or may pass the signals as a signal with weak intensity less than or equal to a detection threshold. The band stop filter circuitry 1420 may include passive elements for filtering the NFC frequency band. For example, the band stop filter circuitry 1420 may include a capacitor 1421 and an inductor 1422, which are disposed in parallel. The capacitance of the capacitor 1421 and the inductance of the inductor 1422 may be configured to filter signals in the NFC frequency band. As an example, the capacitor 1421 may be configured to pass a high frequency signal higher than or equal to a first frequency according to the capacitance, and the inductor 1422 may be configured to pass only a low frequency signal lower than or equal to a second frequency according to the inductance. Therefore, signals (e.g., signals in the NFC frequency band) with frequencies between the first frequency and the second frequency may not pass through the band stop filter 1420. For example, since signals in the NFC frequency band are not transmitted to the ground of the ESD path 1412, the NFC communication performance may be guaranteed.

FIGS. 12 to 14 illustrate examples of a circuitry in which the first signal path 231 of FIG. 2 is the first connection type 251, the second signal path 232 is the first connection type 251, and the third signal path 233 is the second connection type 252, but embodiments of the disclosure are not limited thereto. For example, any electronic device 101, which includes an RF choke inductor 1210 disposed in parallel with the feeding path 831 of a conductive portion shared by NFC communication and cellular communication, may be understood as an embodiment of the disclosure without limitation to a connection structure of the NFC circuitry. For example, any electronic device 101, which includes a varistor capacitor (e.g., a first varistor capacitor 1341 and a second varistor capacitor 1342) on a non-NFC communication path using a radiator (e.g., a fourth conductive portion 304) of NFC communication, may be understood as an embodiment of the disclosure without limitation to a connection structure of the NFC circuitry. For example, any electronic device 101, which includes a filtering circuitry 1410 disposed in parallel in the feeding path 831 of a conductive portion (e.g., the fourth conductive portion 304) shared by NFC communication and cellular communication, may be understood as an embodiment of the disclosure without limitation to a connection structure of the NFC circuitry.

Figure 15A:
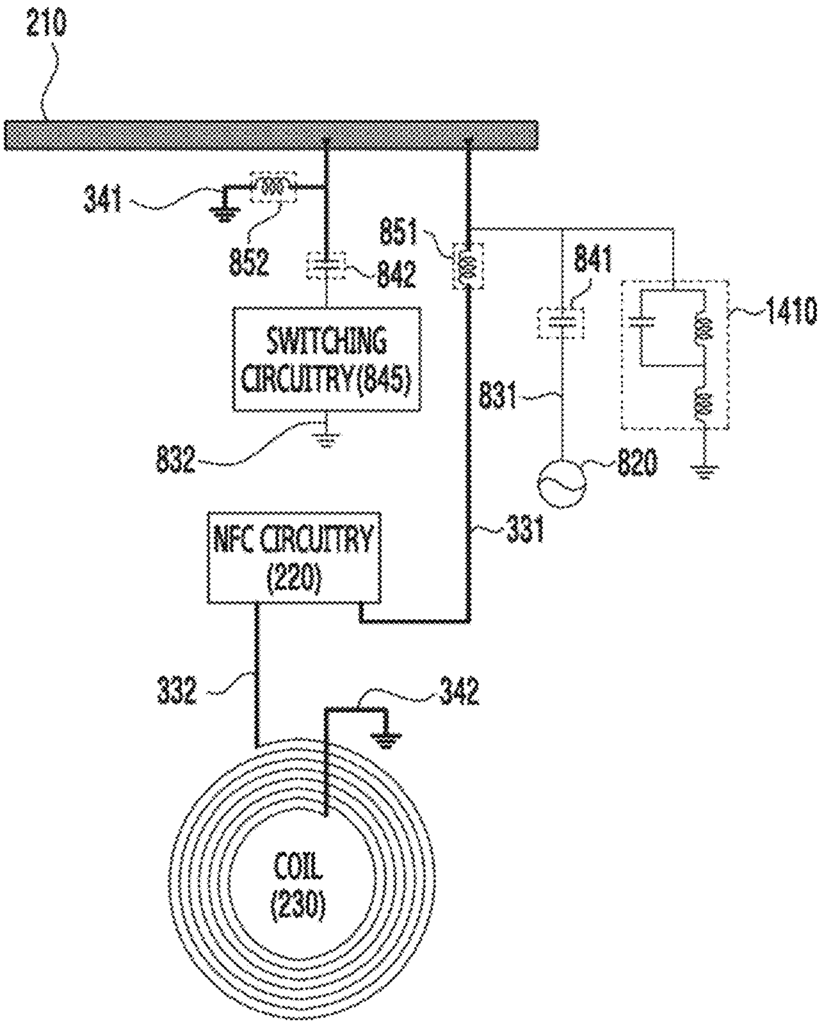
FIGS. 15A to 15C illustrate an example of signal paths of an electronic device.
Figure 15B:
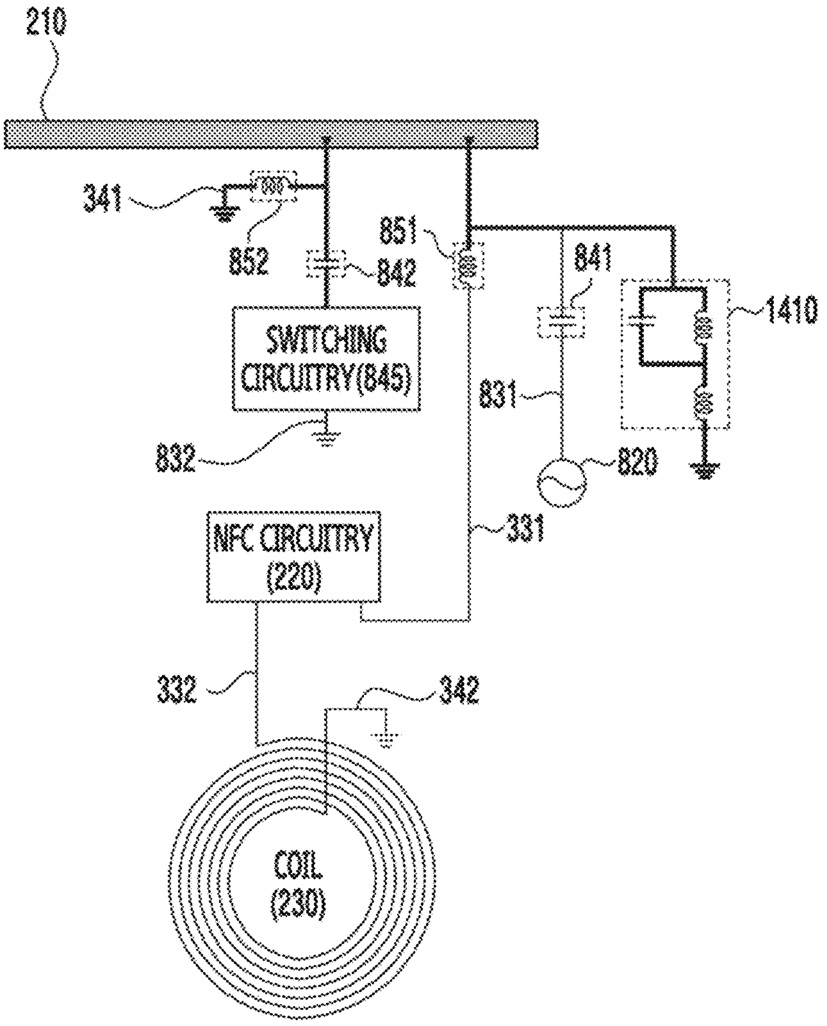
Figure 15C:
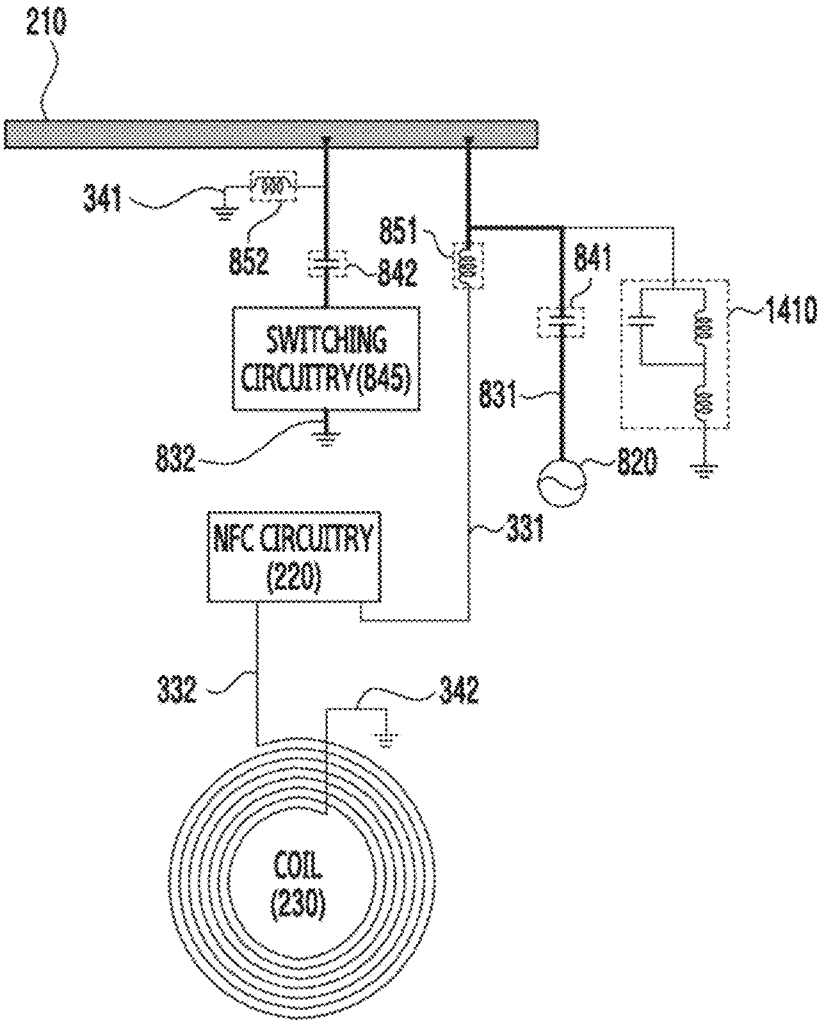

FIGS. 15A to 15C illustrate an example of signal paths (e.g., an NFC path, an ESD path, a non-NFC communication path) of an electronic device (e.g., an electronic device 101). Identical reference numbers may indicate identical or similar descriptions.

Referring to FIGS. 15A, 15B, and 15C, the electronic device 101 may include a conductive portion 210, an NFC circuitry 220, and a coil 230. The conductive portion 210 may be used as a radiator for NFC communication. The coil 230 may be used as a radiator for the NFC communication. The NFC circuitry 220 may be connected to the conductive portion 210 through a first signal path 331. The NFC circuitry 220 may be connected to the coil 230 through a second signal path 332. An end of the coil 230 may be connected to the NFC circuitry 220, and another end of the coil 230 may be connected to a ground portion through a first ground path 341. The conductive portion 210 may be used as a radiator for cellular communication. In an embodiment, for isolation between two signals (e.g., an RF signal of the cellular communication and an output signal of the NFC communication), the electronic device 101 may include at least one passive element. For example, the electronic device 101 may include a first inductor 851 and a second inductor 852. The first inductor 851 may be disposed in series on the first signal path 331. The second inductor 852 may be disposed in series between the conductive portion 210 and the ground. For example, the electronic device 101 may include a first capacitor 841 and a second capacitor 842. The first capacitor 841 may be disposed between the conductive portion 210 and a wireless communication circuitry 820. The second capacitor 842 may be disposed between the conductive portion 210 and the ground. For example, the electronic device 101 may include a switching circuitry 845 for impedance matching of the conductive portion 210. The switching circuitry 845 may be connected between the second capacitor 842 and the ground.

Referring to FIG. 15A, the electronic device 101 may include an NFC path. The NFC path indicates a path through which output signals of the NFC circuitry 220 are transmitted. For example, the NFC path may include a first signal path 331 from the NFC circuitry 220 to the conductive portion 210 and a first ground path 341. For example, the NFC path may include a second signal path 332 from the NFC circuitry 220 to the coil 230 and a second ground path 342.

Referring to FIG. 15B, the electronic device 101 may include an ESD path. ESD is a phenomenon in which electric charges are generated due to friction or contact, and the electric charges are rapidly discharged when or immediately before contacting with another object. The electronic device 101 may include an ESD path for inducing generated electrostatic to a ground portion to prevent electrostatic from inflow. In order to form the ESD path, a filtering circuitry 1410 may be connected to a feeding path 831. The ESD path may include the first ground path 341 connected to the conductive portion 210 and a path from the conductive portion 210 to the ground portion connected through the filtering circuitry 1410. For example, due to the first capacitor 841, electrostatic may not flow into a feeding path of a wireless communication circuitry.

Referring to FIG. 15C, the electronic device 101 may include a non-NFC communication path (e.g., a path of long-distance wireless communication, or a path of cellular communication). The non-NFC communication path may include a path (e.g., the feeding path 831) between the conductive portion 210 and the wireless communication circuitry 820. The non-NFC communication path may include a path (e.g., a ground path 832) between the conductive portion 210 and the ground portion.

Figure 16:
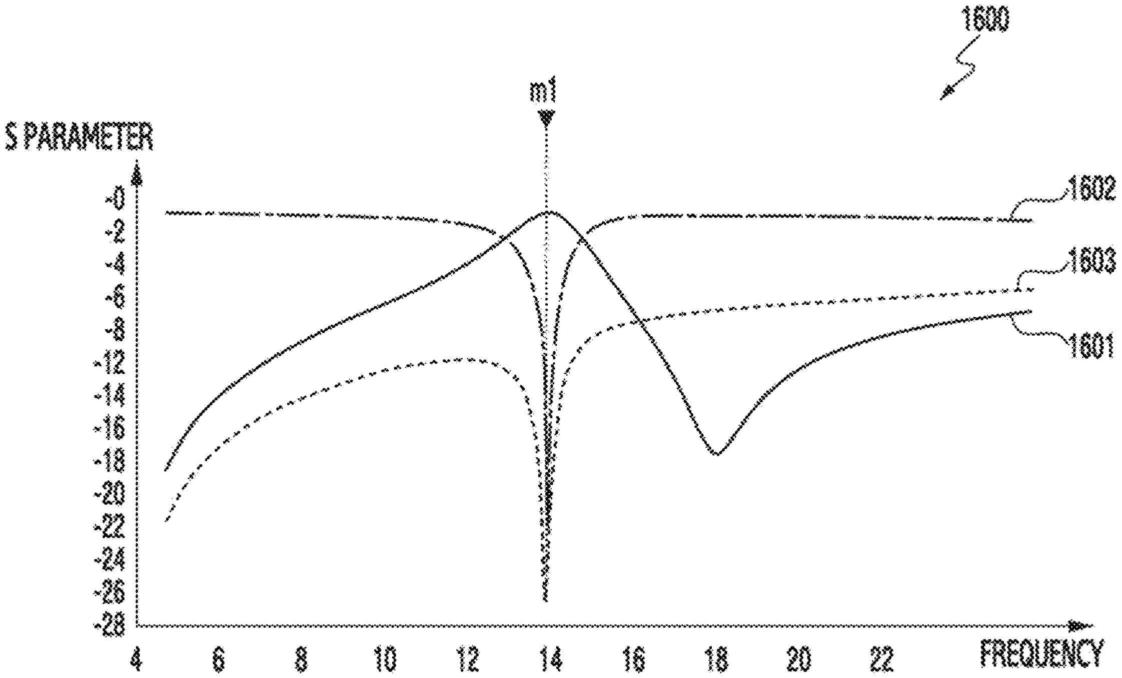
FIG. 16 illustrates an example of a S-parameter characteristic.

FIG. 16 illustrates an example of an S-parameter characteristic. A circuitry structure illustrated in FIG. 15 may be used to describe the S-parameter characteristics of FIG. 16.

Referring to FIG. 16, a graph 1600 represents the S-parameter characteristic. A horizontal axis of the graph 1600 represents a frequency, and a vertical axis of the graph 1600 represents S parameter. A first line 1601 represents a transmission coefficient S12 from an NFC circuitry (e.g., the NFC circuitry 220) to a conductive portion 210 (e.g., the fourth conductive portion 304). For example, at a frequency of about 13.60 MHz, a value of the first line 1601 may be −0.111. A second line 1602 represents a reflection coefficient S11 in an NFC circuitry (e.g., the NFC circuitry 220). For example, at a frequency of about 13.60 MHz, a value of the second line 1602 may be −16.024. A third line 1603 represents a pass coefficient of a wireless communication circuitry (e.g., the wireless communication circuitry 820) in an NFC circuitry (e.g., the NFC circuitry 220). For example, at a frequency of about 13.60 MHz, a value of the third line 1603 may be −34.910. That is, most of NFC signals of the NFC circuitry 220 are transmitted to the conductive portion 210 through the filtering circuitry 1410, and are not transmitted to the ground through the ESD path.

FIGS. 17A, 17B, 17C, 17D, and 17E illustrate examples of an electronic device (e.g., an electronic device 101) including an NFC circuitry (e.g., an NFC circuitry 220) using a conductive portion (e.g., a conductive portion 210) and a coil (e.g., a coil 230). Identical reference numbers may indicate identical or similar descriptions.

Figure 17A:
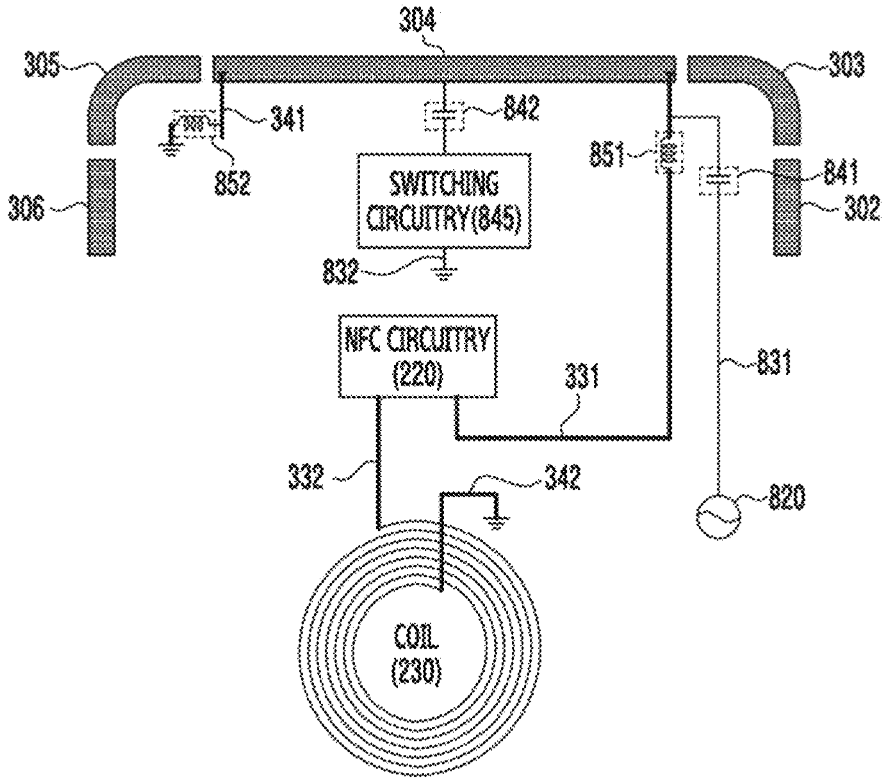
FIGS. 17A, 17B, 17C, 17D, and 17E illustrate examples of an electronic device including an NFC circuitry using a conductive portion and a coil.

Referring to FIG. 17A, the electronic device 101 may include the NFC circuitry 220 and the coil 230. The descriptions of FIG. 3A may be applicable to describe a circuitry structure of the electronic device 101. The NFC circuitry 220 may be connected to a fourth conductive portion 304 through a first signal path 331. The NFC circuitry 220 may be connected to the coil 230 through a second signal path 332. The NFC circuitry 220 may operate in a differential mode. The NFC circuitry 220 may output a first signal of a differential output through the first terminal 221. The NFC circuitry 220 may transmit the first signal from a first terminal 221 to the fourth conductive portion 304 through the first signal path 331. The NFC circuitry 220 may output a second signal of the differential output through the second terminal 222. The NFC circuitry 220 may transmit the second signal from the second terminal 222 to the coil 230 through the second signal path 332. A first phase of the first signal and a second phase of the second signal may be different by, for example, about 180 degrees. The fourth conductive portion 304 may be connected to the ground portion through a first ground path 341. The coil 230 may be connected to the ground portion through a second ground path 342.

The fourth conductive portion 304 may be used as a radiator for non-NFC communication (e.g., cellular communication). The electronic device 101 may include a wireless communication circuitry 820. The wireless communication circuitry 820 may radiate the RF signal through the conductive portion 210 or receive the RF signal from an external electronic device (e.g., the electronic device 102, the electronic device 104, or the server 108). The electronic device 101 may include a switching circuitry 845 (or an X-ground (X-GND) circuitry) for impedance matching of the fourth conductive portion 304, which is the radiator of the cellular communication. In an embodiment, the electronic device 101 may include at least one passive element for isolation between two signals (e.g., an RF signal of cellular communication and an output signal of NFC communication). According to an embodiment, for example, the electronic device 101 may include a first capacitor 841 in a feeding path 831. The electronic device 101 may include a second capacitor 842 in a ground path 832. Each of the first capacitor 841 and the second capacitor 842 may have a capacitance for blocking a direct current (DC) or blocking a frequency less than or equal to a reference. For example, each of the first capacitor 841 and the second capacitor 842 may be used to prevent the inflow of signals in an NFC frequency band (e.g., 13.56 MHz). As a non-limiting example, the first capacitor 841 may be a varistor capacitor (e.g., a first varistor capacitor 1341). As a non-limiting example, the second capacitor 842 may be a varistor capacitor (e.g., a second varistor capacitor 1342). According to an embodiment, the electronic device 101 may include a first inductor 851 disposed in series on the first signal path 331. For example, at least a portion of the feeding path 831 of a non-NFC communication path for the wireless communication circuitry 820 may be shared with at least a portion of a transmission path (e.g., the first signal path 331) of the NFC circuitry 220. The electronic device 101 may include a second inductor 852 disposed in series on the first ground path 341. The second inductor 852 may be an RF choke inductor for preventing the inflow of an RF signal in a frequency band of cellular communication. The first signal path 331 may include a first inductor 851. The first inductor 851 may be an RF choke inductor for preventing the inflow of an RF signal in a frequency band of cellular communication.

Figure 17B:
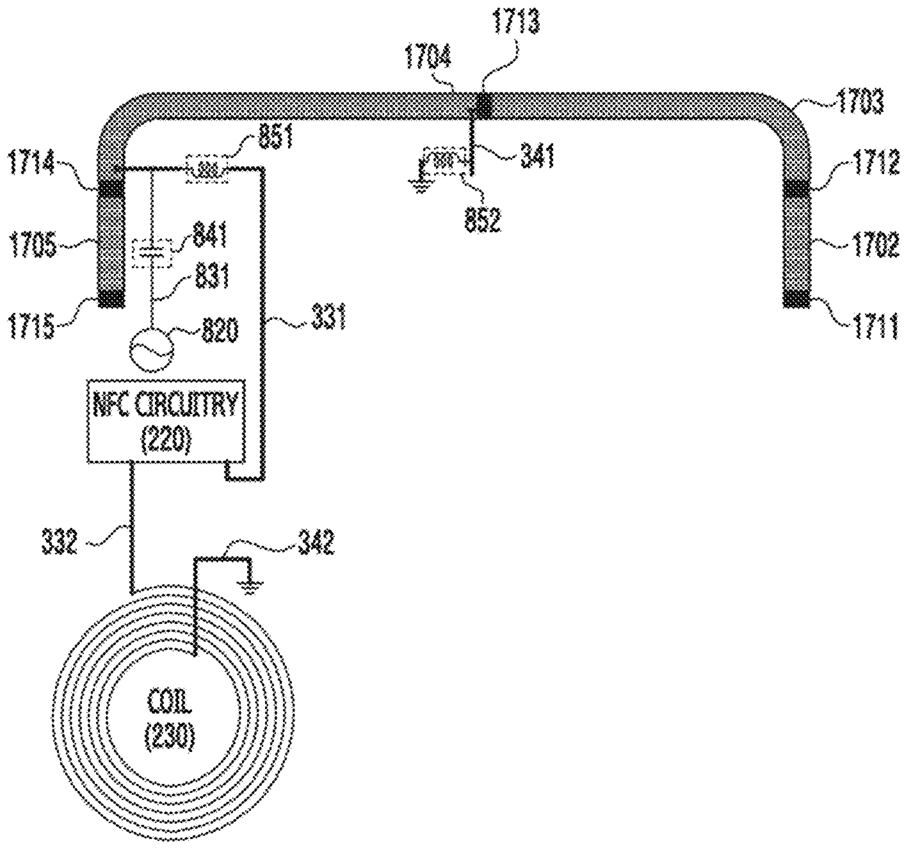

Referring to FIG. 17B, the electronic device 101 may include a plurality of conductive portions and a plurality of non-conductive portions. For example, a metal frame of the electronic device 101 may include the plurality of conductive portions. For example, the plurality of conductive portions may include a second conductive portion 1702, a third conductive portion 1703, a fourth conductive portion 1704, and/or a fifth conductive portion 1705. For example, the plurality of non-conductive portions may include a first non-conductive portion 1711, a second non-conductive portion 1712, a third non-conductive portion 1713, a fourth non-conductive portion 1714, or a fifth non-conductive portion 1715. The second conductive portion 1702 may be formed between the first non-conductive portion 1711 and the second non-conductive portion 1712. The third conductive portion 1703 may be formed between the second non-conductive portion 1712 and the third non-conductive portion 1713. The fourth conductive portion 1704 may be formed between the third non-conductive portion 1713 and the fourth non-conductive portion 1714. The fifth conductive portion 1705 may be formed between the fourth non-conductive portion 1714 and the fifth non-conductive portion 1715.

Instead of the fourth conductive portion 304 of FIG. 17A, the fourth conductive portion 1704 may be used as a radiator for NFC communication and non-NFC communication (e.g., cellular communication). The first signal path 331 for the NFC circuitry 220 may be connected to the fourth conductive portion 1704. The NFC circuitry 220 may transmit the first signal from the first terminal 221 to the fourth conductive portion 1704 through the first signal path 331. The fourth conductive portion 1704 may be electrically connected to the first inductor 851. The fourth conductive portion 1704 may be connected to the ground portion through the first ground path 341. The fourth conductive portion 1704 may be electrically connected to the second inductor 852. The wireless communication circuitry 820 may be connected to the fourth conductive portion 1704 through the first capacitor 841. The fourth conductive portion 1704 may be used as a radiator for non-NFC communication (e.g., cellular communication). Due to the second inductor 852, the first ground path 341 may be understood as an open circuitry in terms of a frequency of the RF signal of the wireless communication circuitry 820.

Figure 17C:
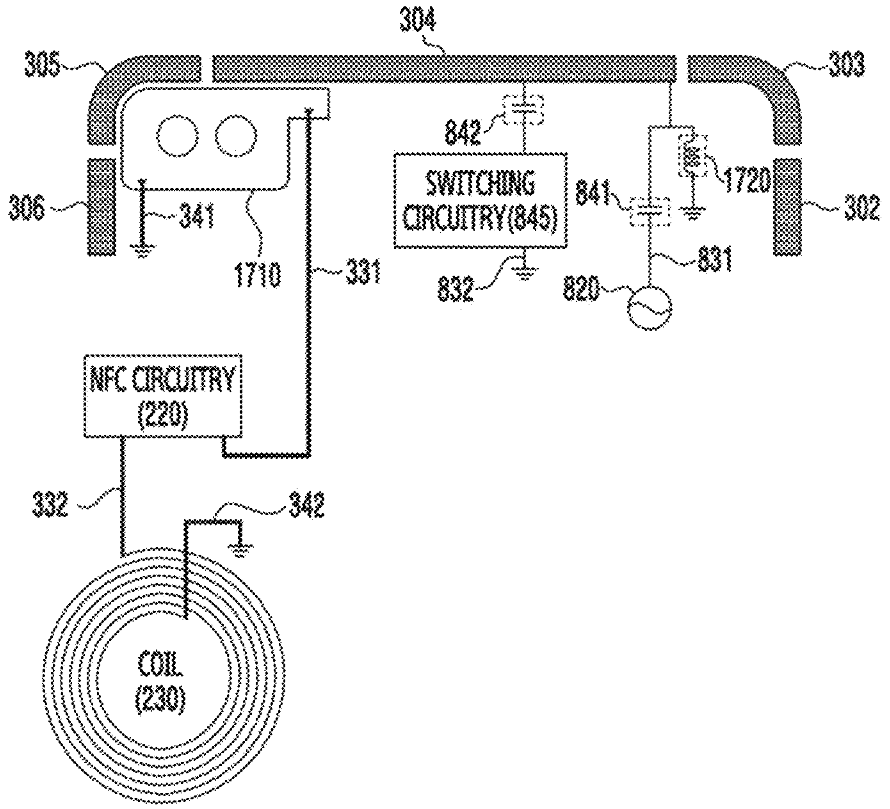

Referring to FIG. 17C, instead of the fourth conductive portion 304 of FIG. 17A, a conductive portion 1710 for protecting a camera (e.g., the camera module 180 of FIG. 1) may be used for NFC communication. The first signal path 331 for the NFC circuitry 220 may be connected to the conductive portion 1710. The NFC circuitry 220 may transmit the first signal from the first terminal 221 to the conductive portion 1710 through the first signal path 331. As a non-limiting example, the conductive portion 1710 may be respectively connected to the ground and the NFC circuitry 220, without an RF choke inductor (e.g., the first inductor 851 and the second inductor 852). For example, the electronic device 101 may not include the first inductor 851 and the second inductor 852. The NFC path (e.g., the first signal path 331 and the first ground path 341) may not include the first inductor 851 and the second inductor 852. Since the conductive portion 1710 is physically spaced apart from the fourth conductive portion 304, the electronic device 101 may not include a separate passive element for signal separation.

The fourth conductive portion 304 may be used as a radiator of an antenna for non-NFC communication (e.g., cellular communication). The wireless communication circuitry 820 may be connected to the fourth conductive portion 304 through the first capacitor 841. The fourth conductive portion 304 may be connected to the ground portion through the second capacitor 842. Each of the first capacitor 841 and the second capacitor 842 may be used to prevent the inflow of electrostatic due to ESD as well as signals in an NFC frequency band (e.g., 13.56 MHz). For example, the first capacitor 841 may be a varistor capacitor (e.g., the first varistor capacitor 1341). For example, the second capacitor 842 may be a varistor capacitor (e.g., the second varistor capacitor 1342). In addition, for example, for ESD prevention, an RF choke inductor 1720 may be connected in parallel to the feeding path 831 of the wireless communication circuitry 820.

Figure 17D:
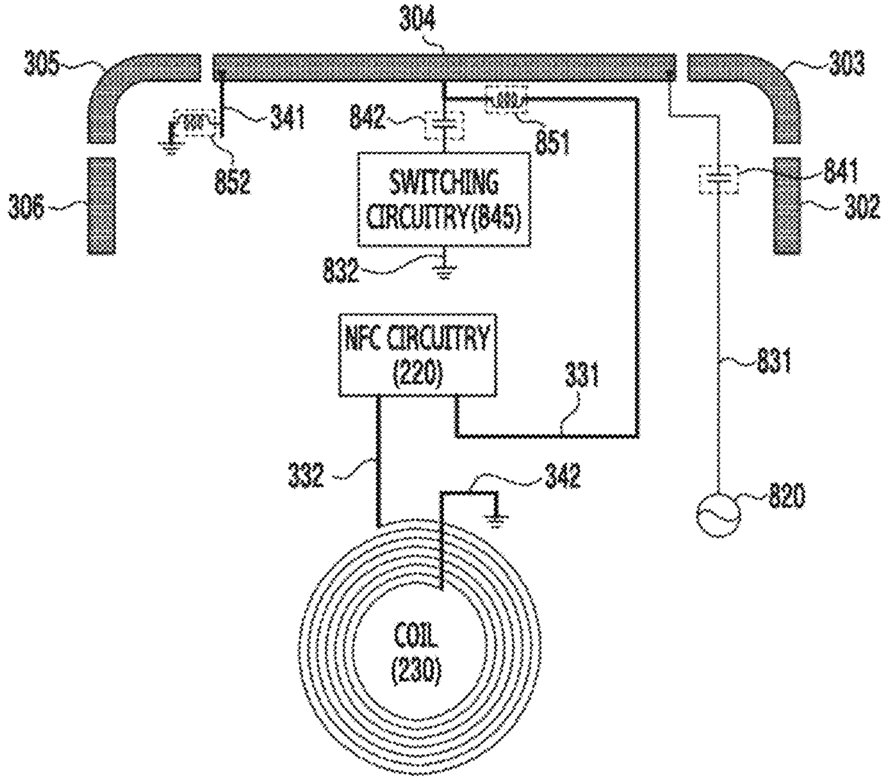

Referring to FIG. 17D, the electronic device 101 may include an NFC circuitry 220 and a coil 230. The descriptions of FIG. 3A may be applicable to describe a circuitry structure of the electronic device 101. The NFC circuitry 220 may be connected to a fourth conductive portion 304 through a first signal path 331. The NFC circuitry 220 may be connected to the coil 230 through a second signal path 332. The NFC circuitry 220 may operate in a differential mode. The NFC circuitry 220 may output a first signal of a differential output through a first terminal 221. The NFC circuitry 220 may transmit the first signal from the first terminal 221 to the fourth conductive portion 304 through the first signal path 331. The NFC circuitry 220 may output a second signal of the differential output through a second terminal 222. The NFC circuitry 220 may transmit the second signal from the second terminal 222 to the coil 230 through the second signal path 332. A first phase of the first signal and a second phase of the second signal may be different by about 180 degrees. The fourth conductive portion 304 may be connected to a ground portion through a first ground path 341. The coil 230 may be connected to the ground portion through a second ground path 342.

In an embodiment, the fourth conductive portion 304 may be used as a radiator for non-NFC communication (e.g., cellular communication). The electronic device 101 may include a wireless communication circuitry 820. The wireless communication circuitry 820 may radiate an RF signal of non-NFC communication through the conductive portion 210, or receive an RF signal of non-NFC communication from an external electronic device (e.g., the electronic device 102, the electronic device 104, or the server 108). The electronic device 101 may include a switching circuitry 845 (or the X-GND circuitry) for impedance matching of the fourth conductive portion 304, which is the radiator of the cellular communication. In an embodiment, for isolation between two signals (e.g., an RF signal of cellular communication and an output signal of NFC communication), the electronic device 101 may include at least one passive element. According to an embodiment, the electronic device 101 may include a first capacitor 841 in a feeding path 831. According to an embodiment, the electronic device 101 may include a second capacitor 842 in a ground path 832. Each of the first capacitor 841 and the second capacitor 842 may have a capacitance for blocking a DC or a frequency less than or equal to a reference. For example, each of the first capacitor 841 and the second capacitor 842 may be used to prevent the inflow of signals in an NFC frequency band (e.g., 13.56 MHz). As a non-limiting example, the first capacitor 841 may be a varistor capacitor (e.g., the first varistor capacitor 1341). As a non-limiting example, the second capacitor 842 may be a varistor capacitor (e.g., the second varistor capacitor 1342).

According to an embodiment, the electronic device 101 may include a first inductor 851 disposed in series on the first signal path 331. Unlike the illustration in FIG. 17A, at least a portion of a transmission path (e.g., the first signal path 331) of the NFC circuitry 220 may be shared with at least a portion of the ground path 832 of the non-NFC communication path for the wireless communication circuitry 820. The first inductor 851 may be connected to the ground path 832. As an example, the first inductor 851 may be connected to a point of the ground path 832 between the second capacitor 842 and the fourth conductive portion 304. The second capacitor 842 may be used to prevent the inflow of signals in the NFC frequency band on the first signal path 331 (or in order to filter the signals, block the signals, and mitigate the intensity of the signals). The transmission path (e.g., the first signal path 331) of the NFC circuitry 220 may be independent of the feeding path 831 of the non-NFC communication path for the wireless communication circuitry 820.

In an embodiment, the electronic device 101 may include the second inductor 852 disposed in series on the first ground path 341. For example, the second inductor 852 may be an RF choke inductor to prevent the inflow of the RF signal in the frequency band of cellular communication. In an embodiment, the first signal path 331 may include the first inductor 851. For example, the first inductor 851 may be an RF choke inductor to prevent the inflow of the RF signal in the frequency band of cellular communication.

Figure 17E:
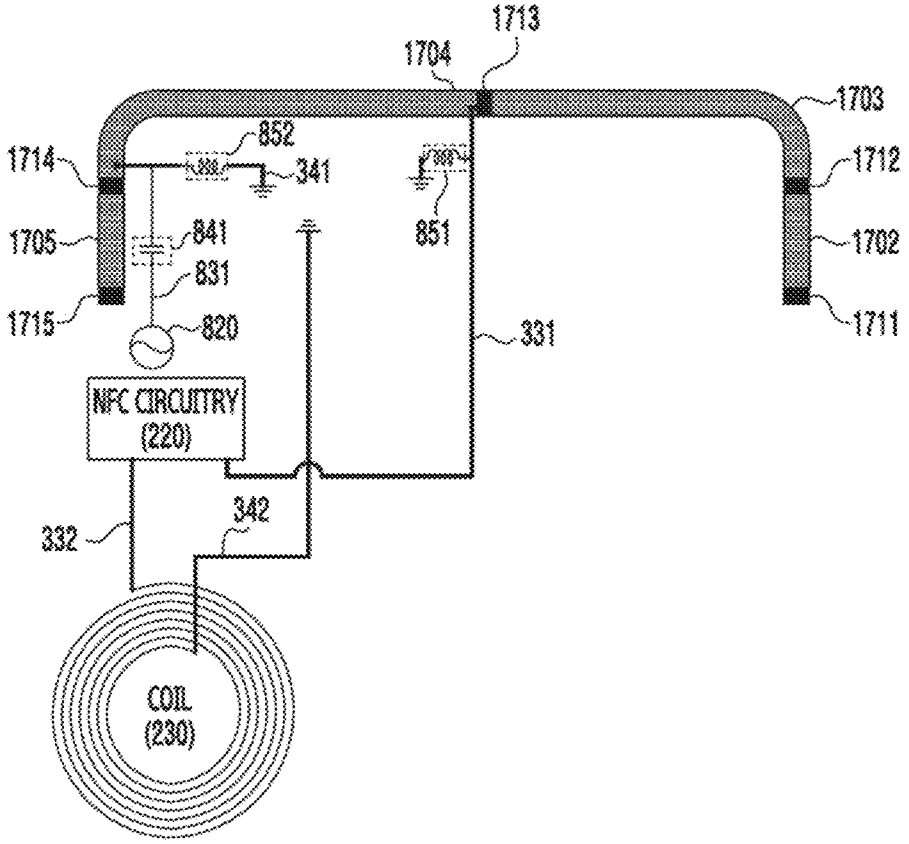

Referring to FIG. 17E, the electronic device 101 may include a plurality of conductive portions and a plurality of non-conductive portions. For example, a metal frame of the electronic device 101 may include the plurality of conductive portions. For example, the plurality of conductive portions may include a second conductive portion 1702, a third conductive portion 1703, a fourth conductive portion 1704, and/or a fifth conductive portion 1705. For example, the plurality of non-conductive portions may include a first non-conductive portion 1711, a second non-conductive portion 1712, a third non-conductive portion 1713, a fourth non-conductive portion 1714, or a fifth non-conductive portion 1715. The descriptions of FIG. 17B may be referred for description of each of the conductive portion and the non-conductive portion. FIG. 17B illustrates a circuitry structure in which at least a portion of the first signal path 331 for the NFC circuitry 220 and the feeding path 831 from the wireless communication circuitry 820 are shared, but embodiments of the disclosure are not limited thereto. At least a portion of the first ground path 341 for the NFC circuitry 220 may be shared with at least a portion of the feeding path 831 from the wireless communication circuitry 820. For example, at least a portion of the first signal path 331 for the NFC circuitry 220 may be connected to the fourth conductive portion 1714, independently of the feeding path 831 from the wireless communication circuitry 820.

In an embodiment, the electronic device 101 may include a first inductor 851 disposed in parallel with the first signal path 331. The electronic device 101 may include a second inductor 852 disposed in series with the first ground path 341. The first inductor 851 may be an RF choke inductor for preventing the inflow of the RF signal in the frequency band of cellular communication. The first ground path 341 may include the second inductor 852. The second inductor 852 may be an RF choke inductor for preventing the inflow of the RF signal in the frequency band of cellular communication.

Figure 18A:
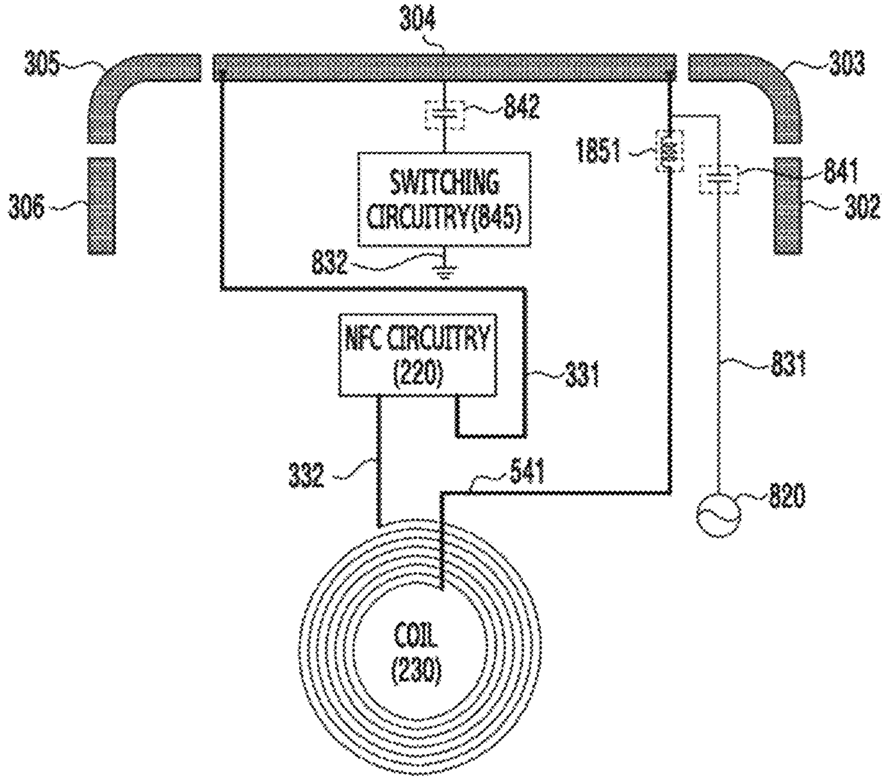
FIGS. 18A, 18B, and 18C illustrate examples of an electronic device including an NFC circuitry using a conductive portion and a coil.
Figure 18B:
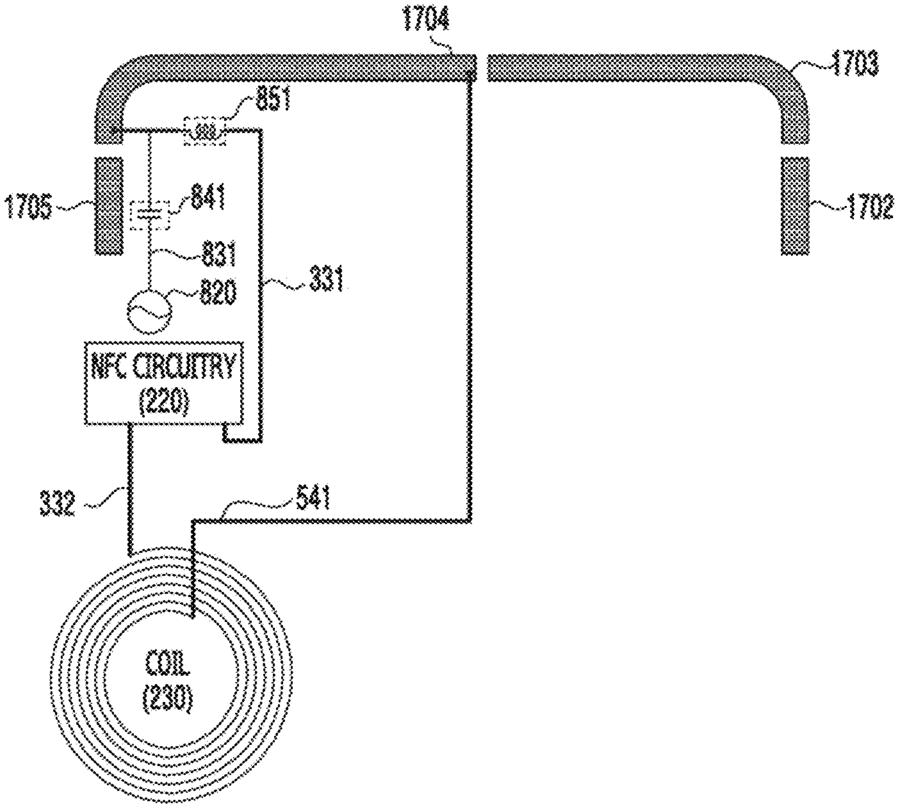
Figure 18C:
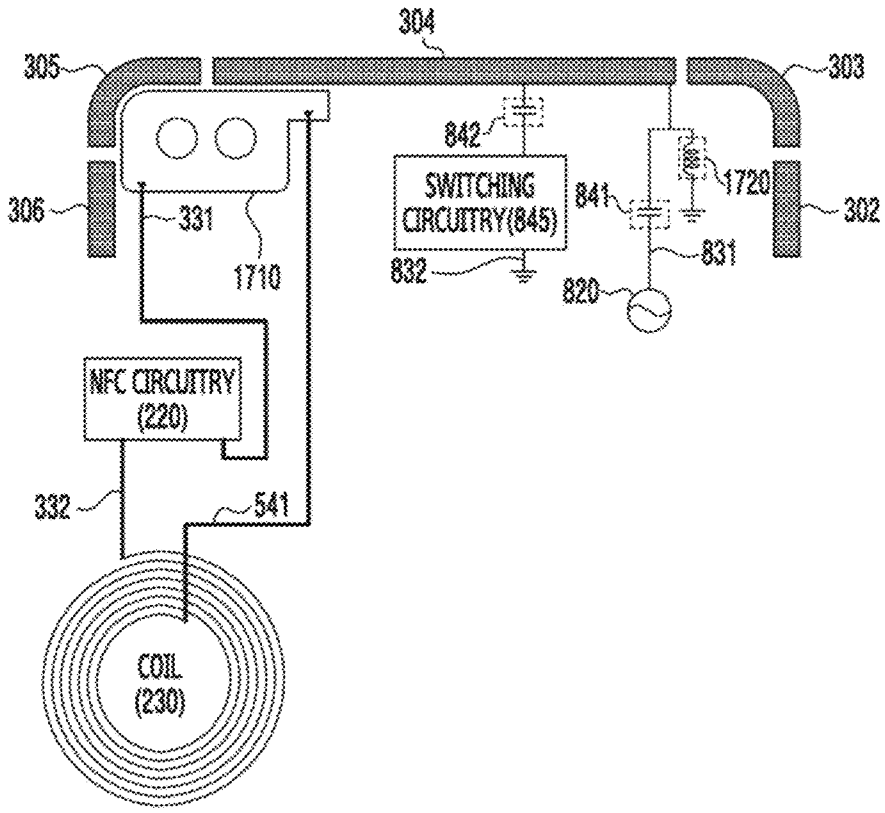

FIGS. 18A, 18B, and 18C illustrate examples of an electronic device (e.g., an electronic devices 101) including an NFC circuitry (e.g., an NFC circuitry 220) using a conductive portion (e.g., a conductive portion 210) and a coil (e.g., a coil 230). Identical reference numbers may indicate identical or similar descriptions.

Referring to FIG. 18A, the electronic device 101 may include the NFC circuitry 220 and the coil 230. The descriptions of FIG. 5 may be applicable to describe a circuitry structure of the electronic device 101. The NFC circuitry 220 may be connected to a fourth conductive portion 304 through a first signal path 331. The NFC circuitry 220 may be connected to the coil 230 through a second signal path 332. The NFC circuitry 220 may operate in a differential mode. The NFC circuitry 220 may output a first signal of a differential output through a first terminal 221. The NFC circuitry 220 may transmit the first signal from the first terminal 221 to the fourth conductive portion 304 through the first signal path 331. The NFC circuitry 220 may output a second signal of the differential output through a second terminal 222. The NFC circuitry 220 may transmit the second signal from the second terminal 222 to the coil 230 through the second signal path 332. A first phase of the first signal and a second phase of the second signal may be different by about 180 degrees. The fourth conductive portion 304 and the coil 230 may be connected through a third transmission path 541. The first signal may be transmitted from the fourth conductive portion 304 to the coil 230 through the third transmission path 541. The second signal may be transmitted from the coil 230 to the fourth conductive portion 304 through the third transmission path 541. The third transmission path 541 may correspond to a first connection type 251.

The fourth conductive portion 304 may be used as a radiator for non-NFC communication (e.g., cellular communication). The electronic device 101 may include a wireless communication circuitry 820. The wireless communication circuitry 820 may radiate an RF signal through the conductive portion 210 or receive the RF signal from an external electronic device (e.g., an electronic device 102, an electronic device 104, or a server 108). For example, the electronic device 101 may include a switching circuitry 845 (or an X-ground (X-GND) circuitry) for impedance matching of the fourth conductive portion 304, which is the radiator of cellular communication.

In an embodiment, the electronic device 101 may include at least one passive element for isolation between two signals (e.g., an RF signal of cellular communication and an output signal of NFC communication). According to an embodiment, the electronic device 101 may include a first capacitor 841 in a feeding path 831. The electronic device 101 may include a second capacitor 842 in a ground path 832. Each of the first capacitor 841 and the second capacitor 842 may have a capacitance for blocking a DC or blocking a frequency less than or equal to a reference. For example, each of the first capacitor 841 and the second capacitor 842 may be used to prevent the inflow of signals in an NFC frequency band (e.g., 13.56 MHz). As a non-limiting example, the first capacitor 841 may be a varistor capacitor (e.g., a first varistor capacitor 1341). As a non-limiting example, the second capacitor 842 may be a varistor capacitor (e.g., a second varistor capacitor 1342). According to an embodiment, the electronic device 101 may include an inductor 1851 disposed in series on the third transmission path 541. At least a portion of the third transmission path 541 may correspond to at least a portion of the feeding path 831 of the wireless communication circuitry 820. The inductor 1851 may be an RF choke inductor for preventing the inflow of an RF signal in a frequency band of cellular communication.

Referring to FIG. 18B, instead of the fourth conductive portion 304 of FIG. 18A, a fourth conductive portion 1704 may be used as a radiator for NFC communication and non-NFC communication (e.g., cellular communication). The description of FIG. 17B may be referred for each conductive portion of FIG. 18B. The first signal path 331 for the NFC circuitry 220 may be connected to the fourth conductive portion 1704. The NFC circuitry 220 may transmit the first signal from the first terminal 221 to the fourth conductive portion 1704 through the first signal path 331. For example, the first signal path 331 may include a first inductor 851. The fourth conductive portion 1704 may be connected to the coil 230 through the third transmission path 541. The wireless communication circuitry 820 may be connected to the fourth conductive portion 1704 through the first capacitor 841. The fourth conductive portion 1704 may be used as a radiator for cellular communication.

Referring to FIG. 18C, instead of the fourth conductive portion 304 of FIG. 18A, a conductive portion 1710 for protecting a camera (e.g., the camera module 180 of FIG. 1) may be used for NFC communication. The first signal path 331 for the NFC circuitry 220 may be connected to the conductive portion 1710. The NFC circuitry 220 may transmit the first signal from the first terminal 221 to the conductive portion 1710 through the first signal path 331. The conductive portion 1710 may be connected to the coil 230 through the third transmission path 541. As a non-limiting example, the conductive portion 1710 may be connected to the NFC circuitry 220 and the coil 230 without an RF choke inductor (e.g., the first inductor 851 and the second inductor 852). For example, the electronic device 101 may not include the first inductor 851 and the second inductor 852. The NFC path (e.g., the first signal path 331 and the first ground path 341) may not include the first inductor 851 and the second inductor 852. Since the conductive portion 1710 is physically spaced apart from the fourth conductive portion 304, the electronic device 101 may not include a separate passive element for signal separation.

The fourth conductive portion 304 may be used as a radiator of an antenna for non-NFC communication (e.g., cellular communication). The wireless communication circuitry 820 may be connected to the fourth conductive portion 304 through the first capacitor 841. The fourth conductive portion 304 may be connected to a ground portion through the second capacitor 842. For example, each of the first capacitor 841 and the second capacitor 842 may be used to prevent the inflow of electrostatic due to ESD as well as signals in an NFC frequency band (e.g., 13.56 MHz). For example, the first capacitor 841 may be a varistor capacitor (e.g., the first varistor capacitor 1341). For example, the second capacitor 842 may be a varistor capacitor (e.g., the second varistor capacitor 1342). In addition, for example, for ESD prevention, an RF choke inductor 1720 may be connected in parallel to the feeding path 831 of the wireless communication circuitry 820.

Figure 19A:
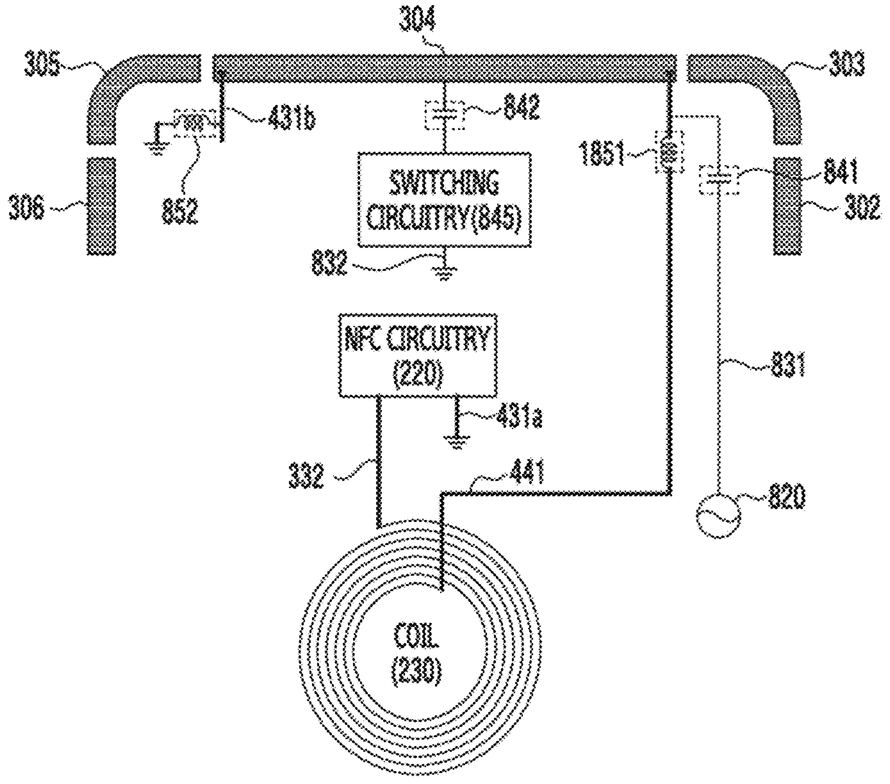
FIGS. 19A, 19B, and 19C illustrate examples of an electronic device using a conductive portion and a coil.
Figure 19B:
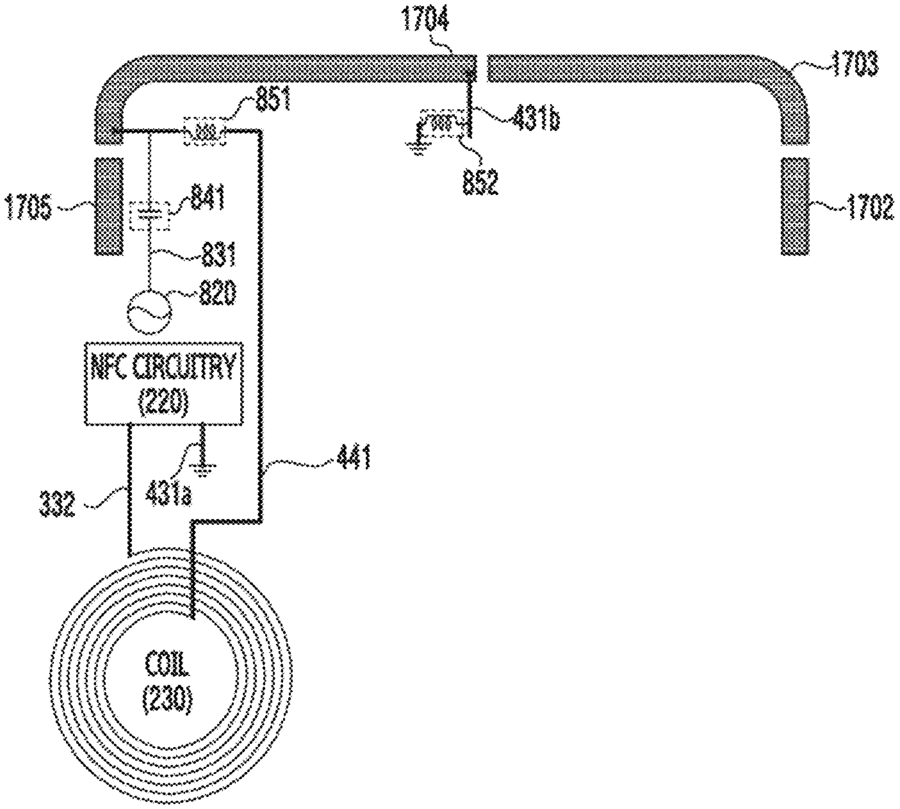
Figure 19C:
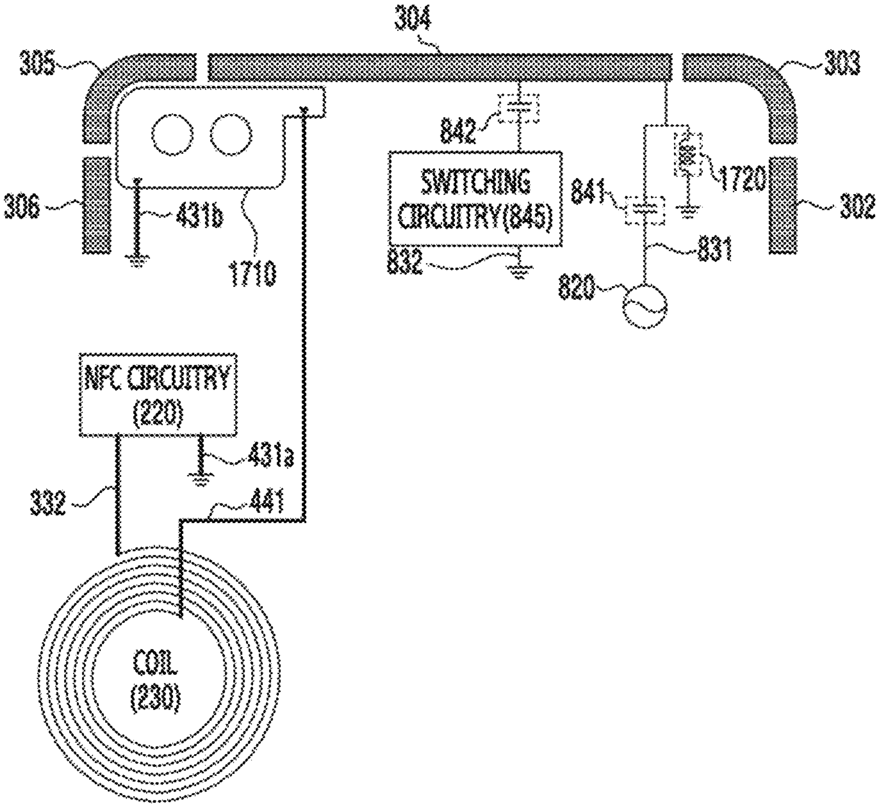

FIG. 19A, FIG. 19B, and FIG. 19C illustrate examples of an electronic device (e.g., an electronic devices 101) using a conductive portion (e.g., a conductive portion 210) and a coil (e.g., a coil 230). Identical reference numbers may indicate identical or similar descriptions.

Referring to FIG. 19A, the electronic device 101 may include an NFC circuitry 220 and the coil 230. The descriptions of FIG. 4A may be applicable to describe a circuitry structure of the electronic device 101. A first terminal 221 of the NFC circuitry 220 may be connected to a ground portion through a first ground path 431*a*. A second terminal 222 of the NFC circuitry 220 may be connected to the coil 230 through a second signal path 332. The coil 230 may be connected to a fourth conductive portion 304 through a third transmission path 441. The fourth conductive portion 304 may be connected to the ground portion through a second ground path 431*b*. The NFC circuitry 220 may operate in a differential mode. The NFC circuitry 220 may output a first signal of a differential output through the first terminal 221. The first signal may be grounded through the first ground path 431*a*. The NFC circuitry 220 may output a second signal of the differential output through the second terminal 222. The NFC circuitry 220 may transmit the second signal from the second terminal 222 to the coil 230 through the second signal path 332. A first phase of the first signal and a second phase of the second signal may be different by about 180 degrees. The fourth conductive portion 304 and the coil 230 may be connected through the third transmission path 441. The second signal may be transmitted from the coil 230 to the fourth conductive portion 304 through the third transmission path 441. The third transmission path 441 may correspond to a first connection type 251.

The fourth conductive portion 304 may be used as a radiator for non-NFC communication (e.g., cellular communication). The electronic device 101 may include a wireless communication circuitry 820. The wireless communication circuitry 820 may radiate the RF signal through the fourth conductive portion 304 or receive the RF signal from an external electronic device (e.g., the electronic device 102, the electronic device 104, or the server 108). The electronic device 101 may include a switching circuitry 845 (or an X-GND circuitry) for impedance matching of the fourth conductive portion 304, which is the radiator of cellular communication.

In an embodiment, the electronic device 101 may include at least one passive element for isolation between two signals (e.g., an RF signal of cellular communication and an output signal of NFC communication). According to an embodiment, for example, the electronic device 101 may include a first capacitor 841 on a feeding path 831. The electronic device 101 may include a second capacitor 842 on a ground path 832. Each of the first capacitor 841 and the second capacitor 842 may have a capacitance for blocking a DC or blocking a frequency less than or equal to a reference. For example, each of the first capacitor 841 and the second capacitor 842 may be used to prevent the inflow of signals in an NFC frequency band (e.g., 13.56 MHz). As a non-limiting example, the first capacitor 841 may be a varistor capacitor (e.g., a first varistor capacitor 1341). As a non-limiting example, the second capacitor 842 may be a varistor capacitor (e.g., a second varistor capacitor 1342). According to an embodiment b, the electronic device 101 may include an inductor 1851 disposed in series on the third transmission path 441. At least a portion of the third transmission path 441 may be used as at least a portion of the feeding path 831 of the wireless communication circuitry 820. The electronic device 101 may include a second inductor 852 disposed in series on the second ground path 431*b*. The second inductor 852 and/or the inductor 1851 may be an RF choke inductor for preventing the inflow of an RF signal in a frequency band of cellular communication.

Referring to FIG. 19B, instead of the fourth conductive portion 304 of FIG. 19A, a conductive portion 1704 may be used as a radiator for NFC communication and non-NFC communication (e.g., cellular communication). The description of FIG. 17B may be referred for each conductive portion of FIG. 19B. The third transmission path 441 for the NFC circuitry 220 may be connected to the fourth conductive portion 1704. The NFC circuitry 220 may transmit the first signal from the first terminal 221 to the fourth conductive portion 1704 through the first signal path 331. For example, the first signal path 331 may include a first inductor 851. The fourth conductive portion 1704 may be connected to the coil 230 through the third transmission path 441. The wireless communication circuitry 820 may be connected to the fourth conductive portion 1704 through the first capacitor 841. The fourth conductive portion 1704 may be used as a radiator for non-NFC communication (e.g., cellular communication). Due to the second inductor 852, the second ground path 431*b* may be understood as an open circuitry, in terms of a frequency of the RF signal of the wireless communication circuitry 820.

Referring to FIG. 19C, instead of the fourth conductive portion 304 of FIG. 19A, a conductive portion 1710 for protecting a camera (e.g., the camera module 180 of FIG. 1) may be used for NFC communication. The coil 230 may be connected to the conductive portion 1710 through the third transmission path 441. The NFC circuitry 220 may transmit the first signal from the first terminal 221 to the conductive portion 1710 through the third transmission path 441. The conductive portion 1710 may be connected to the ground portion through the second ground path 431*b*. As a non-limiting example, the conductive portion 1710 may be connected to the coil 230 and the ground without an RF choke inductor (e.g., the first inductor 851 and the second inductor 852). For example, the electronic device 101 may not include the first inductor 851 and the second inductor 852. For example, an NFC path (e.g., the third transmission path 441, or the second ground path 431*b*) using the conductive portion 1710 may not include the first inductor 851 and the second inductor 852. Since the conductive portion 1710 is physically spaced apart from the fourth conductive portion 304, the electronic device 101 may not include a separate passive element for signal separation.

The fourth conductive portion 304 may be used as a radiator of an antenna for non-NFC communication (e.g., cellular communication). The wireless communication circuitry 820 may be connected to the fourth conductive portion 304 through the first capacitor 841. The fourth conductive portion 304 may be connected to the ground portion through a second capacitor 842. For example, each of the first capacitor 841 and the second capacitor 842 may be used to prevent the inflow of electrostatic due to ESD as well as signals in an NFC frequency band (e.g., 13.56 MHz). For example, the first capacitor 841 may be a varistor capacitor (e.g., a first varistor capacitor 1341). For example, the second capacitor 842 may be a varistor capacitor (e.g., a second varistor capacitor 1342). In addition, for example, for ESD prevention, an RF choke inductor 1720 may be connected in parallel to the feeding path 831 of the wireless communication circuitry 820.

Figure 20A:
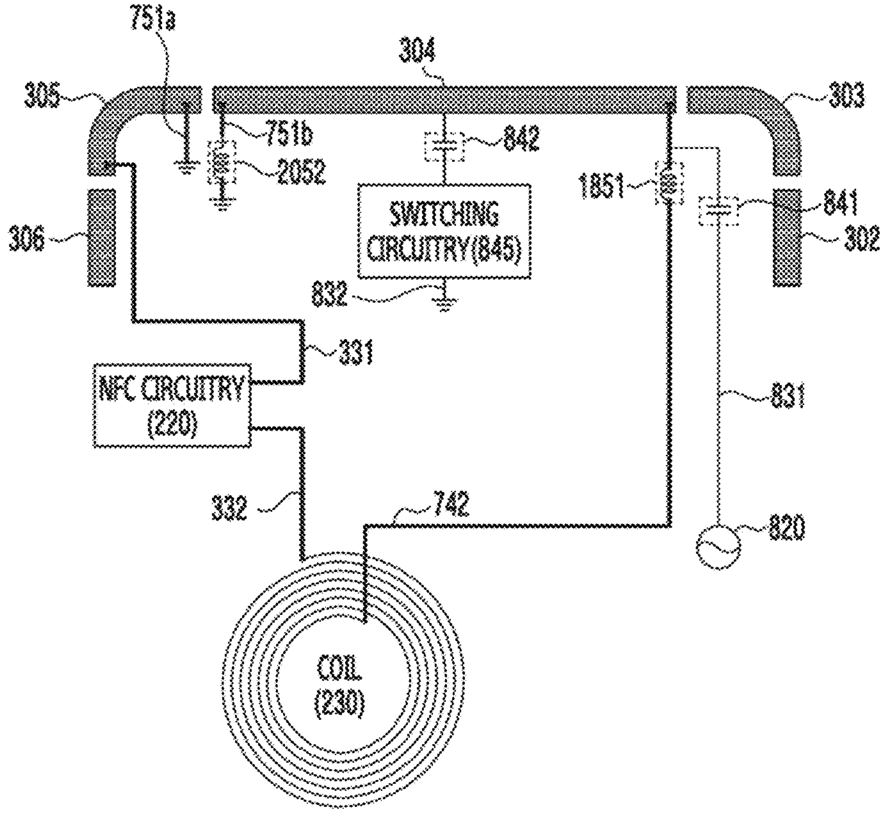
FIGS. 20A and 20B illustrate examples of an electronic device including an NFC circuitry using a plurality of conductive portions.
Figure 20B:
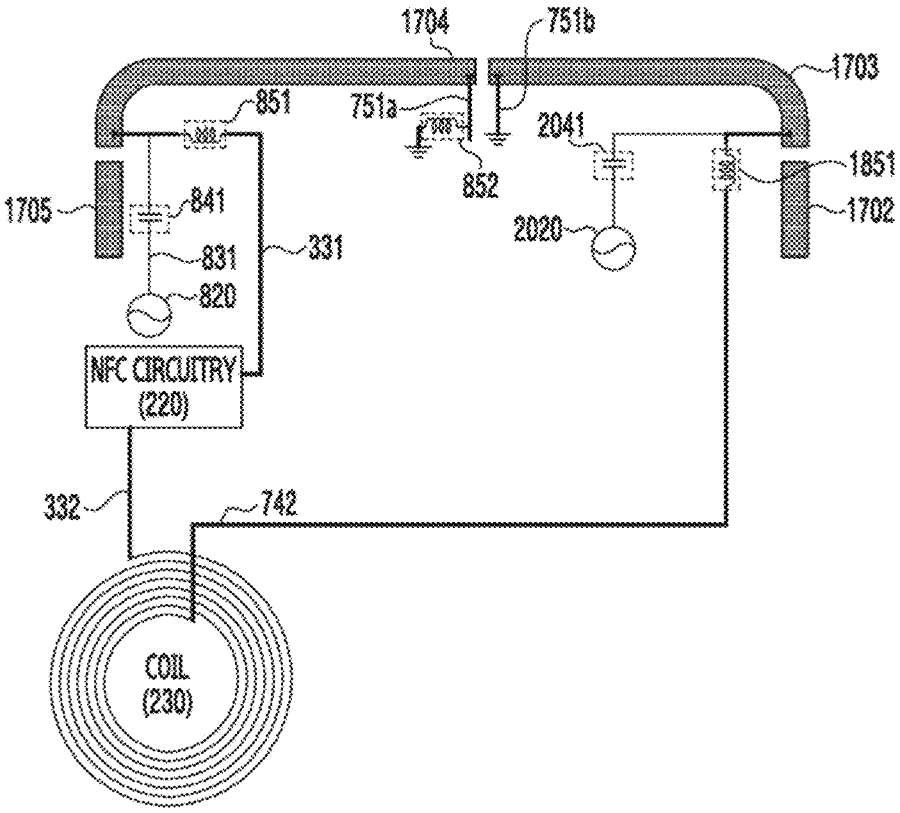

FIGS. 20A and 20B illustrate examples of an electronic device (e.g., an electronic device 101) including an NFC circuitry (e.g., an NFC circuitry 220) using a plurality of conductive portions. Identical reference numbers may indicate identical or similar descriptions.

Referring to FIG. 20A, the electronic device 101 may include the NFC circuitry 220 and a coil 230. The descriptions of FIG. 7A may be applicable to describe a circuitry structure of the electronic device 101. A fourth conductive portion 304 and a fifth conductive portion 305 may be used as a radiator for NFC communication. In FIG. 20A, contrary to the illustration in FIG. 7A, the fifth conductive portion 305 may be electrically connected to the NFC circuitry 220, and the fourth conductive portion 304 may be electrically connected to the coil 230.

The NFC circuitry 220 may be connected to a fifth non-conductive portion 315 through a first signal path 331. The coil 230 may be used as a radiator for NFC communication. The NFC circuitry 220 may include transmission terminals. For example, the NFC circuitry 220 may include a first terminal 221 and a second terminal 222. The first terminal 221 of the NFC circuitry 220 may be connected to the fifth conductive portion 305 through the first signal path 331. The second terminal 222 of the NFC circuitry 220 may be connected to the coil 230 through a second signal path 332. The fifth conductive portion 305 may be connected to a ground portion through a first ground path 751*a*. The fourth conductive portion 304 may be connected to a ground portion through a second ground path 751*b*. For example, the ground portion may be a portion of a ground area (e.g., a PCB on which the NFC circuitry 220 is disposed, or a portion of a support member of the electronic device 101). The NFC circuitry 220 may operate in a differential mode. The NFC circuitry 220 may output a first signal of a differential output through the first terminal 221. The NFC circuitry 220 may transmit the first signal from the first terminal 221 to the fifth conductive portion 305 through the first signal path 331. The NFC circuitry 220 may output a second signal of the differential output through the second terminal 222. The NFC circuitry 220 may transmit the second signal from the second terminal 222 to the coil 230 through the second signal path 332. A first phase of the first signal and a second phase of the second signal may be different by about 180 degrees. The coil 230 may be connected to the fourth conductive portion 304 through a third transmission path 742. The third transmission path 742 may correspond to a first connection type 251.

The fourth conductive portion 304 may be used as a radiator for non-NFC communication (e.g., cellular communication). The electronic device 101 may include a wireless communication circuitry 820. The wireless communication circuitry 820 may radiate an RF signal through the conductive portion 210, or receive the RF signal from an external electronic device (e.g., the electronic device 102, the electronic device 104, or the server 108). For example, the electronic device 101 may include a switching circuitry 845 (or X-GND circuitry) for impedance matching of the fourth conductive portion 304, which is the radiator of cellular communication. In an embodiment, the electronic device 101 may include at least one passive element for isolation between two signals (e.g., an RF signal of cellular communication and an output signal of NFC communication). According to an embodiment, the electronic device 101 may include a first capacitor 841 in a feeding path 831. The electronic device 101 may include a second capacitor 842 in a ground path 832. Each of the first capacitor 841 and the second capacitor 842 may have a capacitance for blocking a DC or blocking a frequency less than or equal to a reference. For example, each of the first capacitor 841 and the second capacitor 842 may be used to prevent the inflow of signals in an NFC frequency band (e.g., 13.56 MHz). As a non-limiting example, the first capacitor 841 may be a varistor capacitor (e.g., the first varistor capacitor 1341). As a non-limiting example, the second capacitor 842 may be a varistor capacitor (e.g., the second varistor capacitor 1342). According to an embodiment, the electronic device 101 may include an inductor 1851 disposed in series on the third transmission path 742. At least a portion of the third transmission path 742 may be used as at least a portion of the feeding path 831 of the wireless communication circuitry 820. The electronic device 101 may include an inductor 2052 disposed in series on a second ground path 751*b*. The inductor 2052 may be an RF choke inductor for preventing the inflow of an RF signal in a frequency band of cellular communication.

Referring to FIG. 20B, instead of the third conductive portion 303, the fourth conductive portion 304, and the fifth conductive portion 305 of FIG. 20A, a third conductive portion 1703 and a fourth conductive portion 1704 may be used as a radiator for NFC communication and non-NFC communication (e.g., cellular communication). The description of FIG. 17B may be referred for each conductive portion of FIG. 20B. The first signal path 331 for the NFC circuitry 220 may be connected to the fourth conductive portion 1704. The NFC circuitry 220 may transmit the first signal from the first terminal 221 to the fourth conductive portion 1704 through the first signal path 331. For example, the first signal path 331 may include a first inductor 851. The fourth conductive portion 1704 may be connected to the ground portion through a first ground path 751*a*. The wireless communication circuitry 820 may be connected to the fourth conductive portion 1704 through a first capacitor 841. The fourth conductive portion 1704 may be used as a radiator for non-NFC communication (e.g., cellular communication, wireless LAN communication). The electronic device 101 may include a second inductor 852 disposed in series on the first ground path 751*a*. For example, the first inductor 851 may be an RF choke inductor for preventing the inflow of an RF signal in a frequency band of cellular communication. For example, the second inductor 852 may be an RF choke inductor for preventing the inflow of an RF signal in a frequency band of cellular communication.

In an embodiment, the third conductive portion 1703 may be electrically connected to a wireless communication circuitry 2020 distinct from the wireless communication circuitry 820. For example, the wireless communication circuitry 2020 may be configured to provide signals of cellular communication in a different frequency band than the wireless communication circuitry 820. For another example, the wireless communication circuitry 2020 may be configured to provide signals of a different communication method (e.g., WiFi) from the wireless communication circuitry 820. Although FIG. 20B illustrates the wireless communication circuitry 820 and the wireless communication circuitry 2020 as separate circuits, embodiments of the disclosure are not limited thereto. For example, the wireless communication circuitry 820 and the wireless communication circuitry 2020 may be a single circuitry. As an example, in the wireless communication circuitry 820, signals of a first frequency band may be provided to the fourth conductive portion 1704, and signals of a frequency band different from the first frequency band may be provided to the third conductive portion 1703. For example, the wireless communication circuitry 2020 may be connected to the third conductive portion 1703 through a capacitor 2041. The third conductive portion 1703 may be used as a radiator for cellular communication. The third conductive portion 1703 may be connected to a ground portion through a second ground path 751*b*. The third conductive portion 1703 may be connected to the coil 230 through a third transmission path 742. The third transmission path 742 may include an inductor 1851 for preventing the inflow of an RF signal in a frequency band of cellular communication.

Figure 21A:
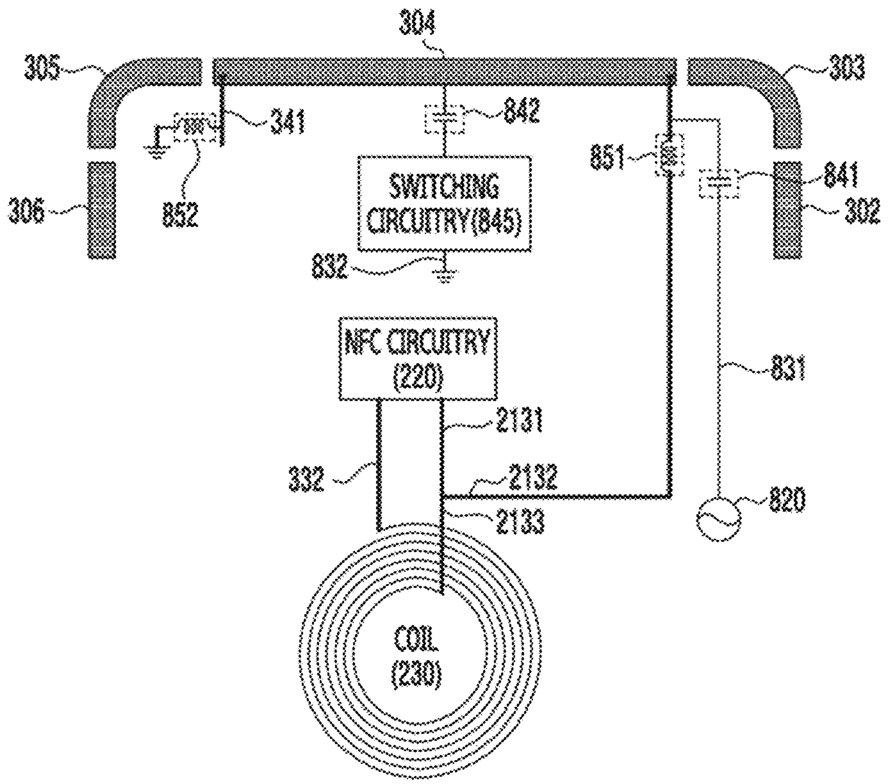
FIGS. 21A, 21B, and 21C illustrate examples of an electronic device including an NFC circuitry using a conductive portion and a coil.
Figure 21B:
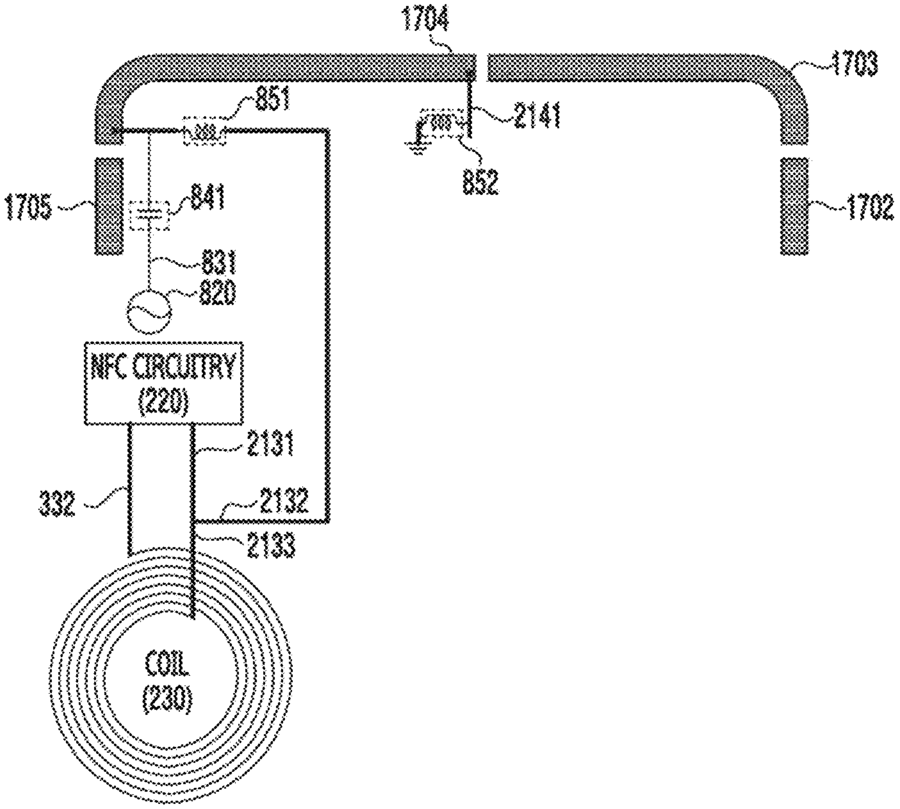
Figure 21C:
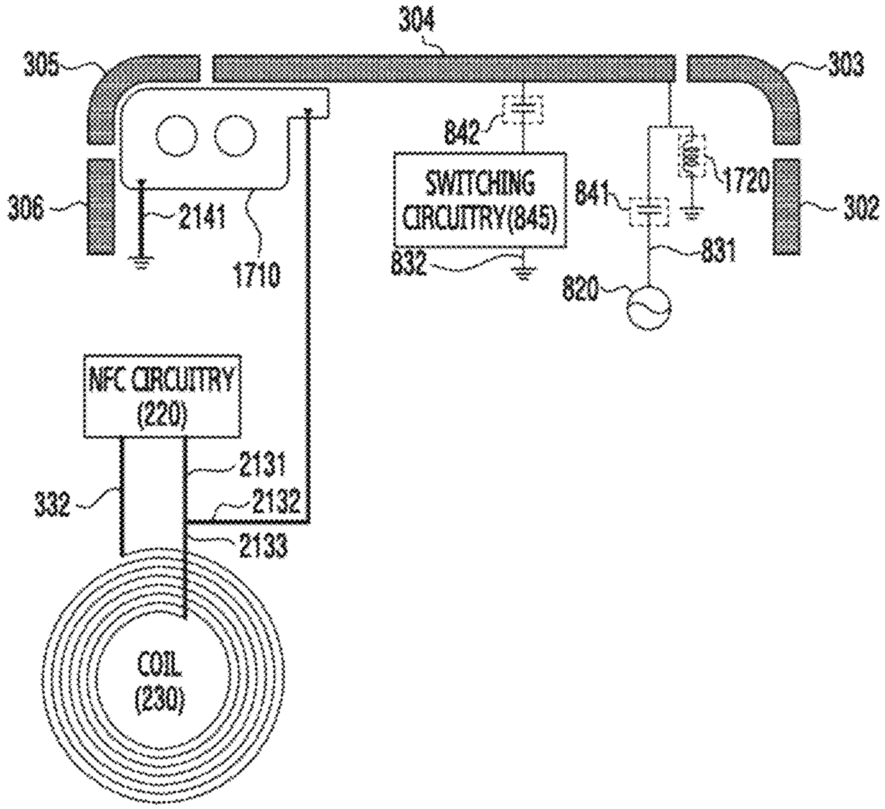

FIGS. 21A, 21B, and 21C illustrate examples of an electronic device including an NFC circuitry (e.g., an NFC circuitry 220) using a conductive portion (e.g., a conductive portion 210) and a coil (e.g., the coil 230). Identical reference numbers may indicate identical or similar descriptions.

Referring to FIG. 21A, an electronic device 101 may include the NFC circuitry 220 and the coil 230. The NFC circuitry 220 may operate in a differential mode. The NFC circuitry 220 may output a first signal of a differential output through a first terminal 221. The first signal may be transmitted along a first transmission path 2131. The first transmission path 2131 may be branched into two transmission paths. For example, the first signal may be transmitted along a second transmission path 2132 and a third transmission path 2133. The NFC circuitry 220 may be connected to a fourth conductive portion 304 through the second transmission path 2132. The first terminal 221 of the NFC circuitry 220 may be electrically connected to the coil 230 through the first transmission path 2131 and the third transmission path 2133. The NFC circuitry 220 may be connected to the coil 230 through a second signal path 332. The NFC circuitry 220 may output a second signal of the differential output through a second terminal 222. The NFC circuitry 220 may transmit the second signal from the second terminal 222 to the coil 230 through the second signal path 332. A first phase of the first signal and a second phase of the second signal may be different by about 180 degrees. The fourth conductive portion 304 may be connected to a ground portion through a first ground path 341. The coil 230 may be connected to the ground portion through a second ground path 342. While both ends of the coil 230 are connected to the NFC circuitry 220, an output (e.g., the first signal of the first terminal 221) of the NFC circuitry 220 may be provided to a conductive portion (e.g., the fourth conductive portion 304). As an example, while the NFC performance of a rear surface (e.g., a position of the coil 230) is maintained, the NFC performance at an upper end (e.g., a position of the fourth conductive portion 304) may be additionally secured.

The fourth conductive portion 304 may be used as a radiator for cellular communication. The electronic device 101 may include a wireless communication circuitry 820. The wireless communication circuitry 820 may radiate the RF signal through the fourth conductive portion 304, or receive the RF signal from an external electronic device (e.g., an electronic device 102, an electronic device 104, or a server 108). For example, the electronic device 101 may include a switching circuitry 845 (or X-GND circuitry) for impedance matching of the fourth conductive portion 304, which is the radiator of cellular communication. In an embodiment, the electronic device 101 may include at least one passive element for isolation between two signals (e.g., an RF signal of cellular communication and an output signal of NFC communication). According to an embodiment, for example, the electronic device 101 may include a first capacitor 841 on a feeding path 831. The electronic device 101 may include a second capacitor 842 on a ground path 832. Each of the first capacitor 841 and the second capacitor 842 may have a capacitance for blocking a DC or blocking a frequency less than or equal to a reference. For example, each of the first capacitor 841 and the second capacitor 842 may be used to prevent the inflow of signals in an NFC frequency band (e.g., 13.56 MHz). As a non-limiting example, the first capacitor 841 may be a varistor capacitor (e.g., a first varistor capacitor 1341). As a non-limiting example, the second capacitor 842 may be a varistor capacitor (e.g., a second varistor capacitor 1342). According to an embodiment, the electronic device 101 may include a first inductor 851 disposed in series on the second transmission path 2132. The electronic device 101 may include a second inductor 852 disposed in series on the first ground path 341. The first inductor 851 may be an RF choke inductor for preventing the inflow of an RF signal in a frequency band of cellular communication. The first ground path 341 may include the second inductor 852. The second inductor 852 may be an RF choke inductor for preventing the inflow of an RF signal in a frequency band of cellular communication.

Referring to FIG. 21B, instead of the fourth conductive portion 304, a conductive portion 1704 may be used as a radiator for NFC communication and cellular communication. The second transmission path 2132 for the NFC circuitry 220 may be connected to the conductive portion 1704. The NFC circuitry 220 may transmit the first signal from the first terminal 221 to the conductive portion 1704 through the second transmission path 2132. For example, the second transmission path 2132 may include the first inductor 851. The conductive portion 1704 may be connected to a ground portion through a first ground path 2141. For example, the first ground path 2141 may include the second inductor 852. The wireless communication circuitry 820 may be connected to the conductive portion 1704 through the first capacitor 841. The conductive portion 1704 may be used as a radiator for cellular communication. Due to the second inductor 852, the first ground path 2141 may be understood as an open circuitry in terms of a frequency of the RF signal of the wireless communication circuitry 820.

Referring to FIG. 21C, instead of the fourth conductive portion 304, a conductive portion 1710 for protecting a camera (e.g., the camera module 180 of FIG. 1) may be used for NFC communication. The second transmission path 2132 for the NFC circuitry 220 may be connected to the conductive portion 1710. The NFC circuitry 220 may transmit the first signal from the first terminal 221 to the conductive portion 1710 through the first transmission path 2131 and the second transmission path 2132. As a non-limiting example, the conductive portion 1710 may be connected to the ground and the NFC circuitry 220 without an RF choke inductor (e.g., the first inductor 851 and the second inductor 852). For example, the electronic device 101 may not include the first inductor 851 and the second inductor 852. For example, an NFC path (e.g., the second transmission path 2132 and the first ground path 2141) using the conductive portion 1710 may not include the first inductor 851 and/or the second inductor 852. Since the conductive portion 1710 is physically spaced apart from the fourth conductive portion 304, the electronic device 101 may not include a separate passive element for signal separation.

The fourth conductive portion 304 may be used as a radiator of an antenna for cellular communication. The wireless communication circuitry 820 may be connected to the fourth conductive portion 304 through the first capacitor 841. The fourth conductive portion 304 may be connected to the ground portion through the second capacitor 842. For example, each of the first capacitor 841 and the second capacitor 842 may be used to prevent the inflow of electrostatic due to ESD as well as signals in an NFC frequency band (e.g., 13.56 MHz). For example, the first capacitor 841 may be a varistor capacitor (e.g., the first varistor capacitor 1341). For example, the second capacitor 842 may be a varistor capacitor (e.g., the second varistor capacitor 1342). In addition, for example, for ESD prevention, an RF choke inductor 1720 may be connected in parallel to the feeding path 831 of the wireless communication circuitry 820.

Figure 22A:
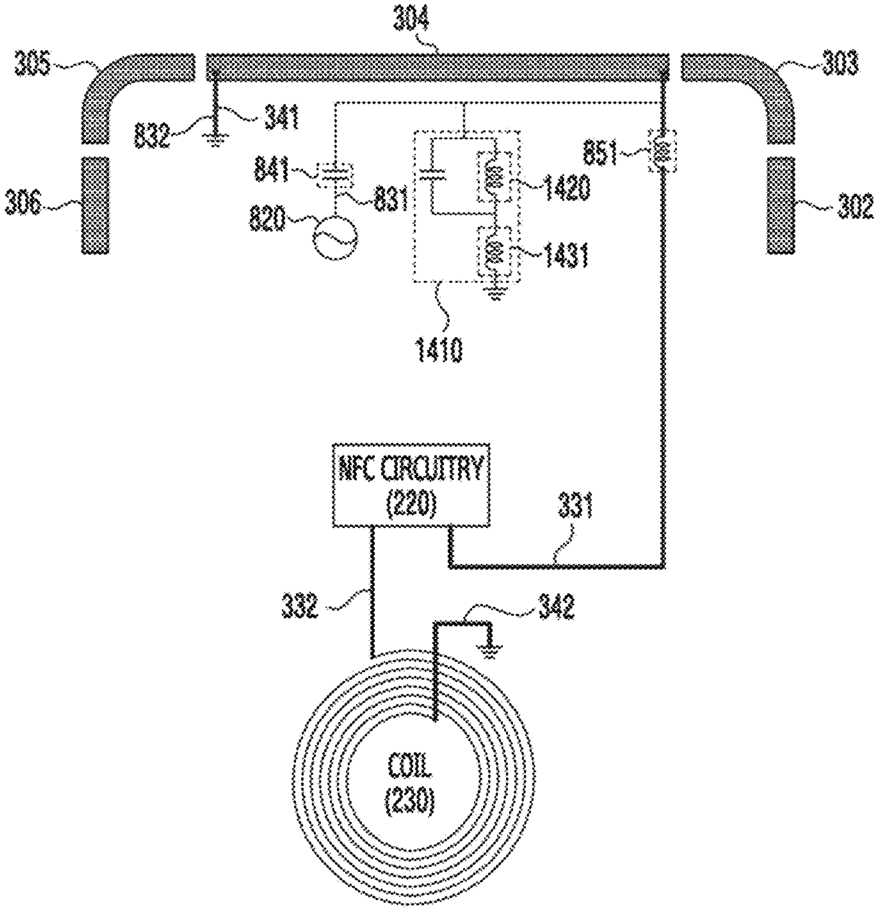
FIGS. 22A and 22B illustrate an example of an electronic device including a band stop filter circuitry.
Figure 22B:
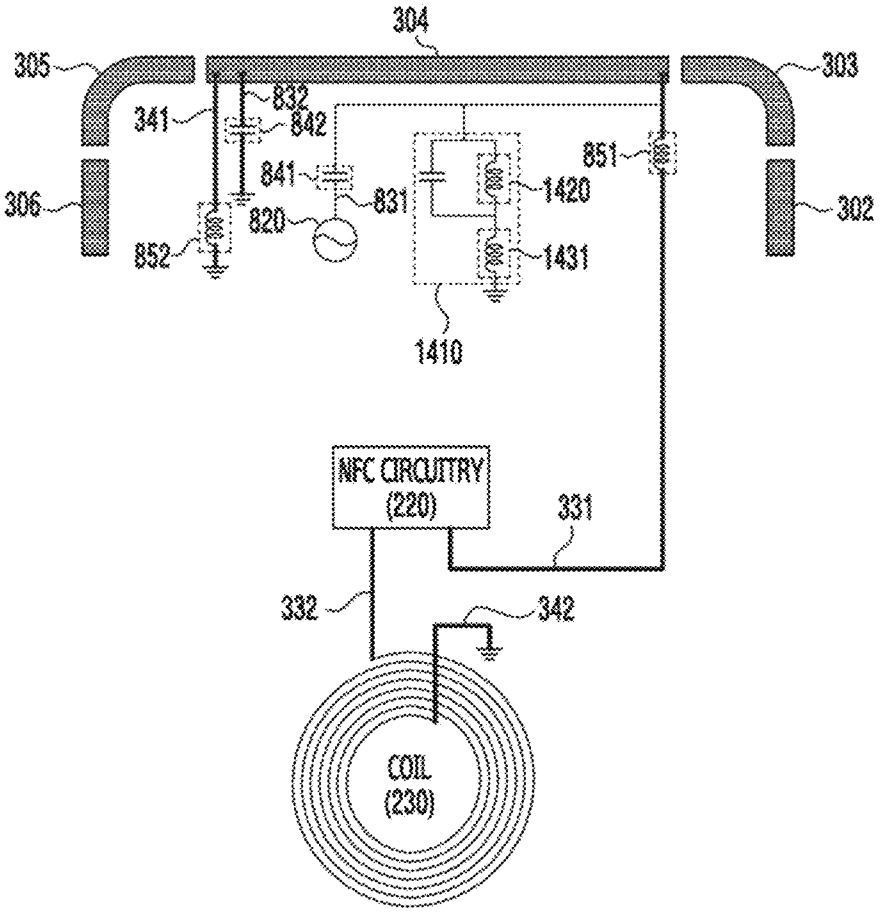

FIGS. 22A and 22B illustrate an example of an electronic device (e.g., an electronic device 101) including a band-stop filter circuitry. Identical reference numbers may indicate identical or similar descriptions.

Referring to FIG. 22A, at least a portion of a feeding path 831 of a non-NFC communication path for a wireless communication circuitry 820 and at least a portion of a ground path may be shared with an NFC path for an NFC circuitry 220. The electronic device 101 may include an NFC circuitry 220 and a coil 230. The descriptions of FIG. 3A may be applicable to describe a circuitry structure of the electronic device 101. The NFC circuitry 220 may be connected to a fourth conductive portion 304 through a first signal path 331. The NFC circuitry 220 may be connected to the coil 230 through a second signal path 332. The fourth conductive portion 304 may be connected to a ground portion through a first ground path 341. The coil 230 may be connected to the ground portion through a second ground path 342. The fourth conductive portion 304 may be used as a radiator for cellular communication. The electronic device 101 may include a wireless communication circuitry 820. The wireless communication circuitry 820 may radiate the RF signal through the fourth conductive portion 304, or may receive the RF signal from an external electronic device (e.g., an electronic device 102, an electronic device 104, or a server 108). In an embodiment, the electronic device 101 may include at least one passive element for isolation between two signals (e.g., an RF signal of cellular communication and an output signal of NFC communication). For example, the electronic device 101 may include a first capacitor 841. For example, the first capacitor 841 may be used to prevent the inflow of electrostatic due to ESD as well as signals in an NFC frequency band (e.g., 13.56 MHz). For example, the first capacitor 841 may be a varistor capacitor (e.g., a first varistor capacitor 1341). For example, the electronic device 101 may include a first inductor 851. The first inductor 851 may be an RF choke inductor for preventing the inflow of an RF signal in a frequency band of cellular communication. The electronic device 101 may include a filtering circuitry 1410 to secure an ESD path. The filtering circuitry 1410 may be connected in parallel to the feeding path 831. The filtering circuitry 1410 may include a band stop filter circuitry 1420 and an RF choke inductor 1431. As electrostatic of a high voltage flows through the RF choke inductor 1431, burnout of a passive element for cellular communication may be prevented. In some embodiments, the first ground path 341 may be used as a ground path (e.g., a ground path 832) for cellular communication. As the ground path is shared, the second inductor 852 and/or the second capacitor 842 for signal separation may be omitted from the first ground path 341.

Referring to FIG. 22B, at least a portion of the feeding path 831 of the non-NFC communication path for the wireless communication circuitry 820 may be shared with the first signal path 331 of the NFC path for the NFC circuitry 220. Unlike the illustration of FIG. 22A, the ground path connected to the fourth conductive portion 304 may exist for each cellular communication and NFC communication. For example, the fourth conductive portion 304 may be connected to the ground portion through the ground path 832 for cellular communication. The fourth conductive portion 304 may be connected to the ground portion through the first ground path 341 for NFC communication. In the NFC path, in order to separate signals for the cellular communication, the second inductor 852 may be disposed in series on the first ground path 341. In the non-NFC communication path, in order to separate signals for the NFC communication, the second capacitor 842 may be disposed in series on the ground path 832.

Figure 23A:
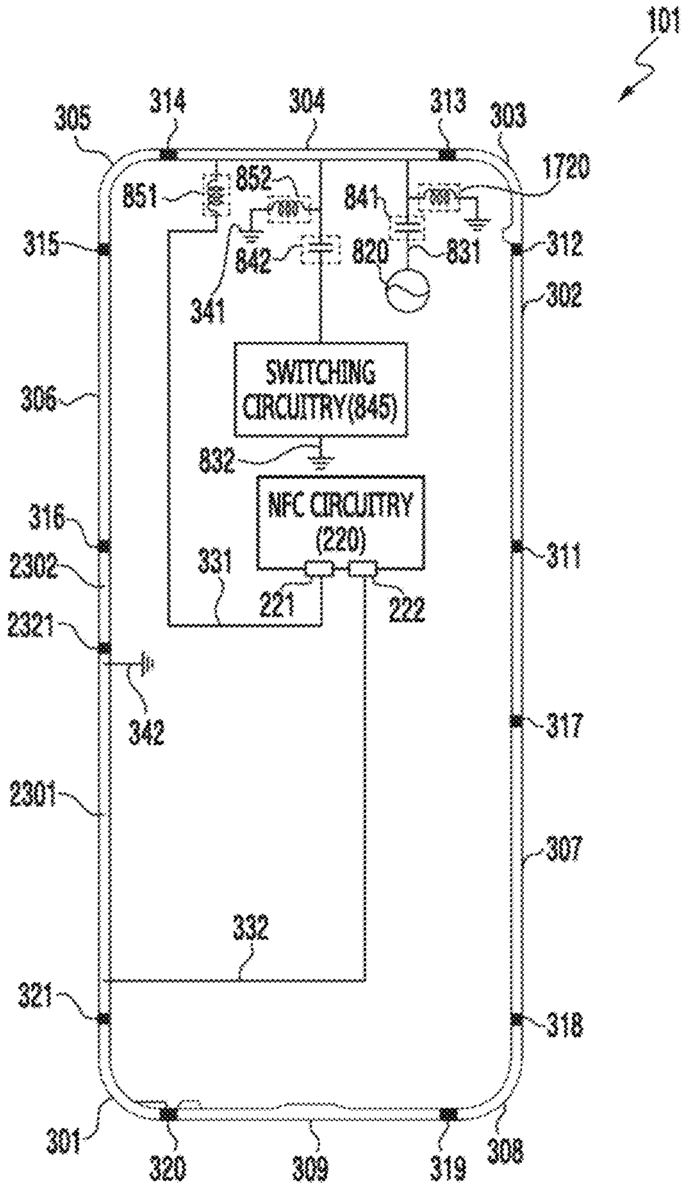
FIGS. 23A, 23B, and 23C illustrate examples of an electronic device including an NFC circuitry using various radiators.
Figure 23B:
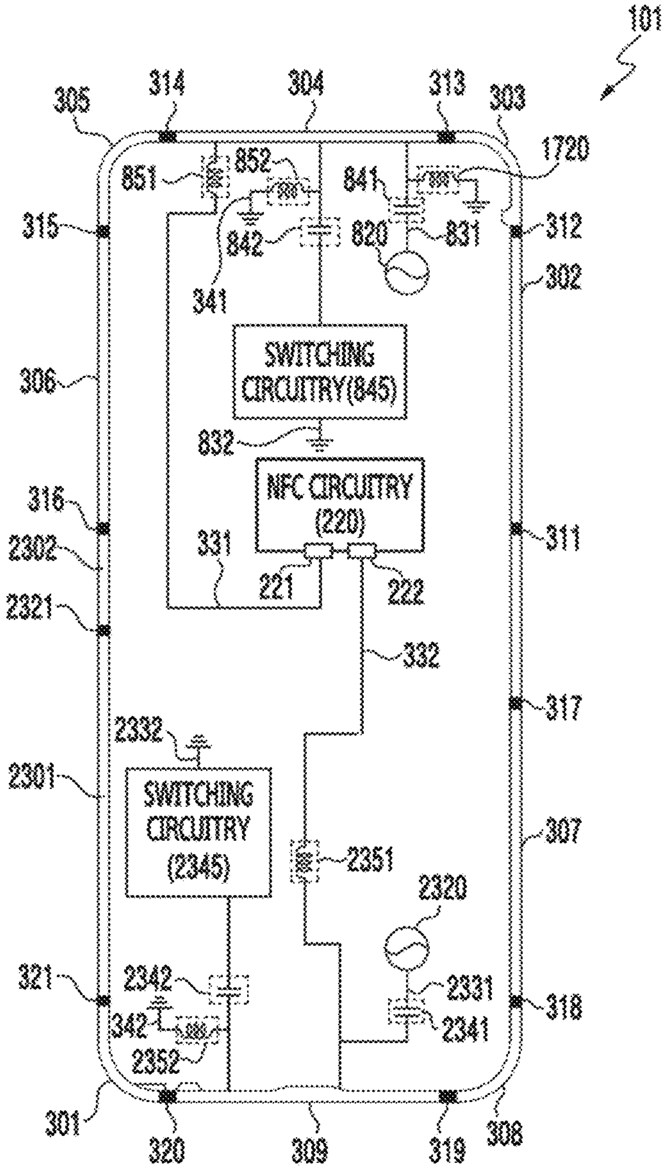
Figure 23C:
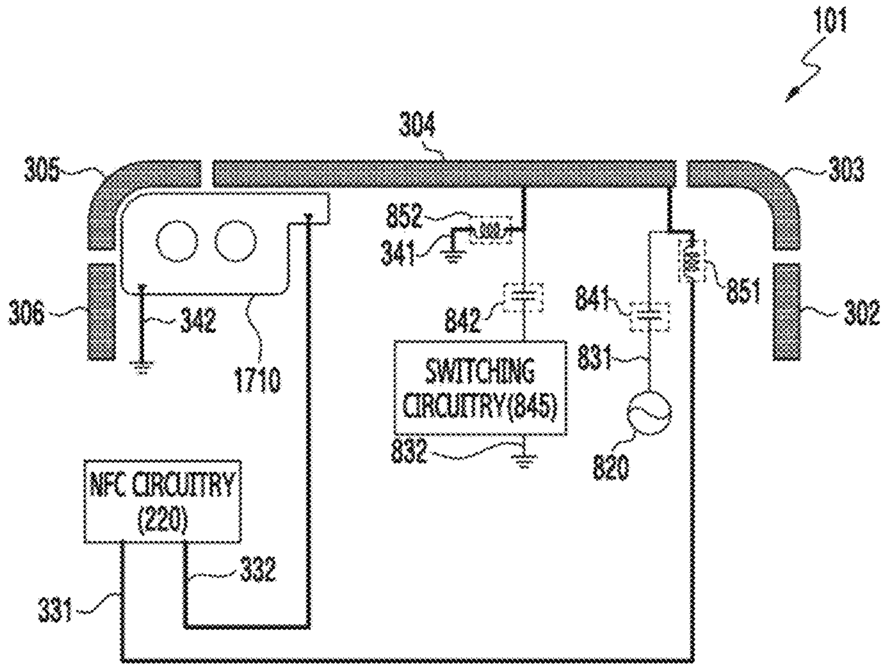

FIGS. 23A, 23B, and 23C illustrate examples of an electronic device (e.g., an electronic devices 101) including an NFC circuitry using various radiators. In a circuitry structure of the disclosure, in addition to a coil 230, various types of conductive members (e.g., a conductive portion of a metal frame, a conductive portion to protect a camera, a conductive pattern on a dielectric substrate, a chip, or LDS) may be used as a radiator for NFC. Hereinafter, a circuitry structure for securing the radiation performance of NFC communication as a different type of radiator from the coil 230 will be described through FIGS. 23A, 23B, and 23C. Identical reference numbers may indicate identical or similar descriptions.

Referring to FIG. 23A, the electronic device 101 may include a plurality of conductive portions and a plurality of non-conductive portions. For example, a metal frame of the electronic device 101 may include the plurality of conductive portions. For example, the plurality of conductive portions may include a first conductive portion 301, a second conductive portion 302, a third conductive portion 303, a fourth conductive portion 304, a fifth conductive portion 305, a sixth conductive portion 306, a seventh conductive portion 307, an eighth conductive portion 308, a ninth conductive portion 309, a tenth conductive portion 2301, and/or an eleventh conductive portion 2302. For example, the plurality of non-conductive portions may include a first non-conductive portion 311, a second non-conductive portion 312, a third non-conductive portion 313, a fourth non-conductive portion 314, a fifth non-conductive portion 315, a sixth non-conductive portion 316, a seventh non-conductive portion 317, an eighth non-conductive portion 318, a ninth non-conductive portion 319, a tenth non-conductive portion 320, an eleventh non-conductive portion 321, and/or a twelfth non-conductive portion 2321.

In an embodiment, the first conductive portion 301 may be formed between the tenth non-conductive portion 320 and the eleventh non-conductive portion 321. The second conductive portion 302 may be formed between the first non-conductive portion 311 and the second non-conductive portion 312. The third conductive portion 303 may be formed between the second non-conductive portion 312 and the third non-conductive portion 313. The fourth conductive portion 304 may be formed between the third non-conductive portion 313 and the fourth non-conductive portion 314. The fifth conductive portion 305 may be formed between the fourth non-conductive portion 314 and the fifth non-conductive portion 315. The sixth conductive portion 306 may be formed between the fifth non-conductive portion 315 and the sixth non-conductive portion 316. The seventh conductive portion 307 may be formed between the seventh non-conductive portion 317 and the eighth non-conductive portion 318. The eighth conductive portion 308 may be formed between the eighth non-conductive portion 318 and the ninth non-conductive portion 319. The ninth conductive portion 309 may be formed between the ninth non-conductive portion 319 and the tenth non-conductive portion 320. The tenth conductive portion 2301 may be formed between the eleventh non-conductive portion 321 and the twelfth non-conductive portion 2321. The eleventh conductive portion 2302 may be formed between the sixth non-conductive portion 316 and the twelfth non-conductive portion 2321. At least a portion among the first conductive portion 301, the second conductive portion 302, the third conductive portion 303, the fourth conductive portion 304, the fifth conductive portion 305, the sixth conductive portion 306, the seventh conductive portion 307, the eighth conductive portion 308, the ninth conductive portion 309, the tenth conductive portion 2301, and/or the eleventh conductive portion 2302 may be used as a radiator of an antenna for transmitting a wireless signal.

According to an embodiment, the electronic device 101 may radiate signals of the NFC circuitry 220 through at least two or more conductive portions among the plurality of conductive portions. For example, the at least two or more conductive portions may include the fourth conductive portion 304 and the tenth conductive portion 2301. For example, the electronic device 101 may use at least a portion of the metal frame and a radiator of a metal antenna used for non-NFC communication as a radiator for NFC communication.

According to an embodiment, the electronic device 101 may include the NFC circuitry 220 and the tenth conductive portion 2301. The descriptions of FIG. 3A may be applicable to describe a circuitry structure of the electronic device 101. In the circuitry structure of FIG. 23A, the tenth conductive portion 2301 may be used instead of the coil 230. The NFC circuitry 220 may be connected to the fourth conductive portion 304 through a first signal path 331. The NFC circuitry 220 may be connected to the tenth conductive portion 2301 through a second signal path 332. The NFC circuitry 220 may operate in a differential mode. The NFC circuitry 220 may output a first signal of a differential output through a first terminal 221. The NFC circuitry 220 may transmit the first signal from the first terminal 221 to the fourth conductive portion 304 through the first signal path 331. The NFC circuitry 220 may output a second signal of the differential output through a second terminal 222. The NFC circuitry 220 may transmit the second signal from the second terminal 222 to the tenth conductive portion 2301 through the second signal path 332. A first phase of the first signal and a second phase of the second signal may be different by about 180 degrees. The fourth conductive portion 304 may be connected to a ground portion through a first ground path 341. The tenth conductive portion 2301 may be connected to the ground portion through a second ground path 342.

According to an embodiment, the fourth conductive portion 304 may be used as a radiator for non-NFC communication (e.g., cellular communication). The electronic device 101 may include a wireless communication circuitry 820. In an embodiment, the electronic device 101 may include a switching circuitry 845 (or an X-GND circuitry) for impedance matching of a conductive portion 210, which is the radiator of cellular communication. In an embodiment, the electronic device 101 may include at least one passive element for isolation between two signals (e.g., an RF signal of cellular communication and an output signal of NFC communication). According to an embodiment, the electronic device 101 may include a first capacitor 841 on a feeding path 831. The electronic device 101 may include a second capacitor 842 on a ground path 832. For example, the first capacitor 841 and/or the second capacitor 842 may have a capacitance for blocking a DC or blocking a frequency less than or equal to a reference. For example, the first capacitor 841 and/or the second capacitor 842 may be used to prevent the inflow of signals in an NFC frequency band (e.g., 13.56 MHz). As a non-limiting example, the first capacitor 841 may be a varistor capacitor (e.g., a first varistor capacitor 1341). As a non-limiting example, the second capacitor 842 may be a varistor capacitor (e.g., a second varistor capacitor 1342). According to an embodiment, the electronic device 101 may include a first inductor 851 disposed in series on a first signal path 331. The electronic device 101 may include a second inductor 852 disposed in series on a first ground path 341. The first inductor 851 may be an RF choke inductor for preventing the inflow of an RF signal in a frequency band of cellular communication. The first ground path 341 may include the second inductor 852. The second inductor 852 may be an RF choke inductor for preventing the inflow of an RF signal in a frequency band of cellular communication. In addition, for example, for ESD prevention, an RF choke inductor 1720 may be connected in parallel to the feeding path 831 of the wireless communication circuitry 820.

Referring to FIG. 23B, the electronic device 101 may include a plurality of conductive portions and a plurality of non-conductive portions. The descriptions of FIG. 23A may be applicable to describe each conductive portion and each non-conductive portion.

According to an embodiment, the electronic device 101 may radiate signals of the NFC circuitry 220 through at least two or more conductive portions among the plurality of conductive portions. For example, the at least two or more conductive portions may include the fourth conductive portion 304 and the ninth conductive portion 309. For example, the electronic device 101 may use at least a portion of a metal frame and a radiator of a metal antenna used for non-NFC communication as a radiator for NFC communication. The electronic device 101 may include the NFC circuitry 220 and the ninth conductive portion 309. The descriptions of FIG. 3A may be applicable to describe a circuitry structure of the electronic device 101. In the circuitry structure of FIG. 23B, the ninth conductive portion 309 may be used instead of the coil 230. The NFC circuitry 220 may be connected to the fourth conductive portion 304 through a first signal path 331. The NFC circuitry 220 may be connected to the ninth conductive portion 309 through a second signal path 332. The NFC circuitry 220 may operate in a differential mode. The NFC circuitry 220 may output a first signal of a differential output through a first terminal 221. The NFC circuitry 220 may transmit the first signal from the first terminal 221 to the fourth conductive portion 304 through the first signal path 331. The NFC circuitry 220 may output a second signal of the differential output through a second terminal 222. The NFC circuitry 220 may transmit the second signal from the second terminal 222 to the ninth conductive portion 309 through the second signal path 332. A first phase of the first signal and a second phase of the second signal may be different by about 180 degrees. The fourth conductive portion 304 may be connected to a ground portion through a first ground path 341. The ninth conductive portion 309 may be connected to the ground portion through a second ground path 342.

In an embodiment, the fourth conductive portion 304 may be used as a radiator for non-NFC communication (e.g., cellular communication). The electronic device 101 may include a wireless communication circuitry 820. For example, the electronic device 101 may include a switching circuitry 845 (or X-GND circuitry) for impedance matching of the fourth conductive portion 304, which is the radiator of cellular communication. In an embodiment, the electronic device 101 may include at least one passive element for isolation between two signals (e.g., an RF signal of cellular communication and an output signal of NFC communication). According to an embodiment, the electronic device 101 may include a first capacitor 841 in a feeding path 831. The electronic device 101 may include a second capacitor 842 in a ground path 832. The first capacitor 841 and/or the second capacitor 842 may have a capacitance for blocking a DC or blocking a frequency less than or equal to a reference. For example, the first capacitor 841 and the second capacitor 842 may be used to prevent the inflow of signals in an NFC frequency band (e.g., 13.56 MHz). As a non-limiting example, the first capacitor 841 may be a varistor capacitor (e.g., a first varistor capacitor 1341). As a non-limiting example, the second capacitor 842 may be a varistor capacitor (e.g., a second varistor capacitor 1342). According to an embodiment, the electronic device 101 may include a first inductor 851 disposed in series on the first signal path 331. The electronic device 101 may include a second inductor 852 disposed in series on the first ground path 341. The first inductor 851 may be an RF choke inductor for preventing the inflow of an RF signal in a frequency band of cellular communication. The first ground path 341 may include the second inductor 852. The second inductor 852 may be an RF choke inductor for preventing the inflow of an RF signal in a frequency band of cellular communication. In addition, for example, for ESD prevention, an RF choke inductor 1720 may be connected in parallel to the feeding path 831 of the wireless communication circuitry 820.

In an embodiment, the ninth conductive portion 309 may be used as a radiator for non-NFC communication (e.g., cellular communication). The electronic device 101 may include a wireless communication circuitry 2320. The electronic device 101 may include a switching circuitry 2345 (or X-GND circuitry) for impedance matching of the ninth conductive portion 309, which is the radiator of cellular communication. In an embodiment, the electronic device 101 may include at least one passive element for isolation between two signals (e.g., an RF signal of cellular communication and an output signal of NFC communication). In an embodiment, the electronic device 101 may include a third capacitor 2341 in a feeding path 2331. The electronic device 101 may include a fourth capacitor 2342 in a ground path 2332. The third capacitor 2341 and/or the fourth capacitor 2342 may have a capacitance for blocking a DC or blocking a frequency less than or equal to a reference. For example, the third capacitor 2341 and the fourth capacitor 2342 may be used to prevent the inflow of signals in an NFC frequency band (e.g., 13.56 MHz). As a non-limiting example, the third capacitor 2341 may be a varistor capacitor (e.g., the first varistor capacitor 1341). As a non-limiting example, the fourth capacitor 2342 may be a varistor capacitor (e.g., the second varistor capacitor 1342). According to an embodiment, the electronic device 101 may include a third inductor 2351 disposed in series on a second signal path 332. The electronic device 101 may include a fourth inductor 2352 disposed in series on a second ground path 342. The second signal path 332 may include the third inductor 2351. The third inductor 2351 may be an RF choke inductor for preventing the inflow of an RF signal in a frequency band of cellular communication. The second ground path 2342 may include the fourth inductor 2352. The fourth inductor 2352 may be an RF choke inductor for preventing the inflow of an RF signal in a frequency band of cellular communication.

Referring to FIG. 23C, the electronic device 101 may include a plurality of conductive portions and a plurality of non-conductive portions. The descriptions of FIG. 23A may be referred for description of each conductive portion and each non-conductive portion. According to an embodiment, a conductive portion 1710 for protecting a camera (e.g., the camera module 180 of FIG. 1) instead of the coil 230 may be used for NFC communication, as a radiator for NFC. For example, in an example mentioned in FIG. 23A, the conductive portion 1710 may be used for NFC communication, instead of the tenth conductive portion 2301. The second signal path 332 for the NFC circuitry 220 may be connected to the conductive portion 1710. The NFC circuitry 220 may transmit a second signal from the second terminal 222 to the conductive portion 1710 through the second signal path 332. As a non-limiting example, the conductive portion 1710 may be connected to the second ground path 342 and the NFC circuitry 220 without an RF choke inductor (e.g., the first inductor 851 and the second inductor 852).

In an embodiment, the first signal path 331 for the NFC circuitry 220 may be connected to the fourth conductive portion 304. The NFC circuitry 220 may transmit a first signal from the first terminal 221 to the fourth conductive portion 304 through the first signal path 331. In an embodiment, the fourth conductive portion 304 may be used as a radiator of an antenna for non-NFC communication (e.g., cellular communication). The wireless communication circuitry 820 may be connected to the fourth conductive portion 304 through a first capacitor 841. The fourth conductive portion 304 may be connected to the ground portion through a second capacitor 842. For example, the first capacitor 841 and/or the second capacitor 842 may be used to prevent the inflow of electrostatic due to ESD as well as signals in an NFC frequency band (e.g., 13.56 MHz). For example, the first capacitor 841 may be a varistor capacitor (e.g., the first varistor capacitor 1341). For example, the second capacitor 842 may be a varistor capacitor (e.g., the second varistor capacitor 1342). According to an embodiment, the electronic device 101 may include a first inductor 851 disposed in series on the first signal path 331. The electronic device 101 may include a second inductor 852 disposed in series on the first ground path 341. The first inductor 851 may be an RF choke inductor for preventing the inflow of an RF signal in a frequency band of cellular communication. The first ground path 341 may include the second inductor 852. The second inductor 852 may be an RF choke inductor for preventing the inflow of an RF signal in a frequency band of cellular communication. As a non-limiting example, at least a portion of the feeding path 831 may be shared with at least a portion of the first signal path 331. At least a portion of the ground path 832 may be shared with at least a portion of the first ground path 341.

The radiators described through FIGS. 23A to 23C are exemplary, and a combination (e.g., LDS and FPCB, a solenoid-shaped wire and a conductive portion of a metal frame, a conductive portion and a conductive patch, or a conductive portion on a dielectric substrate and a conductive portion of a metal frame) of various types of radiators in addition to the above-described examples may be used for NFC communication. In addition, regardless of a type of radiator, a feeding point for the radiator or a position of the ground, any structure (e.g., a connection structure having connection types according to FIG. 2) in which the NFC circuitry 220 and two radiators are connected may be understood as an embodiment of the disclosure.

Figure 24A:
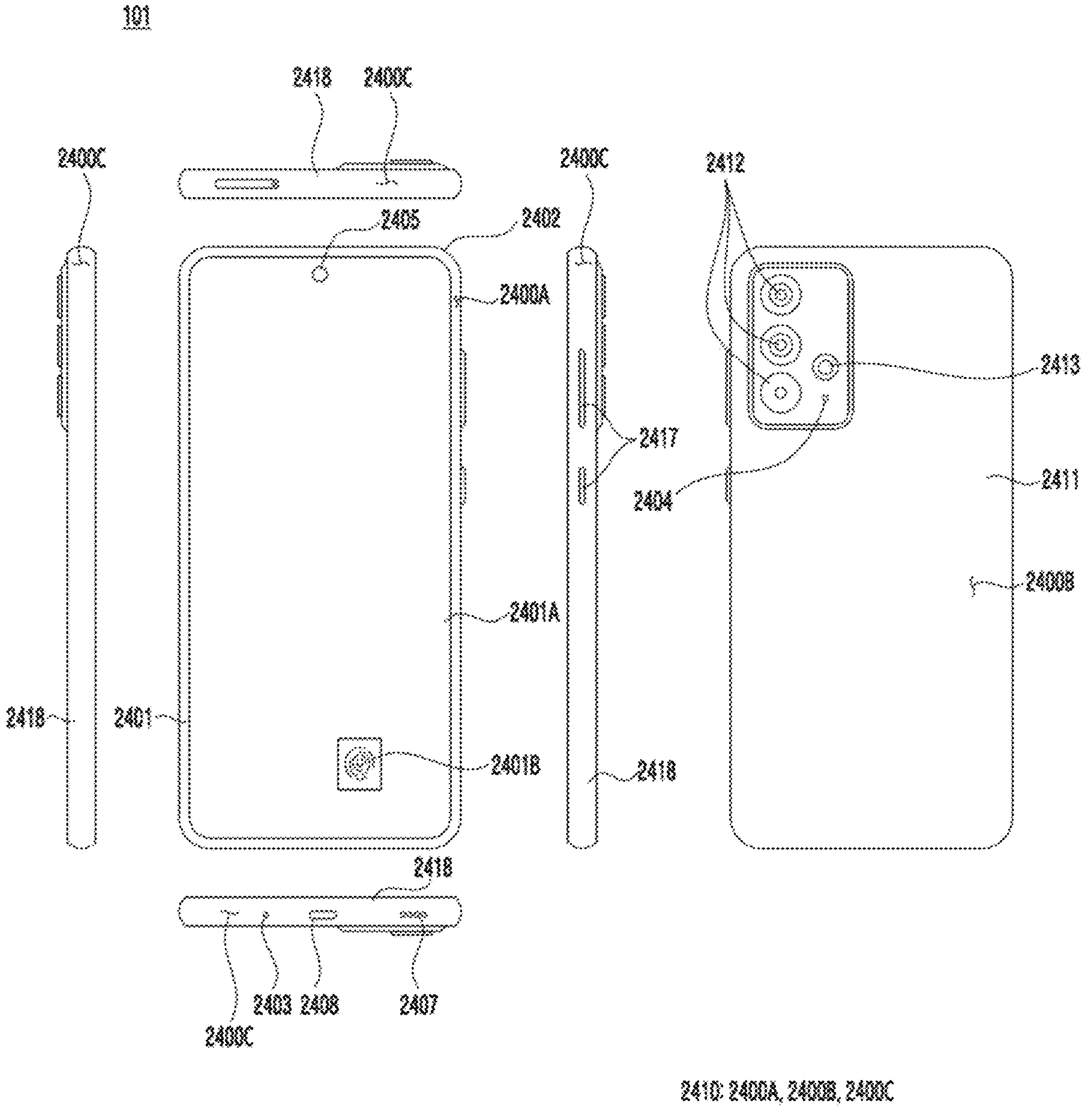
FIGS. 24A and 24B illustrate an example of a bar-type electronic device.
Figure 24B:
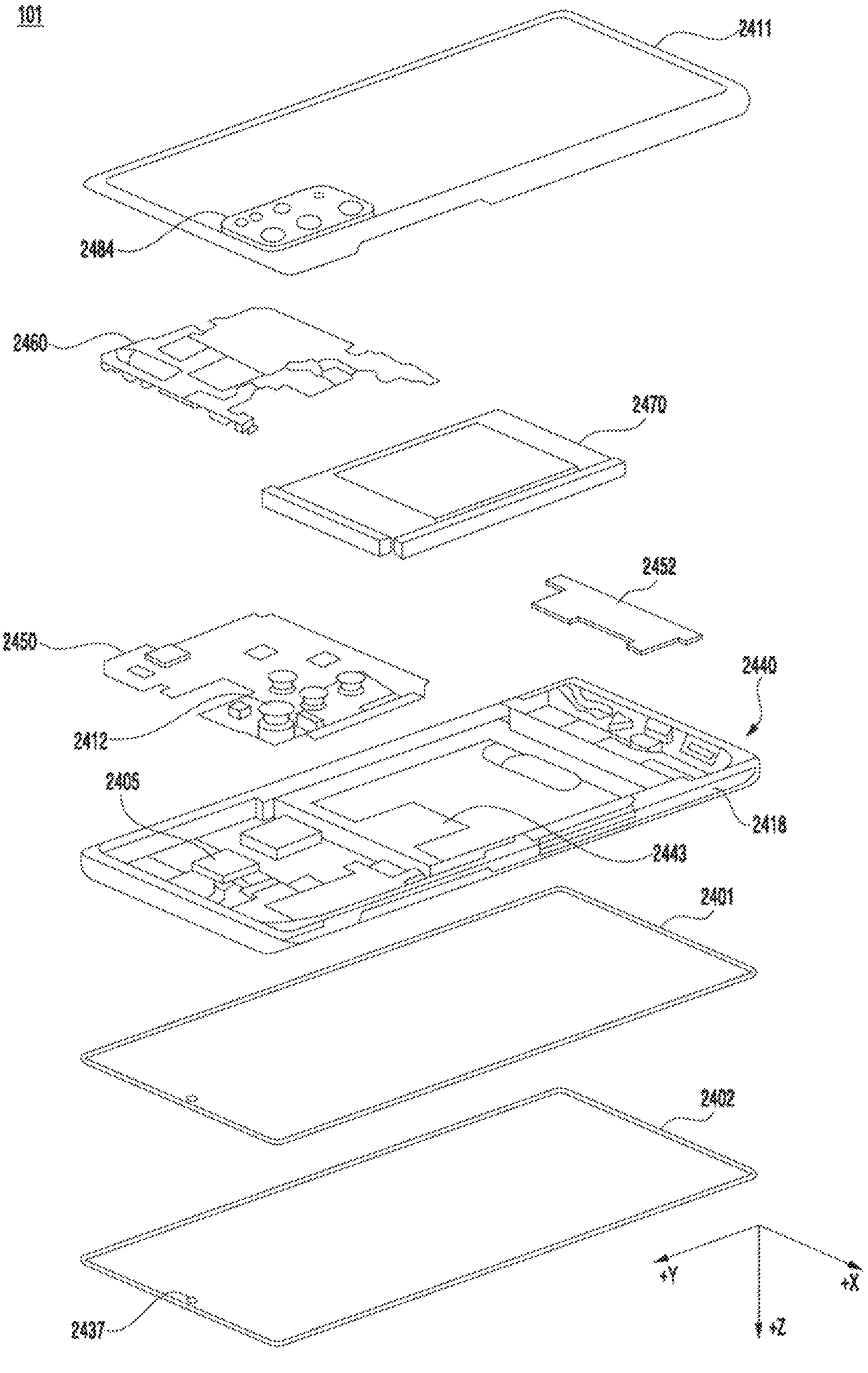

FIGS. 24A and 24B illustrate an example of a bar-type electronic device (e.g., an electronic devices 101).

Referring to FIG. 24A, for example, the electronic device 101 may include a housing 2410 forming an exterior of the electronic device 101. For example, the housing 2410 may include a front surface 2400A, a rear surface 2400B, and a lateral surface 2400C surrounding a space between the front surface 2400A and the rear surface 2400B. For example, the housing 2410 may refer to a structure forming at least a portion of the front surface 2400A, the rear surface 2400B, and/or the lateral surface 2400C.

The electronic device 101 may include a substantially transparent front plate 2402. The front plate 2402 may form at least a portion of the front surface 2400A. The front plate 2402 may include a glass plate or a polymer plate, which include various coating layers, but is not limited thereto.

For example, the electronic device 101 may include a substantially opaque rear plate 2411. For example, the rear plate 2411 may form at least a portion of the rear surface 2400B. For example, the rear plate 2411 may be formed of a coated or colored glass, ceramic, polymer, metal (e.g., aluminum, stainless steel (STS), or magnesium), or a combination of at least two of the above materials.

For example, the electronic device 101 may include a lateral bezel structure (or a lateral member) 2418. For example, the lateral bezel structure 2418 may be combined with the front plate 2402 and/or the rear plate 2411 to form at least a portion of the lateral surface 2400C of the electronic device 101. For example, the lateral bezel structure 2418 may form entirely the lateral surface 2400C of the electronic device 101, and for another example, the lateral bezel structure 2418 may form the lateral surface 2400C of the electronic device 101 together with the front plate 2402 and/or the rear plate 2411.

Unlike the illustrated embodiment, in case that the lateral surface 2400C of the electronic device 101 is partially formed by the front plate 2402 and/or the rear plate 2411, the front plate 2402 and/or the rear plate 2411 may include an area that is bent from a periphery thereof toward the rear plate 2411 and/or the front plate 2402 and seamlessly extends. The extended area of the front plate 2402 and/or the rear plate 2411 may be located at both ends of a long edge of the electronic device 101, but is not limited to the above-described examples.

For example, the lateral bezel structure 2418 may include a metal and/or a polymer. For example, the rear plate 2411 and the lateral bezel structure 2418 may be integrally formed and may include the same material (e.g., a metallic material such as aluminum), but are not limited thereto. For example, the rear plate 2411 and the lateral bezel structure 2418 may be formed in separate configurations or may include different materials.

For example, the electronic device 101 may include at least one of a display 2401 (e.g., the display module 160 of FIG. 1), an audio module 2403, 2404, and 2407 (e.g., the audio module 170 of FIG. 1), a sensor module (e.g., the sensor module 176 of FIG. 1), a camera module 2405 and 2412 (e.g., the camera module 180 of FIG. 1), a key input device 2417 (e.g., the input module 150 of FIG. 1), a light emitting element, and/or a connector hole 2408. For example, the electronic device 101 may omit at least one of the components (e.g., the key input device 2417 or the light emitting element), or may additionally include another component.

For example, the display 2401 may be visually exposed through a substantial portion of the front plate 2402. For example, at least a portion of the display 2401 may be visible through the front plate 2402 forming the front surface 2400A. For example, the display 2401 may be disposed on a back surface of the front plate 2402.

For example, an outer shape of the display 2401 may be formed substantially the same as an outer shape of the front plate 2402 adjacent to the display 2401. For example, in order to expand an area in which the display 2401 is visually exposed, an interval between an outer periphery of the display 2401 and an outer periphery of the front plate 2402 may be formed substantially the same.

For example, the display 2401 (or the front surface 2400A of the electronic device 101) may include a screen display area 2401A. For example, the display 2401 may provide visual information to a user through the screen display area 2401A. In the illustrated embodiment, when the front surface 2400A is viewed from the front, it is illustrated that the screen display area 2401A is spaced apart from the outer periphery of the front surface 2400A and is positioned inside the front surface 2400A, but it is not limited thereto. In another embodiment, when the front surface 2400A is viewed from the front, at least a portion of the periphery of the screen display area 2401A may substantially coincide with the periphery of the front surface 2400A (or the front plate 2402).

In an embodiment, the screen display area 2401A may include a sensing area 2401B configured to obtain biometric information of a user. Herein, "the screen display area 2401A includes the sensing area 2401B" may mean that at least a portion of the sensing area 2401B may be overlapped on the screen display area 2401A. For example, the sensing area 2401B, like other areas of the screen display area 2401A, may refer to an area in which visual information may be displayed by the display 2401 and biometric information (e.g., fingerprint) of a user may be obtained additionally. In another embodiment, the sensing area 2401B may be formed in the key input device 2417.

In an embodiment, the display 2401 may include an area in which the first camera module 2405 is positioned. In an embodiment, an opening may be formed in the area of the display 2401, and the first camera module 2405 (e.g., a punch hole camera) may be at least partially disposed in the opening to face the front surface 2400A. In this case, the screen display area 2401A may surround at least a portion of the periphery of the opening. In another embodiment, the first camera module 2405 (e.g., an under display camera (UDC)) may be disposed under the display 2401 to overlap the area of the display 2401. In this case, the display 2401 may provide visual information to the user through the area, and additionally, the first camera module 2405 may obtain an image corresponding to a direction facing the front surface 2400A through the area of the display 2401.

In an embodiment, the display 2401 may be coupled to or disposed adjacent to a touch sensing circuit, a pressure sensor capable of measuring the intensity (pressure) of the touch, and/or a digitizer that detects a magnetic field type stylus pen.

In an embodiment, the audio modules 2403, 2404 and 2407 may include microphone holes 2403 and 2404 and a speaker hole 2407.

In an embodiment, the microphone holes 2403 and 2404 may include a first microphone hole 2403 formed in a partial area of the lateral surface 2400C and a second microphone hole 2404 formed in a partial area of the rear surface 2400B. A microphone for obtaining an external sound may be disposed inside the microphone holes 2403 and 2404. The microphone may include a plurality of microphones to detect the direction of sound.

In an embodiment, the second microphone hole 2404 formed in a partial area of the rear surface 2400B may be disposed adjacent to the camera modules 2405 and 2412. For example, the second microphone hole 2404 may obtain sound according to operations of the camera modules 2405, and 2412. However, it is not limited thereto.

The speaker hole 2407 may include an external speaker hole 2407 and a receiver hole for a call. The external speaker hole 2407 may be formed on a portion of the lateral surface 2400C of the electronic device 101. In another embodiment, the external speaker hole 2407 may be implemented as one hole with the microphone hole 2403. In an embodiment, a receiver hole for a call may be formed on another portion of the lateral surface 2400C. For example, the receiver hole for a call may be formed on the opposite side of the external speaker hole 2407 on the lateral surface 2400C. For example, based on the illustration of FIG. 24, the external speaker hole 2407 may be formed on the lateral surface 2400C corresponding to the lower end of the electronic device 101, and the receiver hole for a call may be formed on the lateral surface 2400C corresponding to the upper end of the electronic device 101. However, it is not limited thereto, for example, the receiver hole for a call may be formed at a position other than the lateral surface 2400C. For example, the receiver hole for a call may be formed by a space spaced apart between the front plate 2402 (or display 2401) and the lateral bezel structure 2418.

For example, the electronic device 101 may include at least one speaker configured to output sound to the outside of the housing through the external speaker hole 2407 and/or the receiver hole for a call. For example, the speaker may include a piezo speaker configured to output audio by vibrating a diaphragm within the speaker using a piezoelectric element. However, it is not limited thereto.

For example, the sensor module may generate an electrical signal or a data value corresponding to an internal operating state or an external environmental state of the electronic device 101. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

In an embodiment, the camera modules 2405 and 2412 may include a first camera 2405 disposed to face the front surface 2400A of the electronic device 101, a second camera 2412 disposed to face the rear surface 2400B.

For example, the second camera module 2412 may include a plurality of cameras (e.g., a dual camera, a triple camera, or a quad camera). However, the second camera 2412 is not necessarily limited to including a plurality of cameras, and may include one camera.

For example, the first camera 2405 and the second camera 2412 may include one or a plurality of lenses, an image sensor, and/or an image signal processor.

For example, the electronic device 101 may include a flash 2413 disposed to face the rear surface 2400B. For example, the flash 2413 may include, for example, a light emitting diode or a xenon lamp. For example, two or more lenses (infrared camera, wide-angle and telephoto lens) and image sensors may be disposed on one side of electronic device 101.

For example, the key input device 2417 may be disposed on the lateral surface 2400C of the electronic device 101. For example, the electronic device 101 may not include some or all of the key input devices 2417, and the not included key input device 2417 may be implemented in another form, such as a soft key, on the display 2401.

For example, the connector hole 2408 may be formed on the lateral surface 2400C of the electronic device 101 to accommodate a connector of an external device. A connection terminal (e.g., the connection terminal 178 of FIG. 1) electrically connected to the connector of the external device may be disposed in the connector hole 2408. For example, the electronic device 101 may include an interface module (e.g., the interface 177 of FIG. 1) for processing electrical signals transmitted and received through the connection terminal.

For example, the electronic device 101 may include a light emitting element. For example, the light emitting element may be disposed on the front surface 2400A of the housing. The light emitting element may provide state information of the electronic device 101 in a form of light. For example, the light emitting element may provide a light source linked with an operation of the first camera 2405. For example, the light emitting element may include an LED, an IR LED, and/or a xenon lamp.

FIG. 24B is an expanded perspective view of the electronic device 101. Hereinafter, overlapping descriptions of configurations having identical reference numerals as the above-described configurations will be omitted.

Referring to FIG. 24B, the electronic device 101 may include a display 2401, a front plate 2402, a rear plate 2411, a frame structure 2440, a first PCB 2450, a second PCB 2452, a cover plate 2460, and a battery 2470 (e.g., the battery 189 of FIG. 1).

For example, the frame structure 2440 may include a lateral bezel structure 2418 forming an exterior (e.g., the lateral surface 2400C of FIG. 24) of the electronic device 101 and a support structure 2443 extending inward from the lateral bezel structure 2418. For example, the frame structure 2440 may be disposed between the display 2401 and the rear plate 2411. For example, the lateral bezel structure 2418 of the frame structure 2440 may surround a space between the rear plate 2411 and the front plate 2402 (and/or the display 2401), and the support structure 2443 of the frame structure 2440 may extend from the lateral bezel structure 2418 within the space.

For example, the frame structure 2440 may support or accommodate other components included in the electronic device 101. For example, the display 2401 may be disposed on one surface of the frame structure 2440 facing one direction (e.g., the +z direction), and the display 2401 may be supported by the support structure 2443 of the frame structure 2440. For example, the first PCB 2450, the second PCB 2452, the battery 2470, and the second camera 2412 may be disposed on another surface facing a direction (e.g., the −z direction) opposite to the one direction of the frame structure 2440. The first PCB 2450, the second PCB 2452, the battery 2470, and the second camera 2412 may be mounted on a recess defined by the lateral bezel structure 2418 and/or the support structure 2443 of the frame structure 2440.

For example, the first PCB 2450, the second PCB 2452, and the battery 2470 may be coupled to the frame structure 2440, respectively. For example, the first PCB 2450 and the second PCB 2452 may be fixedly disposed in the frame structure 2440 through a coupling member such as a screw. For example, the battery 2470 may be fixedly disposed in the frame structure 2440 through an adhesive member (e.g., a double-sided tape). However, it is not limited by the above-described example.

For example, a cover plate 2460 may be disposed between the first PCB 2450 and the rear plate 2411. For example, the cover plate 2460 may be disposed on the first PCB 2450. For example, the cover plate 2460 may be disposed on a surface facing the −z direction of the first PCB 2450.

For example, the cover plate 2460 may at least partially overlap the first PCB 2450 with respect to the z-axis. For example, the cover plate 2460 may cover at least a partial area of the first PCB 2450. Through this, the cover plate 2460 may protect the first PCB 2450 from physical impact or prevent the connector coupled to the first PCB 2450 from being separated.

For example, the cover plate 2460 may be fixedly disposed on the first PCB 2450 through a coupling member (e.g., a screw), or may be coupled to the frame structure 2440 together with the first PCB 2450 through the coupling member.

For example, the display 2401 may be disposed between the frame structure 2440 and the front plate 2402. For example, the front plate 2402 may be disposed on a side (e.g., a +z direction) of the display 2401 and a frame structure 2440 may be disposed on another side (e.g., a −z direction).

For example, the front plate 2402 may be coupled to the display 2401. For example, the front plate 2402 and the display 2401 may adhere to each other through an optical adhesive member (e.g., optically clear adhesive (OCA) or optically clear resin (OCR)) interposed therebetween.

For example, the front plate 2402 may be coupled to the frame structure 2440. For example, the front plate 2402 may include an outside portion extending outside the display 2401 when viewed in the z-axis direction, and may adhere to the frame structure 2440 through an adhesive member (e.g., a double-sided tape) disposed between the outside portion of the front plate 2402 and the frame structure 2440 (e.g., the lateral bezel structure 2418). However, it is not limited by the above-described example.

For example, the first PCB 2450 and/or the second PCB 2452 may be equipped with a processor (e.g., the processor 120 of FIG. 1), a memory (e.g., the memory 130 of FIG. 1), and/or an interface (e.g., the interface 177 of FIG. 1). The processor may include, for example, one or more of a central processing unit, an application processor, a graphic processing unit, an image signal processor, a sensor hub processor, or a communication processor. The memory may include, for example, a volatile memory (e.g., the volatile memory 132 of FIG. 1) or a non-volatile memory (e.g., the non-volatile memory 134 of FIG. 1). The interface may include, for example, a high definition multimedia interface (HDMI), a universal serial bus (USB) interface, an SD card interface, and/or an audio interface. The interface may electrically or physically connect the electronic device 101 to an external electronic device, and may include a USB connector, an SD card/MMC connector, or an audio connector. For example, the first PCB 2450 and the second PCB 2452 may be operably or electrically connected to each other through a connection member (e.g., a flexible PCB).

For example, the battery 2470 may supply power to at least one component of the electronic device 101. For example, the battery 2470 may include a rechargeable secondary cell or a fuel cell. At least a portion of the battery 2470 may be disposed on substantially the same plane as the first PCB 2450 and/or the second PCB 2452.

For example, the electronic device 101 may include an antenna module. For example, the antenna module may be disposed between the rear plate 2411 and the battery 2470. The antenna module may include, for example, a near field communication (NFC) antenna, a wireless charging antenna, and/or a magnetic secure transmission (MST) antenna. The antenna module, for example, may perform short-range communication with an external device, or wirelessly transmit and receive power to and from the external device.

For example, the first camera 2405 (e.g., a front camera) may be disposed in at least a portion (e.g., the support structure 2443) of the frame structure 2440 so that the lens may receive external light through a partial area (e.g., the camera area 2437 of FIG. 24) of the front plate 2402 (e.g., the front surface 2400A of FIG. 24A).

For example, the second camera 2412 (e.g., a rear camera) may be disposed between the frame structure 2440 and the rear plate 2411. For example, the second camera 2412 may be electrically connected to the first PCB 2450 through a connection member (e.g., a connector). For example, the second camera 2412 may be disposed such that the lens may receive external light through a camera area 2484 of the rear plate 2411 of the electronic device 101.

For example, the camera area 2484 may be formed on the surface (e.g., the rear surface 2400B of FIG. 24) of the rear plate 2411. For example, the camera area 2484 may be formed to be at least partially transparent so that external light may be incident to the lens of the second camera 2412. For example, at least a portion of the camera area 2484 may protrude from the surface of the rear plate 2411 to a predetermined height. However, it is not limited to thereto, and in another embodiment, the camera area 2484 may form a plane substantially the same as a surface of the rear plate 2411.

For example, a housing (e.g., the housing 2410 of FIG. 24A) of the electronic device 101 may mean a configuration or structure forming at least a portion of the exterior of the electronic device 101. In this regard, at least a portion of the front plate 2402, the frame structure 2440, and/or the rear plate 2411 forming the exterior of the electronic device 101 may be referred to as the housing of the electronic device 101.

Figure 25A:
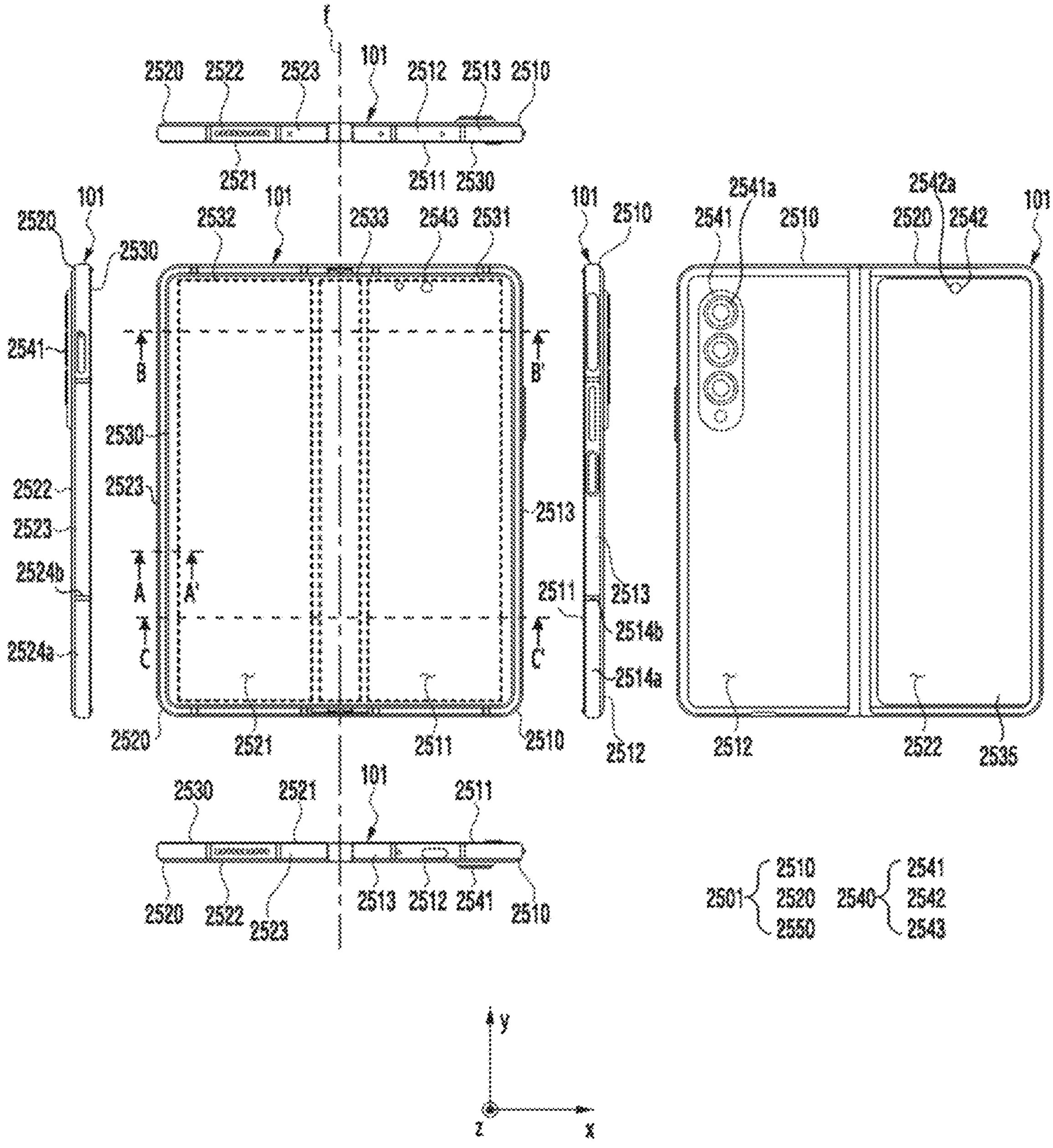
FIGS. 25A, 25B, and 25C illustrate an example of a foldable-type electronic device.
Figure 25B:
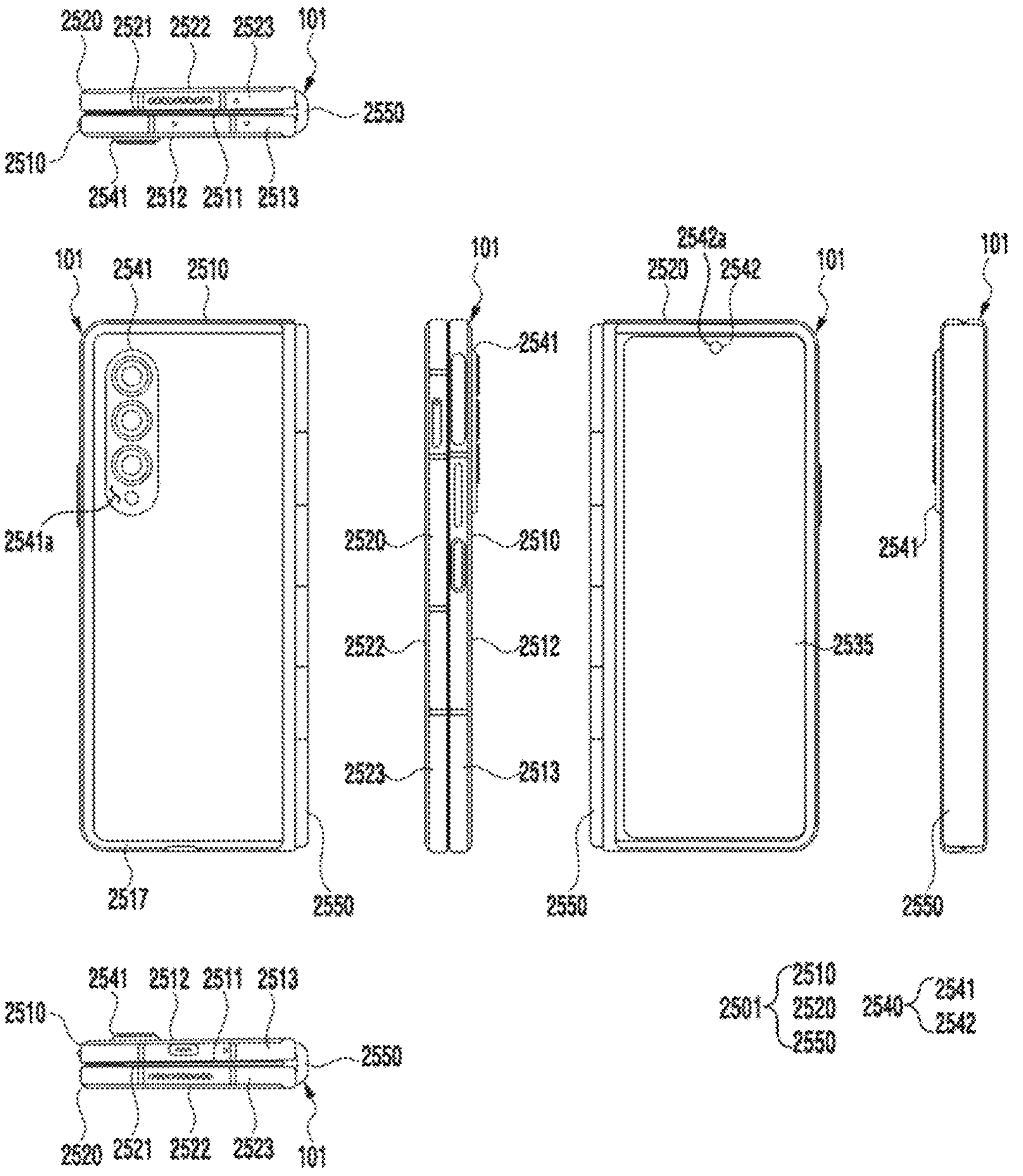
Figure 25C:
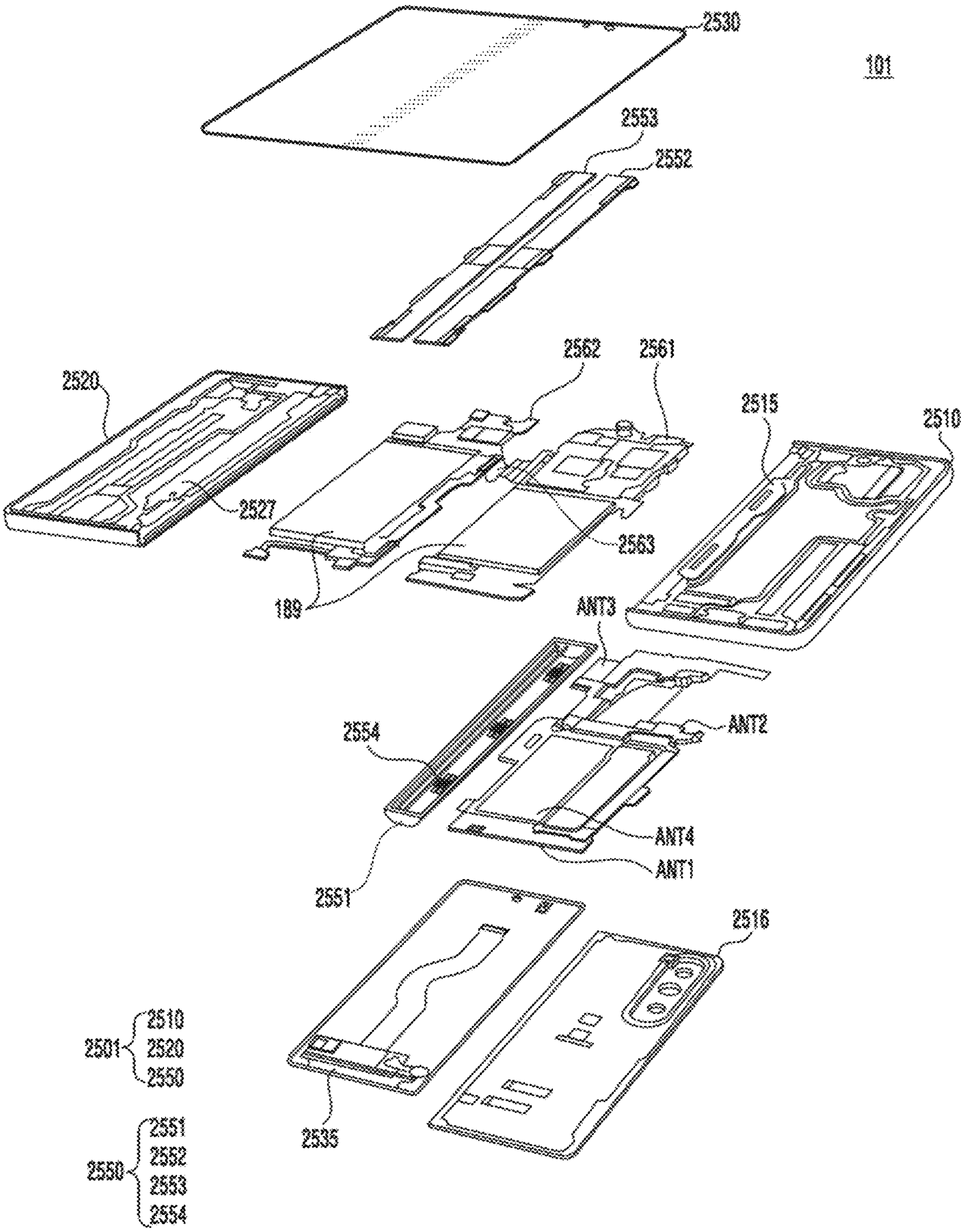

FIGS. 25A, 25B, and 25C illustrate an example of a foldable-type electronic device (e.g., an electronic devices 101). FIG. 25A illustrates an example of an unfolded state of an exemplary foldable electronic device. FIG. 25B illustrates an example of a folded state of an exemplary foldable electronic device. FIG. 25C is an exploded view of an exemplary foldable electronic device.

Referring to FIGS. 25A, 25B, and 25C, a foldable electronic device (e.g., the electronic device 101 of FIG. 1) may include a housing 2501, a flexible display 2530 (e.g., the display module 160 of FIG. 1), and at least one camera 2540.

For example, the housing 2501 may form an exterior of the foldable electronic device 101. For example, the housing 2501, which is a physical exterior of the foldable electronic device 101 exposed to the outside, may be disposed inside the foldable electronic device 101 to surround components that are not exposed to the outside. For example, the housing 2501 may include a first housing portion 2510, a second housing portion 2520, and a hinge structure 2550.

For example, the first housing portion 2510 may include a first surface 2511, a second surface 2512 opposite the first surface 2511, and a first lateral surface 2513 surrounding at least a portion of the first surface 2511 and the second surface 2512. For example, the first surface 2511 may be referred to as a front surface of the first housing portion 2510, and a second surface 2512 may be referred to as a rear surface of the first housing portion 2510. The first lateral surface 2513 may be connected to a peripheral of the first surface 2511 and a periphery of the second surface 2512. The first surface 2511, the second surface 2512, and the first lateral surface 2513 may form an inner space of the first housing portion 2510. For example, at least one component may be disposed in a space surrounded by the first surface 2511, the second surface 2512, and the first lateral surface 2513.

For example, the second housing portion 2520 may include a third surface 2521, a fourth surface 2522 opposite the third surface 2521, and a second lateral surface 2523 surrounding at least a portion of the third surface 2521 and the fourth surface 2522. For example, the third surface 2521 may be referred to as a front surface of the second housing portion 2520, and the fourth surface 2522 may be referred to as a rear surface of the second housing portion 2520. The second lateral surface 2523 may be connected to a peripheral of the third surface 2521 and a periphery of the fourth surface 2522. The third surface 2521, the fourth surface 2522, and the second lateral 2523 may form an inner space of the second housing portion 2520. For example, at least one component may be disposed in a space surrounded by the third surface 2521, the fourth surface 2522, and the second lateral surface 2523.

For example, the flexible display 2530 may be configured to display visual information. For example, the flexible display 2530 may include a display area including a plurality of pixels. For example, an active area may be referred to as an active area displaying visual information. For example, the flexible display 2530 may form at least a portion of the front surface of the housing 2501. For example, the flexible display 2530 may at least partially form the first surface 2511 and the third surface 2521.

For example, the flexible display 2530 may include a first display area 2531 forming at least a portion of the first surface 2511 of the first housing portion 2510, a second display area 2532 forming at least a portion of the third surface 2521 of the second housing portion 2520, and a third display area 2533 disposed between the first display area 2531 and the second display area 2532. For example, the first display area 2531, the second display area 2532, and the third display area 2533 may at least partially form the front surface of the housing 2501. For example, the foldable electronic device 101 may further include a sub-display 2535 distinguished from the flexible display 2530. The sub-display 2535 may be disposed on the fourth surface 2522 of the second housing portion 2520. The sub-display 2535 may be referred to as a cover display.

For example, at least one camera 2540 may be configured to obtain an image, based on receiving light from an external subject of the foldable electronic device 101. For example, the at least one camera 2540 may include first cameras 2541, second cameras 2542, or a third camera 2543. For example, the first cameras 2541 may be disposed within the first housing portion 2510. For example, the first housing portion 2510 may include at least one opening 2541*a* overlapping the first cameras 2541 when the foldable electronic device 101 is viewed from above. The first cameras 2541 may obtain an image based on receiving light from the outside of the foldable electronic device 101 through the at least one opening 2541*a*.

For example, the second camera 2542 may be disposed within the second housing portion 2520. The second housing portion 2520 may include at least one opening 2542*a* overlapping the second camera 2542 when the foldable electronic device 101 is viewed from above. The second camera 2542 may obtain an image based on receiving light from the outside of the foldable electronic device 101 through the at least one opening 2542*a*.

For example, the third camera 2543 may be disposed within the first housing portion 2510. For example, the first display area 2531 of the flexible display 2530 may include at least one opening overlapping the third camera 2543 when the flexible display 2530 is viewed from above. The third camera 2543 may obtain an image based on receiving light from the outside of the flexible display 2530 through the at least one opening.

For example, the second camera 2542 and the third camera 2543 may be disposed under the flexible display 2530 (e.g., in the −z direction). For example, the second camera 2542 and/or the third camera 2543 may include an under display camera (UDC) and/or a punch hole camera.

For example, the first housing portion 2510 and the second housing portion 2520 may be rotatably coupled. For example, the second housing portion 2520 may be coupled to the first housing portion 2510 to be rotatable with respect to the first housing portion 2510 through the hinge structure 2550.

For example, the hinge structure 2550 may rotatably connect the first housing portion 2510 and the second housing portion 2520. The hinge structure 2550 may be disposed between the first housing portion 2510 and the second housing portion 2520 of the foldable electronic device 101 so that the foldable electronic device 101 may be folded. The hinge structure 2550 may enable the foldable electronic device 101 to change from the unfolded state to the folded state. The hinge structure 2550 may enable the foldable electronic device 101 to change from the folded state to the unfolded state. The hinge structure 2550 may maintain the foldable electronic device 101 in an intermediate state between the unfolded state and the folded state.

For example, the unfolded state may be referred to as a state in which a first direction in which a first display area 2530*a* faces and a second direction in which a second display area 2530*b* faces are the same. For example, the folded state may be referred to as a state in which the first direction is opposite to the second direction. When the foldable electronic device 101 is in the folded state, the first housing portion 2510 and the second housing portion 2520 may be stacked or overlapped.

When the foldable electronic device 101 is in the folded state and the intermediate state, the first direction and the second direction may be different from each other. When the foldable electronic device 101 is in the folded state, the first direction and the second direction may be opposite to each other. For example, when the foldable electronic device 101 is in the intermediate state, the first direction may have a slope (e.g., an angle between 0 and 180 degrees) with respect to the second direction.

For example, the foldable electronic device 101 may be rotatable based on a folding axis f. The folding axis f may be referred to as a virtual line extending along a direction (e.g., y-axis) parallel to a longitudinal direction of the foldable electronic device 101 or a direction (e.g., x-axis) parallel to a width direction of the foldable electronic device 101.

For example, the foldable electronic device 101 may include at least one conductive portion 2514*a* and 2524*a* and at least one non-conductive portion 2514*b* and 2524*b*, which are included in the first lateral surface 2513 and/or the third lateral surface 2523. For example, at least one conductive portion 2514*a* and 2524*a* may be separated from another conductive portion in the first lateral surface 2513 and/or third lateral surface 2523, by contacting at least one non-conductive portion 2514*b* and 2524*b*. The at least one conductive portion 2514*a* and 2524*a* may operate as an antenna radiator to be used for communication with an external electronic device.

Referring to FIG. 25C, the hinge structure 2550 may include a hinge cover 2551, a first hinge plate 2552, a second hinge plate 2553, and a hinge module 2554. The hinge cover 2551 may surround internal components of the hinge structure 2550, and form an outer surface of the hinge structure 2550. For example, in a state that the foldable electronic device 101 is in the folded state, the hinge cover 2551 may be at least partially exposed to the outside of the foldable electronic device 101 through a space between the first housing portion 2510 and the second housing portion 2520. According to another embodiment, in a state that the foldable electronic device 101 is in the unfolded state, the hinge cover 2551 may be covered by the first housing portion 2510 and the second housing portion 2520, and may not be exposed to the outside of the foldable electronic device 101.

For example, the first hinge plate 2552 and the second hinge plate 2553 may be operably coupled to the first housing portion 2510 and the second housing portion 2520, respectively, so that the first housing portion 2510 and the second housing portion 2520 may be rotatably connected. For example, the first hinge plate 2552 may be operably coupled to a first frame 2515 of the first housing portion 2510, and the second hinge plate 2553 may be operably coupled to a second frame 2527 of the second housing portion 2520. As the first hinge plate 2552 and the second hinge plate 2553 are operably coupled to the first frame 2515 and the second frame 2527, respectively, the first housing portion 2510 and the second housing portion 2520 may be rotatable according to the rotation of the first hinge plate 2552 and the second hinge plate 2553.

The hinge module 2554 may rotate the first hinge plate 2552 and the second hinge plate 2553. For example, the hinge module 2554 may rotate the first hinge plate 2552 and the second hinge plate 2553 based on the folding axis f, by including gears capable of being engaged each other and rotated.

For example, the first housing portion 2510 may include the first frame 2515 and a rear cover 2516. The first frame 2515 may be disposed inside the first housing portion 2510 and may support at least one component disposed within the first housing portion 2510. The rear cover 2516 may at least partially form the second surface 2522 of the first housing portion 2510. For example, the second housing portion 2520 may include the second frame 2527. The second frame 2527 may be disposed inside the second housing portion 2520, and may support at least one component disposed within the second housing portion 2520. For example, the sub-display 2535 may be disposed under the second frame 2527 (e.g., in the −z direction).

In addition to the at least one camera 2540 described above, the exemplary foldable electronic device 101 may include a plurality of electronic components for implementing various functions. For example, the foldable electronic device 101 may include a first PCB 2561, a second PCB 2562, a connection structure (e.g., a flexible PCB 2563), and/or a battery 189. The above-described electronic components are merely exemplary, and are not limited thereto.

For example, the first PCB 2561 and the second PCB 2562 may provide an electrical connection of components in the foldable electronic device 101, respectively. For example, the first PCB 2561 may be disposed within the first housing portion 2510, and the second PCB 2562 may be disposed within the second housing portion 2520. The first PCB 2561 may provide an electrical connection between electronic components disposed within the first housing portion 2510. The second PCB 2562 may provide an electrical connection between electronic components disposed within the second housing portion 2520. The connection structure 2563 may electrically connect the first PCB 2561 and the second PCB 2562. The connection structure 2563 may extend from the first PCB 2561 across the hinge structure 2550 to the second PCB 2562. The connection structure 2563 may at least partially overlap the hinge structure 2550.

For example, the battery 189, which is a device for supplying power to at least one component of the foldable electronic device 101, may include, for example, a non-rechargeable primary battery and/or a rechargeable secondary battery.

For example, the foldable electronic device 101 may include a plurality of antennas ANT1, ANT2, ANT3, and ANT4 to be used for communication with an external electronic device. For example, the foldable electronic device 101 may include a main antenna ANT1, a sub-antenna ANT2, an ultra-wide band (UWB) antenna ANT3, and/or a short-range wireless communication antenna ANT4. However, it is not limited thereto.

Hereinafter, one or more components to be described later with reference to the drawings may be implemented together with the components of the foldable electronic device 101 described with reference to FIGS. 25A, 25B, and 25C. Identical reference numerals are assigned to components identical to the components described above, and overlapping descriptions may be omitted.

In the disclosure, relative terms such as "above" and "under" may be used to describe relative positions between components. For example, if the foldable electronic device 101 illustrated in the drawing is flipped over, the top and bottom may be interchanged.

According to an embodiment, the foldable electronic device 101, which is radiators for NFC communication, may include a conductive portion 210 and a coil 230. For example, the coil 230 may be disposed in the first housing portion 2510, and the conductive portion 210 (e.g., a portion that is of a portion of a metal frame and at least partially exposed to the outside) may be disposed in the second housing portion 2520. For an electrical connection, a connection member (e.g., FPCB) disposed across the hinge structure 2550 may be used for an NFC path, an ESD path, and/or a non-NFC communication path. For the ground, a portion (e.g., the hinge cover 2551, the first hinge plate 2552, and the second hinge plate 2553) of the hinge structure 2550 may be used. For another example, the conductive portion 210 may be disposed in the first housing portion 2510, and the coil 230 may be disposed in the second housing portion 2520. For an electrical connection, a connection member (e.g., FPCB) disposed across the hinge structure 2550 may be used for an NFC path, an ESD path, and/or a non-NFC communication path. For the ground, a portion (e.g., the hinge cover 2551, the first hinge plate 2552, and the second hinge plate 2553) of the hinge structure 2550 may be used. For also another example, both the conductive portion 210 and the coil 230 may be disposed in the first housing portion 2510. For still also another example, both the conductive portion 210 and the coil 230 may be disposed in the second housing portion 2520.

Figure 26A:
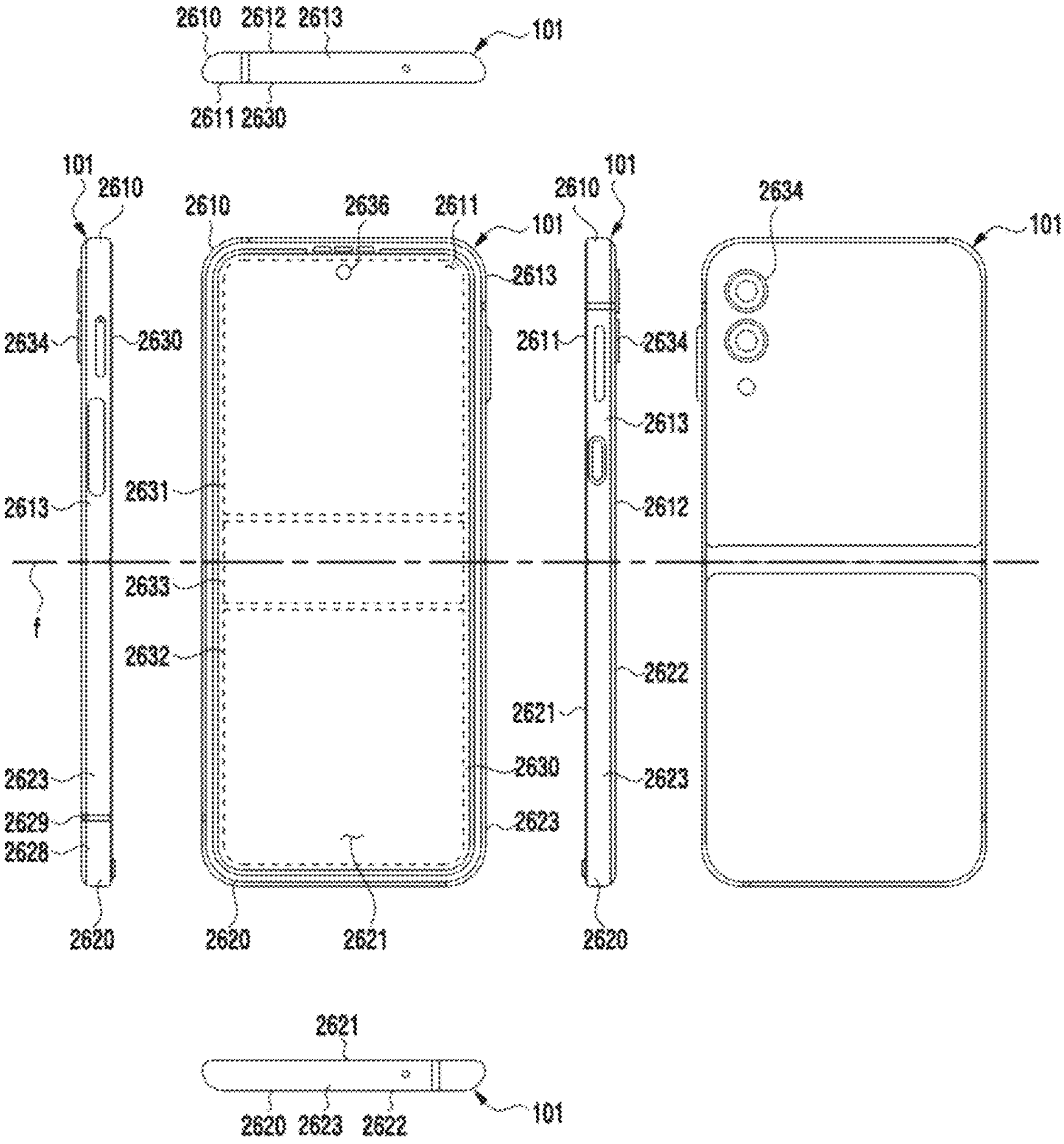
FIGS. 26A, 26B, and 26C illustrate an example of another foldable-type electronic device.
Figure 26B:
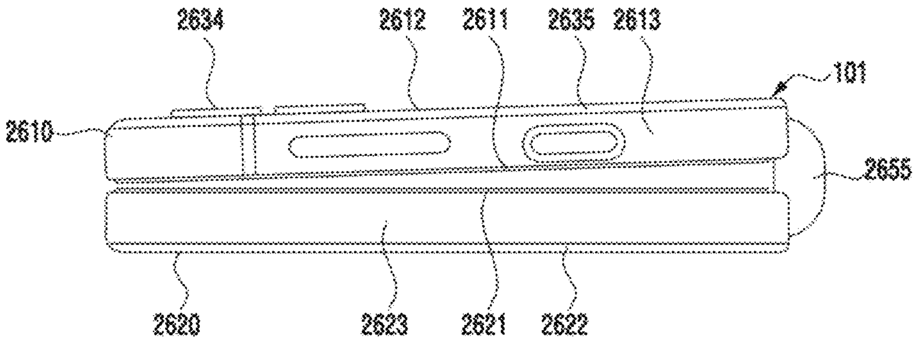
Figure 26C:
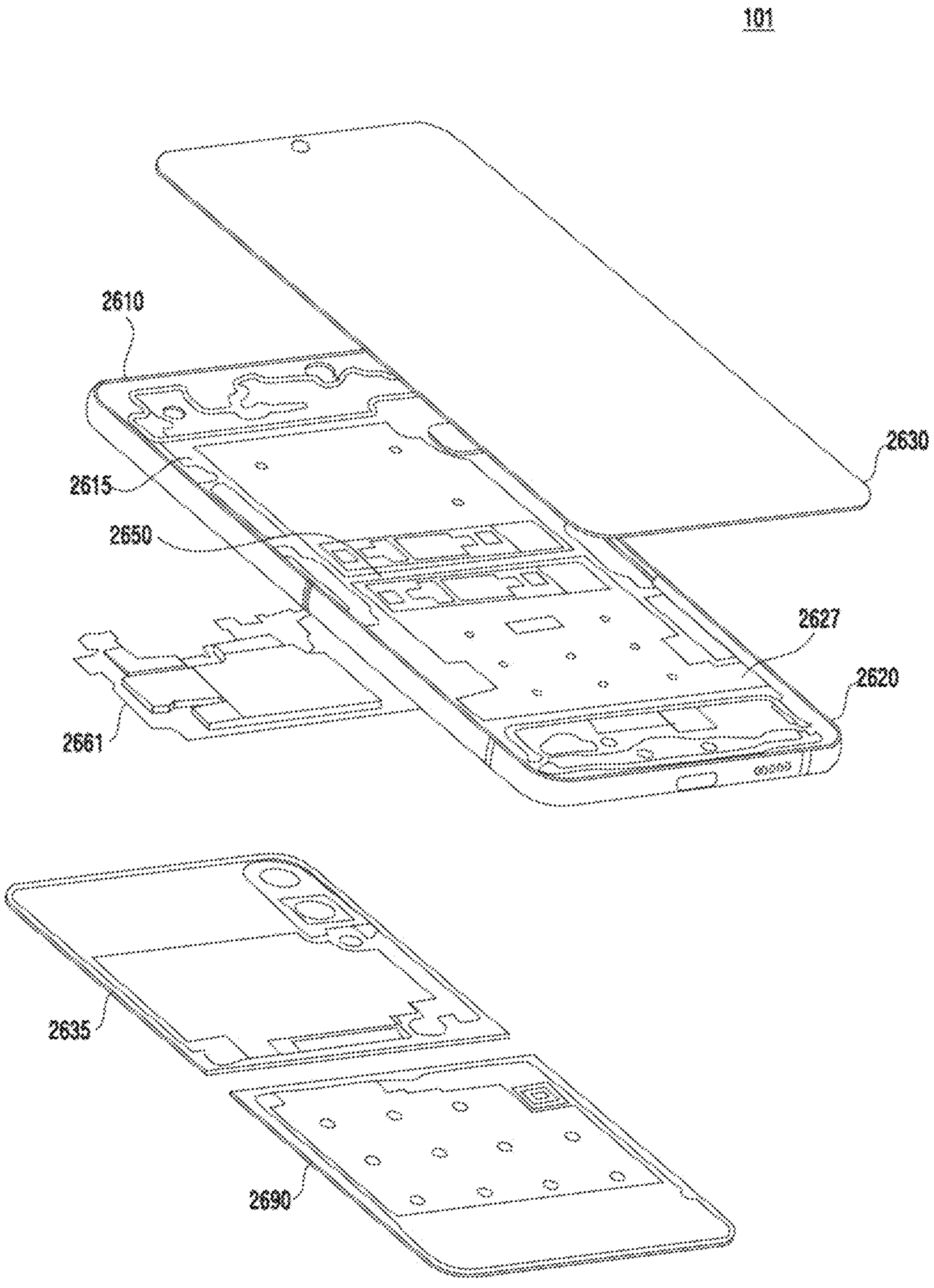

FIGS. 26A, 26B, and 26C illustrate an examples of another foldable-type electronic device (e.g., an electronic devices 101). FIG. 26A illustrates an unfolded state of the electronic device 101. FIG. 26B illustrates a folded state of the electronic device 101. FIG. 26C is an exploded view of the electronic device 101.

Referring to FIGS. 26A, 26B, and 26C, the electronic device 101 may include a first housing portion 2610, a second housing portion 2620, and a display 2630.

The first housing portion 2610 may include a first surface 2611, a second surface 2612 faced away from the first surface 2611, and a first lateral surface 2613 surrounding at least a portion of the first surface 2611 and the second surface 2612. The second housing portion 2620 may further include at least one camera 2634 and a display panel 2635 exposed through a portion of the second surface 2612. The first housing portion 2610 may provide a space formed by the first surface 2611, the second surface 2612, and the first lateral surface 2613 as a space for arranging components of the electronic device 101. The first lateral surface 2613 and a second lateral surface 2623 may include a conductive material, a non-conductive material, or a combination thereof. For example, the first lateral surface 2613 and the second lateral surface 2623 may include a conductive portion 2628 and a non-conductive portion 2629. The conductive portion 2628 may include a plurality of conductive members, and the plurality of conductive members may be spaced apart from each other. The non-conductive portion 2629 may be disposed between the plurality of conductive members. An antenna structure may be formed by some or a combination of the plurality of conductive members and the plurality of non-conductive members.

The second housing portion 2620 may include a third surface 2621, a fourth surface 2622 faced away from the third surface 2621, and a second lateral surface 2623 surrounding at least a portion of the third surface 2621 and the fourth surface 2622. The fourth surface 2622 may further include a rear plate 2690 disposed on the fourth surface 2622.

The second lateral surface 2623 may be rotatably (or pivotably) connected to the first lateral surface 2613 through a hinge structure 2650 disposed on the hinge cover 2655. The hinge structure 2650 may include a hinge plate. For example, the hinge plate may include a first hinge plate and a second hinge plate. The first hinge plate may be connected to the first housing portion 2610, and the second hinge plate may be connected to the second housing portion 2620. The second housing portion 2620 may provide a space formed by the third surface 2621, and the fourth surface 2622 faced away from the third surface 2621, and the lateral surface 2623 surrounding at least a portion of the third surface 2621 and the fourth surface 2622, as a space for arranging components of the electronic device 101. The display 2630 may include a window exposed toward the outside. The window may protect a surface of the display 2630, and may be formed of a transparent member in order to transmit visual information provided from the display 2630 to the outside. The window may include a glass material such as ultra-thin glass (UTG) or a polymer material such as polyimide (PI). The display 2630 may include a first display area 2631 disposed on the first surface 2611 of the first housing portion 2610, a second display area 2632 disposed on the third surface 2621 of the second housing portion 2620, and a third display area 2633 between the first display area 2631 and the second display area 2632. At least a portion of the third display area 2633 may be disposed on the hinge structure 2650.

For example, an opening may be formed in a portion of a screen display area of the display 2630, or a recess or opening may be formed in a support member (e.g., bracket) supporting the display 2630. The electronic device 101 may include at least one camera aligned with the recess or the opening. For example, the first display area 2631 may further include at least one camera 2636 capable of obtaining an image from the outside through a portion of the first display area 2631. For example, at least one camera 2636 may be included in a rear surface of the display 2630 corresponding to the first display area 2631 or the second display area 2632 of the display 2630. For example, at least one camera 2636 may be disposed under the display 2630, and surrounded by the display 2630. The at least one camera 2636 may be surrounded by the display 2630, and may not be exposed to the outside. However, it is not limited thereto, and the display 2630 may include an opening exposing the at least one camera 2636 to the outside. In an embodiment, the display 2630 may further include a rear surface opposite to the front surface. The display 2630 may be supported by a first support member 2615 of the first housing portion 2610 and a second support member 2627 of the second housing portion 2620.

The hinge structure 2650 may be configured to rotatably connect the first support member 2615 fastened to the first hinge plate and the second support member 2627 fastened to the second hinge plate. The hinge cover 2655 surrounding the hinge structure 2650 may be exposed at least partially through a space between the first housing portion 2610 and the second housing portion 2620, while the electronic device 101 is in the folded state. The hinge cover 2655 may be covered by the first housing portion 2610 and the second housing portion 2620 while the electronic device 101 is in the unfolded state.

The electronic device 101 may be folded based on a folding axis f passing through the hinge cover 2655. For example, the hinge cover 2655 may be disposed between the first housing part 2610 and the second housing part 2620 of the electronic device 101, in order to bend, curve, or fold the electronic device 101. For example, the first housing portion 2610 may be connected to the second housing portion 2620 through the hinge structure 2650 disposed in the hinge cover 2655, and may rotate based on the folding axis f.

The electronic device 101 may be folded so that the first housing portion 2610 and the second housing portion 2620 face each other by rotating about the folding axis f. The electronic device 101 may be folded so that the first housing portion 2610 and the second housing portion 2620 is stacked or overlapped to each other.

Referring to FIG. 26C, the electronic device 101 may include a first housing part 2610, a second housing part 2620, a hinge structure 2650, a display 2630, a PCB 2661, a display panel 2635, and a rear plate 2690. For example, the electronic device 101 may omit at least one of components or may additionally include another component.

For example, the hinge structure 2650 may include a hinge plate. For example, the hinge structure 2650 may include a hinge gear enabling the first housing portion 2610 and the second housing portion 2620 to be pivotable.

For example, the first support member 2615 may be partially surrounded by the first lateral surface 2613. For example, the first support member 2615 may be integrally formed with the first lateral surface 2613. For example, the second support member 2627 may be partially surrounded by the second lateral surface 2623. For example, the second support member 2627 may be integrally formed with the second lateral surface 2623. However, it is not limited thereto. For example, the first support member 2615 may be formed separately from the first lateral surface 2613. For example, the second support member 2627 may be formed separately from the second lateral surface 2623.

For example, a surface of the first support member 2615 may be coupled with the display 2630, and another surface of the first support member 2615 may be coupled with the display panel 2635. A surface of the second support member 2627 may be coupled with the display 2630, and another surface of the second support member 2627 may be coupled with the rear plate 2690.

For example, the PCB 2661 and the battery may be disposed between a surface formed by the first support member 2615 and the second support member 2627 and a surface formed by the display panel 2635 and the rear plate 2690. The PCB 2661 may be electrically connected to components for implementing various functions of the electronic device 101.

According to an embodiment, the foldable electronic device 101 may include the conductive portion 210 and the coil 230 as radiators for NFC communication. For example, the coil 230 may be disposed in the first housing portion 2610, and the conductive portion 210 may be disposed in the second housing portion 2620. For an electrical connection, a connecting member (e.g., FPCB) disposed across the hinge structure 2650 may be used for an NFC path, an ESD path, and/or a non-NFC communication path. For the ground, the cover 2655 and/or a plate (e.g., the first hinge plate, the second hinge plate) of the hinge structure 2650 may be used. For another example, the conductive portion 210 may be disposed in the first housing portion 2610, and the coil 230 may be disposed in the second housing portion 2620. For an electrical connection, a connecting member (e.g., FPCB) disposed across the hinge structure 2650 may be used for an NFC path, an ESD path, and/or a non-NFC communication path. For the ground, the cover 2655 and/or a plate (e.g., the first hinge plate, the second hinge plate) of the hinge structure 2650 may be used. For also another example, both the conductive portion 210 and the coil 230 may be disposed in the first housing portion 2610. For still also another example, both the conductive portion 210 and the coil 230 may be disposed in the second housing portion 2620.

In case that two radiators (e.g., the conductive portion 210, or the coil 230) of the electronic device 101 are spaced far away, a structure in which the two radiators are connected through ground paths (e.g., the third signal path 233 is the second connection type 252) may be advantageous in terms of simplifying circuitry wiring. In case that two radiators (e.g., the conductive portion 210, or the coil 230) are to be connected through a conductive line, wiring should be disposed across a substrate (e.g., PCB) of a housing part, and thus circuitry wiring in the substrate may be complicated. On the other hand, in case that two radiators (e.g., the conductive portion 210, or the coil 230) are to be connected through a ground area (e.g., a portion of PCB), circuitry wiring may be simplified because it only needs to be connected to different ground portions in the ground area of the PCB. For example, the electronic device 101, which is a foldable-type electronic device, may include a first housing part (e.g., the first housing part 2510 or the first housing part 2610) and a second housing part (e.g., the second housing part 2520 or the second housing part 2620). For example, the NFC circuitry 220 and the conductive portion 210 may be located in the first housing part, and the coil 230 is located in the second housing part. A portion (e.g., the first ground portion 262*a*) of the PCB in the first housing part may be connected to the conductive portion 210, and another portion (e.g., the second ground portion 262*b*) of the PCB may be connected to the coil 230. As the two radiators are electrically connected through different ground portions of the PCB, unnecessary circuitry wiring may be reduced.

In embodiments of the disclosure, while maintaining the radiation performance using the coil 230, the radiation performance may be additionally secured using the conductive portion 210. An NFC communication area may be expanded by using the conductive portion 210 in addition to the coil 230. Additionally, the conductive portion 210 may also be used as a radiator for cellular communication. In other words, the wireless communication circuitry 820 and the NFC circuitry 220 for cellular communication may share a radiator. For IC protection, in the disclosure, circuitry structures for separating the ESD path through which signals of the NFC circuitry 220 are transmitted have been described.

The effects that can be obtained from the disclosure are not limited to those described above, and any other effects not mentioned herein will be clearly understood by those having ordinary knowledge in the art to which the disclosure belongs, from the following description.

At least one of components described in one or more of the preceding drawings may be configured to perform one or more operations, techniques, processes, and/or methods as described in the disclosure for one or more embodiments. For example, a processor (e.g., baseband processor) described in the disclosure in relation to one or more of the preceding drawings may be configured to operate according to one or more examples described in the disclosure. For another example, a circuitry related to user equipment (UE), base station, network element, and the like as described above in relation to one or more of the preceding drawings may be configured to operate according to one or more examples described herein.

Any of embodiments described above may be combined with any other embodiment (or a combination of embodiments) unless explicitly stated otherwise. The above-described description of one or more implementations provides examples and descriptions, but is not intended to limit or exhaust the scope of embodiments in the precise form disclosed. Modifications and variations are possible according to the above teachings and it may be obtained from the implementation of various embodiments.

In embodiments, an electronic device 101 is provided. The electronic device 101 may comprise a conductive portion 210, a coil 230, a PCB, and a near field communication (NFC) circuitry disposed on the PCB. A first terminal 221 of the NFC circuitry 220 may be electrically connected to the conductive portion 210 through a first signal path. A second terminal 222 of the NFC circuitry 220 may be electrically connected to the coil 230 through a second signal path. The NFC circuitry 220 may be configured to transmit a first signal of a differential output from the first terminal 221 to the conductive portion 210 through the first signal path, and transmit a second signal of the differential output from the second terminal 222 to the coil 230 through the second signal path.

According to an embodiment, a first portion of the coil 230 may be electrically connected to the NFC circuitry 220 through the second signal path. A second portion of the coil 230 may be electrically connected to a ground portion. The conductive portion 210 may be electrically connected to the ground portion.

According to an embodiment, the first portion of the coil 230 may be connected to the NFC circuitry 220 through the second signal path. The second portion of the coil 230 may be electrically connected to the conductive portion 210.

According to an embodiment, the electronic device 101 may further include a wireless communication circuitry 820 for cellular communication disposed on the PCB. The wireless communication circuitry 820 may be configured to transmit a wireless signal in a frequency band of the cellular communication to the conductive portion 210 through a feeding path.

According to an embodiment, the first signal path connected to the conductive portion 210 may include a radio frequency (RF) choke inductor. The feeding path connected to the conductive portion 210 may include a capacitor for filtering a direct current (DC) signal and an RF frequency less than or equal to a reference frequency.

According to an embodiment, the electronic device 101 may further include an inductor electrically connected to the feeding path. The inductor may be used to prevent ESD.

According to an embodiment, the capacitor may be a varistor capacitor for over-voltage protection.

According to an embodiment, the electronic device 101 may further include a band stop filter circuitry for filtering an NFC frequency electrically connected to the feeding path and an inductor disposed between the band stop filter circuitry and a ground portion. The band stop filter circuitry and the inductor may be used to prevent ESD.

According to an embodiment, the band stop filter circuitry may include an inductor and a capacitor disposed in parallel.

According to an embodiment, the electronic device 101 may further include a second conductive portion different from the conductive portion 210. The conductive portion 210 may be electrically connected to the NFC circuitry and the ground portion. The second conductive portion may be electrically connected to the ground portion and the coil 230.

According to an embodiment, the electronic device 101 may include a common matching circuitry connected to the first terminal 221 and the second terminal 222, a first matching circuitry electrically connected to the coil 230, and a second matching circuitry electrically connected to the conductive portion 210. The first signal may be transmitted to the conductive portion 210 through the common matching circuitry, the first matching circuitry, and the first transmission path. The second signal may be transmitted to the conductive portion 210 through the common matching circuit, the second matching circuit, and the second transmission path.

According to an embodiment, the second terminal 222 of the NFC circuitry 220 may be electrically connected to each of the conductive portion 210 and the coil 230. The first portion of the coil 230 may be electrically connected to the first terminal 221 of the NFC circuitry 220. The second portion of the coil 230 may be electrically connected to the second terminal 222 of the NFC circuitry 220.

According to an embodiment, the conductive portion 210 may be disposed between non-conductive portions of a metal frame of the electronic device 101.

According to an embodiment, the electronic device 101 may further include a camera module. The conductive portion 210 may correspond to a decoration portion disposed to protect the camera module.

According to an embodiment, the electronic device 101 may include a first housing portion and a second housing portion. The coil 230 may be disposed in a first housing portion. The PCB and the conductive portion 210 may be disposed in the second housing portion.

In embodiments, an electronic device 101 is provided. The electronic device 101 may include a first housing portion including a plurality of conductive portions and non-conductive portions, a second housing portion rotatably coupled to the first housing portion, a PCB disposed in the first housing portion, a coil 230 disposed in the second housing portion, and a NFC circuitry disposed on the PCB. The plurality of non-conductive portions may include a first non-conductive portion and a second non-conductive portion. The plurality of conductive portions may include a first conductive portion formed between the first non-conductive portion and the second non-conductive portion. A first terminal 221 of the NFC circuitry 220 may be electrically connected to the first conductive portion through a first signal path. A second terminal 222 of the NFC circuitry 220 may be electrically connected to the coil 230 through a second signal path. The NFC circuitry 220 may be configured to transmit a first signal of a differential output from the first terminal 221 to the first conductive portion through the first signal path, and transmit a second signal of the differential output from the second terminal 222 to the coil 230 through the second signal path.

According to an embodiment, a first portion of the coil 230 may be electrically connected to the NFC circuitry 220 through the second signal path. A second portion of the coil 230 may be electrically connected to a ground portion. The conductive portion 210 may be electrically connected to the ground portion.

According to an embodiment, the first portion of the coil 230 may be connected to the NFC circuitry 220 through the second signal path. The second portion of the coil 230 may be electrically connected to the conductive portion 210.

According to an embodiment, the electronic device 101 may further include a wireless communication circuitry 820 for cellular communication disposed on the PCB. The wireless communication circuitry 820 may be configured to transmit a wireless signal in a frequency band of the cellular communication to the conductive portion 210 through a feeding path. The first signal path connected to the conductive portion 210 may include a radio frequency (RF) choke inductor. The feeding path connected to the conductive portion 210 may include a capacitor for filtering a direct current (DC) signal and an RF frequency less than or equal to a reference frequency.

According to an embodiment, the plurality of non-conductive portions may further include a third non-conductive portion. The plurality of conductive portions may include a second conductive portion formed between the second non-conductive portion and the third non-conductive portion. The first conductive portion may be electrically connected to the NFC circuitry and a ground portion. The second conductive portion may be electrically connected to the ground portion and the coil 230.

In embodiments, an electronic device 101 is provided. The electronic device 101 may comprise a conductive portion at least partially exposed to outside of the electronic device 101, a coil 230, a NFC circuitry 220, and a transmission line electrically connecting the conductive portion, the coil 230, and the NFC circuitry 220. The transmission line may include a first signal path 231 electrically connecting a first terminal 221 of the NFC circuitry 220 and a first area of the conductive portion, a second signal path 232 electrically connecting a second terminal 222 of the NFC circuitry 220 and a first ending portion of the coil 230, and a third signal path 233 electrically connecting a second area of the conductive portion and a second ending portion of the coil 230. A signal path selected between the first signal path 231, the second signal path 232, and the third signal path 233 may include a first ground path 252*a* and a second ground path 252*b* that are connected to a ground area of the electronic device 101.

According to an embodiment, an end of the first ground path 252*a* may be connected to a first ground portion of the ground area, and an end of the second ground path 252*b* may be connected to a second ground portion different from the first ground portion of the ground area.

According to an embodiment, the selected signal path may be the third signal path 233, and another end of the first ground path 252*a* may be connected to the conductive portion, and another end of the second ground path 252*b* may be connected to the coil 230.

According to an embodiment, the electronic device 101 may comprise a non-NFC communication circuitry. The conductive portion may form a portion between a first non-conductive portion and a second non-conductive portion, formed on a lateral frame of the electronic device 101. A third area of the conductive portion may be connected to a feeding path electrically connected to the non-NFC communication circuitry.

According to an embodiment, the electronic device 101 may comprise a camera module. The conductive portion may form a portion of a decoration covering the camera module.

According to an embodiment, the electronic device 101 may comprise a PCB. The NFC circuitry 220 may be disposed on the PCB. The ground area may be formed as a portion of the PCB.

According to an embodiment, the electronic device 101 may comprise a first housing portion and a second housing portion, rotatably coupled to each other. At least a portion of the first ground path 252*a* may be formed in a first PCB portion disposed in the first housing portion. At least a portion of the second ground path **252*b*** may be formed in a second PCB portion disposed in the second housing portion and electrically connected to the first PCB portion.

According to an embodiment, the coil 230 may be disposed in the first housing portion. The conductive portion may be disposed in the second housing portion.

According to an embodiment, the electronic device 101 may comprise a non-folding housing. The coil 230 may be disposed eccentrically in a first direction with respect to a longitudinal direction of the non-folding housing. The conductive portion may be eccentrically disposed in a second direction opposite to the first direction with respect to the longitudinal direction.

According to an embodiment, each end of the first ground path **252*a* and the second ground path 252*b*** may be connected to a same ground portion of the ground area.

According to an embodiment, the NFC circuitry 220 may be configured to provide a first signal forming a differential output to the conductive portion via the first signal path 231 and a second signal forming the differential output to the coil 230 via the second signal path 232.

According to an embodiment, the first signal path 231 connected to the conductive portion 210 may include a radio frequency (RF) choke inductor. The feeding path connected to the conductive portion 210 may include a capacitor for filtering a direct current (DC) signal and an RF frequency less than or equal to a reference frequency.

According to an embodiment, the electronic device 101 may further include an inductor electrically connected to the feeding path. The inductor may be used to prevent ESD.

According to an embodiment, the capacitor may be a varistor capacitor for over-voltage protection.

According to an embodiment, the electronic device 101 may further include a band stop filter circuitry for filtering an NFC frequency electrically connected to the feeding path and an inductor disposed between the band stop filter circuitry and a ground portion. The band stop filter circuitry and the inductor may be used to prevent ESD.

According to an embodiment, the band stop filter circuitry may include an inductor and a capacitor disposed in parallel.

In embodiments, an electronic device 101 is provided. The electronic device 101 may comprise a first conductive portion at least partially exposed to outside of the electronic device 101, a second conductive portion at least partially exposed to outside of the electronic device 101, a coil 230, a NFC circuitry 220, and a transmission line electrically connecting the conductive portion, the coil 230, and the NFC circuitry 220. The transmission line may include a first signal path 231 electrically connecting a first terminal 221 of the NFC circuitry 220 and a first area of the first conductive portion, a second signal path 232 electrically connecting a second terminal 222 of the NFC circuitry 220 and a first ending portion of the coil 230, a third signal path 233 electrically connecting a first area of the second conductive portion and a second ending portion of the coil 230, and a fourth signal path electrically connecting a second area of the first conductive portion and a second area of the second conductive portion. A signal path selected between the first signal path 231, the second signal path 232, the third signal path 233, and the fourth signal path may include a first ground path **252*a* and a second ground path 252*b* that are connected to a ground area of the electronic device 101**.

According to an embodiment, the first conductive portion may form a portion between a first non-conductive portion and a second non-conductive portion, which are formed on a lateral frame of the electronic device 101. The second conductive portion may form a portion between the second non-conductive portion and a third non-conductive portion, formed on the lateral frame of the electronic device 101.

According to an embodiment, the electronic device 101 may comprise a first non-NFC communication circuitry, and a second non-NFC communication circuitry. A third area of the first conductive portion may be connected to a first feeding path, electrically connected to the first non-NFC communication circuitry. A third area of the second conductive portion may be connected to a second feeding path, electrically connected to the second non-NFC communication circuitry.

According to an embodiment, the electronic device 101 may comprise a PCB. The NFC circuitry 220 may be disposed on the PCB, and the ground area may be formed as a portion of the PCB.

According to an embodiment, an end of the first ground path **252*a* may be connected to a first ground portion of the ground area, and an end of the second ground path 252*b*** may be connected to a second ground portion different from the first ground portion of the ground area.

According to an embodiment, the selected signal path may be the fourth signal path, another end of the first ground path **252*a* may be connected to the first conductive portion, and another end of the second ground path 252*b*** may be connected to the second conductive portion.

According to an embodiment, the electronic device may comprise a first housing portion and a second housing portion, rotatably coupled to each other. At least a portion of the first ground path **252*a* and at least a portion of the second ground path 252*b*** may be formed in a PCB disposed in the first housing portion.

According to an embodiment, each end of the first ground path **252*a* and the second ground path 252*b*** may be connected to a same ground portion of the ground area.

According to an embodiment, the NFC circuitry 220 may be configured to provide a first signal forming a differential output to the conductive portion via the first signal path 231 and a second signal forming the differential output to the coil 230 via the second signal path 232.

According to an embodiment, the first signal path 231 connected to the conductive portion 210 may include a RF choke inductor. The feeding path connected to the conductive portion 210 may include a capacitor for filtering a direct current (DC) signal and an RF frequency less than or equal to a reference frequency.

According to an embodiment, the electronic device 101 may further include an inductor electrically connected to the feeding path. The inductor may be used to prevent ESD.

According to an embodiment, the capacitor may be a varistor capacitor for over-voltage protection.

According to an embodiment, the electronic device 101 may further include a band stop filter circuitry for filtering an NFC frequency electrically connected to the feeding path and an inductor disposed between the band stop filter circuitry and a ground portion. The band stop filter circuitry and the inductor may be used to prevent ESD.

According to an embodiment, the band stop filter circuitry may include an inductor and a capacitor disposed in parallel.

Methods according to embodiments described in claims or specifications of the disclosure may be implemented as a form of hardware, software, or a combination of hardware and software.

In case of implementing as software, a computer-readable storage medium for storing one or more programs (software module) may be provided. The one or more programs stored in the computer-readable storage medium are configured for execution by one or more processors in an electronic device. The one or more programs include instructions that cause the electronic device to execute the methods according to embodiments described in claims or specifications of the disclosure. The one or more programs may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. In the case of being distributed online, at least part of the computer program product may be temporarily generated or at least temporarily stored in the machine-readable storage medium, such as memory of the manufacturer's server, the application store's server, or a relay server.

Such a program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), another type of optical storage device, or a magnetic cassette. Alternatively, it may be stored in a memory composed of a combination of some or all of them. In addition, a plurality of configuration memories may be included.

Additionally, a program may be stored in an attachable storage device that may be accessed through a communication network such as the Internet, Intranet, local area network (LAN), wide area network (WAN), or storage area network (SAN), or a combination thereof. Such a storage device may be connected to a device performing an embodiment of the disclosure through an external port. In addition, a separate storage device on the communication network may also access a device performing an embodiment of the disclosure.

In the above-described specific embodiments of the disclosure, components included in the disclosure are expressed in the singular or plural according to the presented specific embodiment. However, the singular or plural expression is selected appropriately for a situation presented for convenience of explanation, and the disclosure is not limited to the singular or plural component, and even a component expressed in the plural may be composed of a singular number, or a component represented in the singular may be composed of a plural number.

According to various embodiments, one or more components or operations of the above-described components may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be executed sequentially, in parallel, repeatedly, or heuristically, or one or more of the operations may be executed in a different order or omitted, or one or more other operations may be added.

Specific embodiments have been described in the detailed description of the disclosure, but of course, various modifications are possible without departing from the scope of the disclosure.

What is claimed is:

1. An electronic device comprising:

a conductive portion at least partially exposed to outside of the electronic device;

a coil;

a near-field communication (NFC) circuitry; and a transmission line connected with the conductive portion, the coil, and the NFC circuitry, comprising:

a first signal path connected with a first terminal of the NFC circuitry and a first area of the conductive portion, a second signal path connected with a second terminal of the NFC circuitry and a first ending portion of the coil, and a third signal path connected with a second area of the conductive portion and a second ending portion of the coil, and wherein a signal path, which is selected among the first signal path, the second signal path, and the third signal path, includes a first ground path and a second ground path that are connected to a ground area of the electronic device.

2. The electronic device of claim 1, wherein the ground area includes a first ground portion and a second ground portion different from the first ground portion, wherein an end of the first ground path is connected to the first ground portion, and wherein an end of the second ground path is connected to the second ground portion.

3. The electronic device of claim 2, wherein the selected signal path is the third signal path, wherein another end of the first ground path is connected to the conductive portion, and wherein another end of the second ground path is connected to the coil.

4. The electronic device of claim 1, further comprising a non-NFC communication circuitry, wherein the conductive portion corresponds to a portion between a first non-conductive portion and a second non-conductive portion, formed on a lateral frame of the electronic device, and wherein a third area of the conductive portion is connected to a feeding path connected to the non-NFC communication circuitry.

5. The electronic device of claim 1, further comprising a camera module, wherein the conductive portion corresponds to a portion of a decoration covering the camera module.

6. The electronic device of claim 1, further comprising a printed circuit board (PCB), wherein the NFC circuitry is disposed on the PCB, and wherein the ground area corresponds to a portion of the PCB.

7. The electronic device of claim 1, further comprising a first housing portion and a second housing portion, rotatably coupled to each other, wherein at least a portion of the first ground path is formed in a first printed circuit board (PCB) portion disposed in the first housing portion, and wherein at least a portion of the second ground path is formed in a second PCB portion that is disposed in the second housing portion and is connected to the first PCB portion.

8. The electronic device of claim 7, wherein the coil is disposed in the first housing portion, and wherein the conductive portion is disposed in the second housing portion.

9. The electronic device of claim 1, further comprising a non-folding housing, wherein the coil is disposed eccentrically in a first direction with respect to a longitudinal direction of the non-folding housing, and wherein the conductive portion is eccentrically disposed in a second direction opposite to the first direction with respect to the longitudinal direction.

10. The electronic device of claim 1, wherein each end of the first ground path and the second ground path is connected to a same ground portion of the ground area.

11. The electronic device of claim 1, wherein the NFC circuitry is configured to provide a first signal forming a differential output to the conductive portion via the first signal path and a second signal forming the differential output to the coil via the second signal path.

12. An electronic device comprising:

a first conductive portion at least partially exposed to outside of the electronic device;

a second conductive portion at least partially exposed to outside of the electronic device;

a coil;

a near-field communication (NFC) circuitry; and a transmission line connected with the first conductive portion, the second conductive portion, the coil, and the NFC circuitry, comprising:

a first signal path connected with a first terminal of the NFC circuitry and a first area of the first conductive portion, a second signal path connected with a second terminal of the NFC circuitry and a first ending portion of the coil, a third signal path connected with a first area of the second conductive portion and a second ending portion of the coil, and a fourth signal path connected with a second area of the first conductive portion and a second area of the second conductive portion, and wherein a signal path, which is selected between the first signal path, the second signal path, the third signal path, and the fourth signal path, includes a first ground path and a second ground path that are connected to a ground area of the electronic device.

13. The electronic device of claim 12, wherein the first conductive portion corresponds to a portion between a first non-conductive portion and a second non-conductive portion, formed on a lateral frame of the electronic device, and wherein the second conductive portion corresponds to a portion between the second non-conductive portion and a third non-conductive portion, the second conductive portion corresponds to the lateral frame of the electronic device.

14. The electronic device of claim 13, further comprising:

a first non-NFC communication circuitry; and a second non-NFC communication circuitry, wherein a third area of the first conductive portion is connected to a first feeding path, and is connected to the first non-NFC communication circuitry, and wherein a third area of the second conductive portion is connected to a second feeding path, and is connected to the second non-NFC communication circuitry.

15. The electronic device of claim 12, further comprising a printed circuit board (PCB), wherein the NFC circuitry is disposed on the PCB, and wherein the ground area corresponds to a portion of the PCB.

16. The electronic device of claim 12, wherein the ground area includes a first ground portion and a second ground portion different from the first ground portion, wherein an end of the first ground path is connected to the first ground portion, and wherein an end of the second ground path is connected to the second ground portion.

17. The electronic device of claim 16, wherein, when the selected signal path is the fourth signal path, another end of the first ground path is connected to the first conductive portion, and another end of the second ground path is connected to the second conductive portion.

18. The electronic device of claim 12, further comprising a first housing portion and a second housing portion, rotatably coupled to each other, wherein at least a portion of the first ground path and at least a portion of the second ground path are formed in a printed circuit board (PCB) disposed in the first housing portion.

19. The electronic device of claim 12, wherein each end of the first ground path and the second ground path is connected to a same ground portion of the ground area.

20. The electronic device of claim 12, wherein the NFC circuitry is configured to provide a first signal forming a differential output to the first conductive portion and the second conductive portion via the first signal path and a second signal forming the differential output to the coil via the second signal path.

* * * * *